United States Patent [19]

Katagiri et al.

[11] Patent Number: 5,320,930
[45] Date of Patent: Jun. 14, 1994

[54] OPTICAL RECORDING MEDIUM AND PROCESS FOR RECORDING THEREON

[75] Inventors: Kazuharu Katagiri; Yoshihiro Oguchi, both of Yokohama; Yoshio Takasu, Tama, all of Japan

[73] Assignee: Canon Kabushiki Kaisha, Tokyo, Japan

[21] Appl. No.: 86,113

[22] Filed: Jul. 6, 1993

Related U.S. Application Data

[60] Division of Ser. No. 769,636, Oct. 1, 1991, Pat. No. 5,246,814, which is a division of Ser. No. 512,587, Apr. 24, 1990, Pat. No. 5,079,127, which is a division of Ser. No. 378,491, Jul. 11, 1989, abandoned, which is a continuation of Ser. No. 53,563, May 21, 1987, abandoned, which is a continuation of Ser. No. 756,570, Jul. 18, 1985, abandoned, which is a continuation of Ser. No. 481,741, Apr. 4, 1983, abandoned.

[30] Foreign Application Priority Data

| Apr. 6, 1982 [JP] | Japan | 57-56963 |
| Apr. 19, 1982 [JP] | Japan | 57-64926 |
| Apr. 19, 1982 [JP] | Japan | 57-64927 |
| Apr. 19, 1982 [JP] | Japan | 57-64928 |
| Jun. 14, 1982 [JP] | Japan | 57-102579 |
| Jun. 14, 1982 [JP] | Japan | 57-102580 |
| Jun. 16, 1982 [JP] | Japan | 57-103603 |
| Jun. 16, 1982 [JP] | Japan | 57-103604 |
| Jul. 15, 1982 [JP] | Japan | 57-123144 |

[51] Int. Cl.$^5$ ............................................. G03C 5/00
[52] U.S. Cl. ..................................... 430/269; 430/270; 430/552; 430/594; 430/616; 428/156; 428/204; 428/207; 428/250; 235/488; 346/135.1; 346/137
[58] Field of Search ............... 430/269, 270, 552, 594, 430/616; 235/488; 346/135.1, 137; 428/156, 204, 207, 250

[56] References Cited

U.S. PATENT DOCUMENTS

| 2,734,900 | 2/1956 | Heseltine | 430/584 |
| 3,579,345 | 5/1971 | Jones | 430/592 |
| 4,315,983 | 2/1982 | Kawamura et al. | 430/83 |
| 4,364,986 | 12/1982 | Zwanenburg et al. | 428/156 |
| 4,412,231 | 10/1983 | Namba et al. | 346/135.1 |
| 4,415,621 | 11/1983 | Specht et al. | 346/135.1 |
| 4,430,401 | 2/1984 | Wilkinson | 346/135.1 |

FOREIGN PATENT DOCUMENTS

56-109357 8/1981 Japan .

Primary Examiner—Jack P. Brammer
Attorney, Agent, or Firm—Fitzpatrick, Cella, Harper & Scinto

[57] ABSTRACT

An optical recording medium comprising a substrate and a thin organic film containing at least one kind of dye selected from polymethine family dyes, perylium family dyes, and cyanine family dyes, and a recording process comprising scanning the optical recording medium with a high intensity light beam such as a laser beam to form optically detectable pits on the recording medium.

23 Claims, 4 Drawing Sheets

OPTICAL RECORDING MEDIUM AND PROCESS FOR RECORDING THEREON

This application is a division of application Ser. No. 769,636 filed Oct. 1, 1991, now U.S. Pat. No. 5,246,314, which in turn, is a division of application Ser. No. 07/512,587, filed Apr. 24, 1990, now U.S. Pat. No. 5,079,127; which in turn, is a division of application Ser. No. 378,491, filed Jul. 11, 1989, now abandoned; which in turn, is a continuation of application Ser. No. 053,563, filed May 21, 1987, now abandoned; which in turn, is a continuation of application Ser. No. 756,570, filed Jul. 18, 1985, now abandoned; which in turn, is a continuation of application Ser. No. 481,741, filed Apr. 4, 1983, now abandoned.

BACKGROUND OF THE INVENTION

1. Field of the Invention

This invention relates to an optical recording medium suited for writing a record with a laser, especially with a semiconductor laser, and more particularly to an improved optical recording medium used in the art of optical disk.

2. Description of the Prior Art

The optical disk comprises generally a circular substrate overlaid with a thin recording layer, on which high density information can be stored in the form of spiral or circular track of minute, optically detectable pits (e.g. about 1 $\mu$ size). For writing information on such a disk, a laser-responsive layer, i.e. the thin recording layer, is scanned spirally or circularly with a convergent laser beam to form pits on the track of the scanning laser beam. The laser-responsive layer can form optically detectable pits by absorbing laser energy. In a heat mode recording system, for instance, the laser-responsive layer can absorb thermal energy of a laser beam and form minute pits at irradiated spots through evaporation or melting. In another heat mode recording system, pits having an optically detectable difference of optical density can be formed on spots wherein laser energy is absorbed.

The information recorded on the optical disk can be scanned along the track of pits with a laser to read out optical variations due to the presence and absence of pit. For instance, the energy of the reading laser reflected from the disk is monitored with a photodetector. When falling on the pit-free area, an output of the photodetector is lowered. On the contrary, when irradiating a pit, the laser is adequately reflected from an underlying reflecting surface, giving a high photodetector output.

In the past, various films were proposed as recording media to be used for these optical disks. Such films are chiefly inorganic materials including thin films of metals such as vacuum-deposited aluminum, thin films of bismuth and of tellurium oxide, and amorphous glass films of chalcogenite group. Generally, these films are responsive to rays of about 350–800 nm in wavelength and have high reflectance for laser beams, thus involving drawbacks such as a low efficiency of laser energy utilization.

For this reason and others, extensive studies have been made in recent years on organic thin films capable of altering some optical properties by irradiation with relatively long wavelength light (longer than about 780 nm). Such organic thin films are effective in that pits can be formed therein by means of a semiconductor laser of wavelength, for example, around 830 nm.

However, organic compounds having absorption maxima in a longer wavelength region are generally unstable to heat and additionally have some technical difficulties with respect to their sublimation property. Such being the case, it cannot be said that an organic thin film satisfactory in performance characteristics has been developed.

SUMMARY OF THE INVENTION

An object of this invention is to provide an optical recording medium and a process for making a record thereupon, said recording medium having an organic thin film capable of absorbing rays of longer wavelengths.

Another object of this invention is to provide an optical recording medium and a process for making a record thereupon, said recording medium having an organic thin film stable to heat.

These objects of this invention can be achieved with an optical recording medium comprising a substrate and an organic thin film containing at least one of the compounds severally represented by the following formulae (1)–(10).

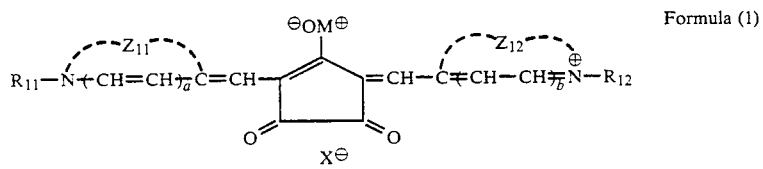

Formula (1)

In Formula (1), $R_{11}$ and $R_{12}$ each represent alkyl, substituted alkyl, cyclic alkyl, alkenyl, aralkyl, substituted aralkyl, aryl, or substituted aryl; $Z_{11}$ and $Z_{12}$ each represent a nonmetal atomic group necessary to complete a substituted or unsubstituted hetercocyclic ring; a and n are each 0 or 1; $M^{\oplus}$ represents a cation; and $X^{\ominus}$ represents an anion.

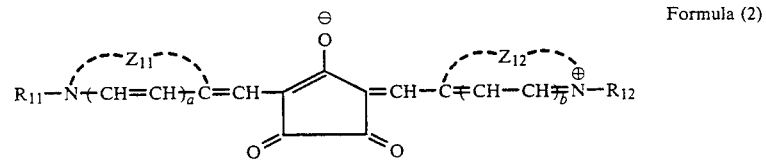

Formula (2)

In Formula (2), $R_{11}$ and $R_{12}$ each represent alkyl, substituted alkyl, cyclic alkly, alkenyl, aralkyl, substituted aralkyl, aryl, or substituted aryl; $Z_{11}$ and $Z_{12}$ each represent a nonmetal atomic group necessary to complete a substituted or unsubstituted heterocyclic ring; and a and b are each 0 or 1.

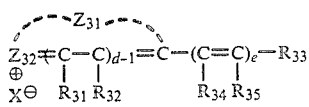

Formula (3)

In formula (3) $Z_{32}$ represents sulfur, oxygen or selenium;

$Z_{31}$ represents a hydrocarbon residue necessary to complete a prylium, thiapyrylirum, selenopyrylium, benzopyrylium, benzothiapyrylium, benzoselenopyrylium, naphthopyrylium, naphthothiapyrylium, or napthoselenopyrylium ring which may be substituted or not;

$R_{31}$ and $R_{32}$ each represent hydrogen or a substituted or unsubstituted alkyl, aryl, or styryl residue;

$R_{33}$ represents a substituted or unsubstituted aryl or heterocyclic residue;

$R_{34}$ and $R_{35}$ each represent hydrogen or alkyl;

$X^{\ominus}$ represents on anion;

d is 1 or 2;

e is 0, 1, or 2; wherein, when e is 2, the two $R_{34}$ are the same or different and the two $R_{35}$ are the same or different.

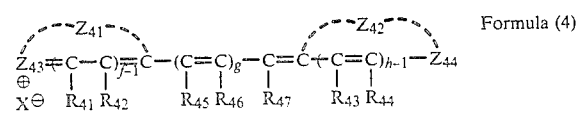

Formula (4)

In Formula (4), $Z_{43}$ and $Z_{44}$ each represent sulfur oxygen, or selenium;

$Z_{41}$ represents a hydrocarbon residue necessary to complete a pyrlium, thiapyrylium selenapyrylium, benzopyrylium, benyathrapyrylium, benzoselenopyrylium, naphthopyrylium, naphthothiopyrylium, or naphthoselenopyrylium ring which may be substituted or not;

$Z_{42}$ represents a hydrocarbon residue necessary to complete a pyrane thiapyrane selenapyrane, benzopyrane, benzothriapyrane benzoselenapyrane, naphthopyrane, naphthothiapyrane, or naphthiaselenapyrane ring which may be substituted or not;

$R_{41}$, $R_{42}$, $R_{43}$, and $R_{44}$ each represent hydrogen or substituted or unsubstituted alkyl or aryl residue;

$R_{45}$, $R_{46}$, and $R_{47}$ each represent hydrogen, halogen, or a substituted or unsubstituted alkyl, aryl, or aralkyl residue;

$X^{\ominus}$ represents an anion;

f and h are each 1 or 2; and g is 0, 1, or 2; wherein, when g is 2, the two $R_{45}$ are the same or different and the two $R_{46}$ are the same or different.

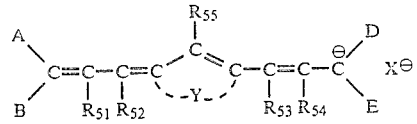

Formula (5)

In Formula (5), A, B, D, and E each represent aryl or substituted aryl;

$R_{51}$, $R_{52}$, $R_{53}$, $R_{54}$, and $R_{55}$ each represent hydrogen, halogen, or alkyl;

Y represents a divalent residue necessary to complete a 5- or 6-membered ring; and $X^{\ominus}$ represents an anion.

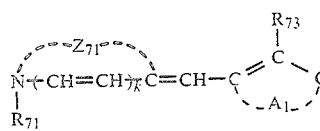

Formula (6)

In Formula (6), $R_{61}$, $R_{62}$, $R_{63}$, $R_{64}$, and $R_{65}$ each represent hydrogen, alkyl, substituted alkyl, cyclic alkyl, alkenyl, aralkyl, substituted aralkyl, aryl, substituted aryl, styryl, substituted styryl, heterocyclic, or substituted heterocyclic residue;

$X^{\ominus}$ represents an anion;

i is 0, or 1; and j is 0, 1, or 2.

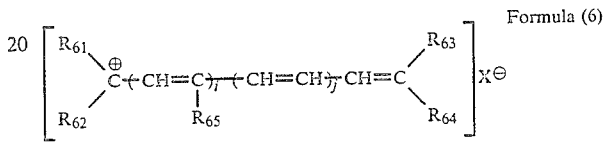

Formula (7)

In Formula (7), $Z_{71}$ and $Z_{72}$ each represent an atomic group necessary to complete a nitrogen-containing heterocyclic ring substituted or unsubstituted;

$A_1$ and $A_2$ each represent a divalent hydrocarbon residue necessary to complete a substituted or unsubstituted 5- or 6-membered ring;

$R_{71}$ and $R_{72}$ each represent hydrogen, alkyl, substituted alkyl, cyclic alkyl, alkenyl, aralkyl, or substituted aralkyl;

$R_{73}$ and $R_{74}$ each represent hydrogen or halogen;

$X^{\ominus}$ represents an anion;

k and m are each 0 or 1; and l is 1 or 2.

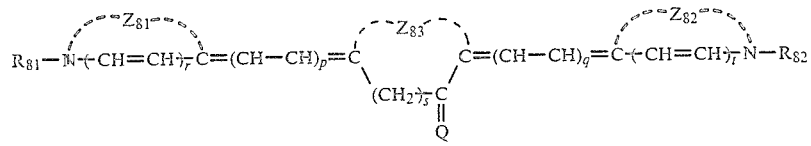

In Formula (8), $Z_{81}$ and $Z_{82}$ each represent an atomic group necessary to complete a nitrogen-containing heterocyclic ring substituted or unsubstituted;

$Z_{83}$ represents a divalent hydrocarbon residue necessary to complete a 5- or 6-membered ring;

$R_{81}$ and $R_{82}$ each represent hydrogen, alkyl, substituted alkyl, cyclic alkyl, alkenyl, aralkyl, or substituted aralkyl;

Q represents oxygen, sulfur, imino, substituted imino, or an organic divalent residue;

s, t, and r are each 0 or 1; and p and g are each 0, 1, or 2.

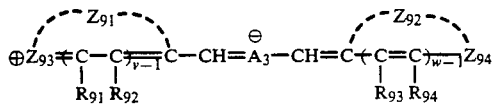

In Formula (9), $A^{63}{}_3$ represents

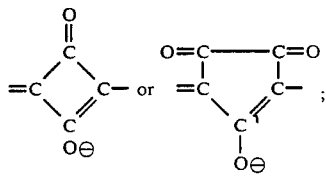

$Z_{93}$ and $Z_{94}$ each represent sulfur, oxygen, or selenium;

$Z_{91}$ represents an atomic group necessary to complete a pyrylium, thiapyrylium selenapyrylium, benzopyrylium, benzothiapyrylium, benzoselenapyrylium, naphthopyrylium, naphthothiapyrium or naphthoselena pyrylium ring which may be substituted or not;

$Z_{92}$ represents an atomic group necessary to complete a pyrane, thiaphrane selenapyrane, benzopyrane, bensothiapyrane, benzoselenapyrane, naphthopyrane, naphthathiapyrane, or naphthoselenapyrane ring which may be substituted or not;

$R_{91}$, $R_{92}$, $R_{93}$, and $R_{94}$ each represent hydrogen, alkyl, alkoxyl, or a substituted or unsubstituted aryl, styryl, 4-phenyl-1,3-butadienyl, or heterocyclic residue, where $R_{91}$ coupled with $R_{92}$ and $R_{93}$ coupled with $R_{94}$ can each form a substituted or unsubstituted benzene ring; and v and w are each 1 or 2.

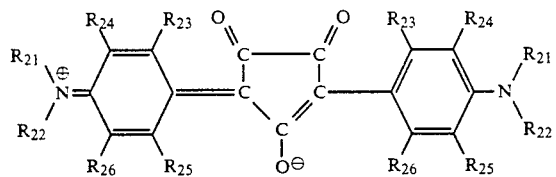

In Formula (10), $R_{21}$ and $R_{22}$ represent each alkyl, or $R_{21}$ and $R_{22}$ together with the nitrogen atom to which they are attached form a ring; and $R_{23}$, $R_{24}$, $R_{25}$, and $R_{26}$ each represent hydrogen, halogen, alkyl, alkoxy, or hydroxyl, where combinations of $R_{23}$ and $R_{24}$ and combinations of $R_{25}$ and $R_{26}$ can form each a benzene ring.

DETAILED DESCRIPTION OF THE PREFERRED EMBODIMENTS

Figure 1:
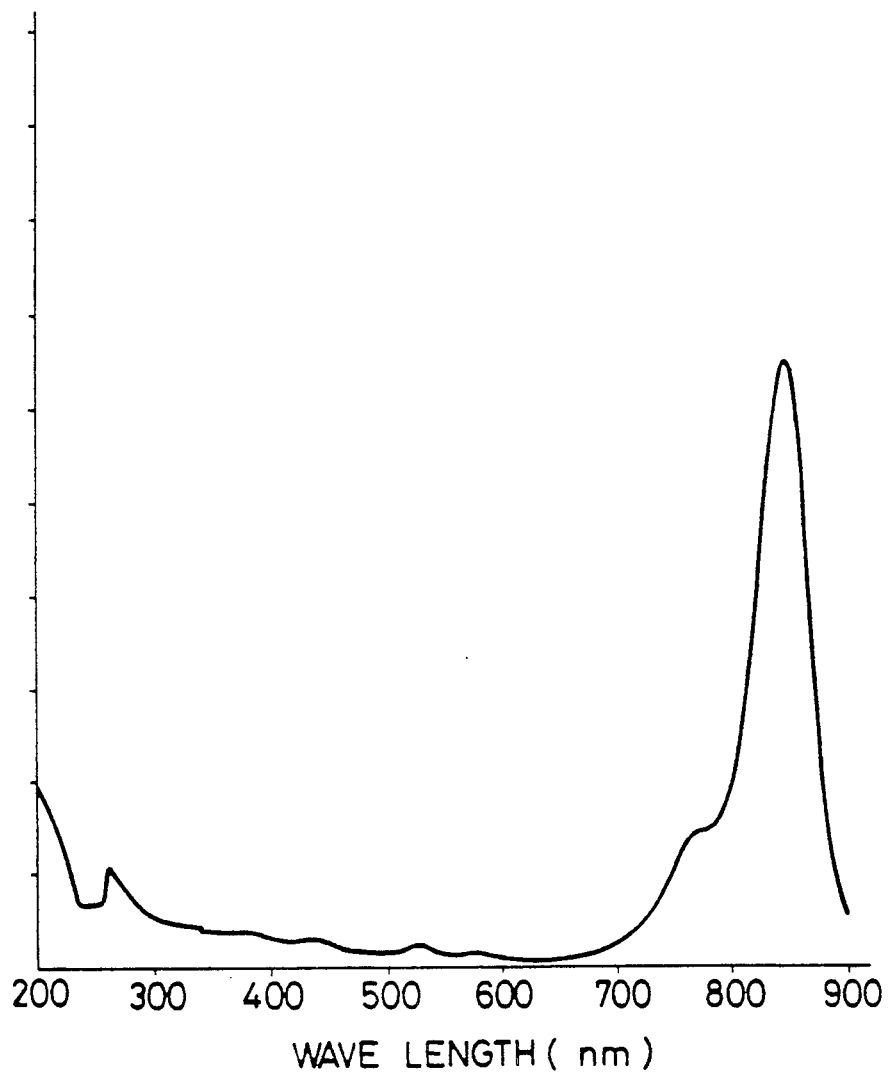
FIGS. 1 and 2 are absorption spectra of Compound Nos. I-(29) and IX-(1), respectively.

The optical recording medium of this invention is characterized by having an organic thin film that contains at least one of the dyes severally represented by the foregoing general formulae (1)-(10).

Referring to these formulae, the symbols therein are illustrated below in detail together with examples of the dyes represented by the formulae.

$R_{11}$ and $R_{12}$ in Formulae (1) and (2) each represent alkyl (e.g. methyl, ethyl, n-propyl, isopropyl, n-butyl, sec-butyl, isobutyl, t-butyl, n-amyl, t-amyl, n-hexyl, n-octyl, or t-octyl), substituted alkyl (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, 3-(acetylsulfamyl) propyl, or 4 (acetylsulfamyl)butyl), cyclic alkyl (e.g. cyclohexyl), alkenyl [e.g. allyl ($CH_2=CH-CH_2-$)], aralkyl (e.g. benzyl, phenethyl, 3-phenylpropyl, α-naphthylmethyl, or β-naphthylmethyl), substituted aralkyl (e.g. carboxybenzyl, sulfobenzyl, or hydroxybenzyl), aryl (e.g. phenyl) or substituted aryl (e.g. carboxyphenyl, sulfophenyl, or hydroxyphenyl). Of these organic residues, hydrophobic ones are particularly preferable in this invention.

$Z_{11}$ and $Z_{12}$ each represent a nonmetal atomic group necessary to complete a substituted or unsubstituted heterocyclic ring such as a thiazole family ring (e.g. thiazole, 4-methylthiazoie, 4-phenylthiazole, 5-methylthiazole, 5-phenylthiazole, 4,5-dimethylthiazole, 4,5-diphenylthiazole, or 4-(2-thienyl) thiazole), benzothiazole family ring (e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-di(hydroxymethyl)-benzothiazole, 5-hydroxybenzothiazole, 6-hydroxybenzothiazole, or 4,5,6,7-tetrahydrobenzothiazole), naphthothiazole family ring (e.g. naphtho(2,1-d) thiazole, naphtho(1,2-d)thiazole, 5-methoxynaphtho(1,2-d)thiazole, 5-ethoxynaphtho (1,2-d) thiazole, 8-methoxynaphtho (2,1-d)-thiazole, or 7-methoxynaphtho (2,1-d) thiazole), thionaphthene(7,6-d)thiazole family ring (e.g. 7-methoxythionaphthene(7,6-d)thiazole), oxazole family ring (e.g. 4-methyloxazole, 5-methyloxazole, 4-phenyloxazole, 4,5-diphenyloxazole, 4-ethyloxazole, 4,5-dimethyloxazole, or 5-phenyloxazole) , benzoxazole family ring (e.g. benzoxazole, 5-chlorobenzoxazole, 5-methylbenzoxazole, 5-phenylbenzoxazole, 6-methylbenzoxazole, 5-6-dimethylbenzoxazole, 5-methoxybenzoxazole, 6-methoxybenzoxazole, 5-hydroxybenzoxazole, or 6-hydroxybenzoxazole), naphthoxazole family ring (e.g. naphtho(2,1-d)oxazole or naphtho(1,2-d)oxazole), selenazole family ring (e.g. 4-methylselenazole or 4-phenyiselenazole), benzoselenazole family ring (e.g. benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-di(hydroxymethyl)benzoselenazole, 5-hydroxybenzoselenazole, or 4 , 5,6,7-tetrahydrobenzoselenazole], naphthoselenazole family ring (e.g. naphtho(2,1-d) selenazole or naphtho(1,2-d)selenazole], thiazoline family ring (e.g. thiazoline, 4-methylthiazoline, 4-hydroxymethyl-4-mehylthiazoline, or 4,4-bis (hydroxymethyl) thiazoline), oxazoline family ring (e.g. oxazoline), selena zoline family ring (e.g. selenazoline), 2-quinolyl family ring (e.g. quinoline, 6-methylquinoline, 6-chloroquinoline, 6-methoxyquinoline, 6-ethoxyquinoline, or 6-hydroxyquinoline), 4-quinolyl family ring (e.g. quinoline, 6-methoxyquinoline, 7-methylquinoline, or 8-methylquinoline), 1-isoquinolyl family ring (e.g. isoquinoline or 3,4-dihydroxyisoquinoline), 3-isoquinolyl family ring (e.g. isoquinoline), 3,3-dialkylindolenine family ring (e.g. 3 , 3-dimethylindolenine, 3,3-dimethyl-5-chloroindolenine, 3,3,5-trimethylindolenine, or 3,3,7-trimethylindolenine ), pyridine) family ring (e.g. pyridine or 5-methylpyridine), or benzimidazole family ring (e.g. 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-phenylbenzimidazole, 1-ethy]-5-fluorobenzimidazole, 1-ethyl-5-cyanobenzimidazole, 1- (β-acetoxyethyl)-5-cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl -5-carboxybenzimidazole, 1-ethyl-5-ethoxycarbonylbenzimidazole, 1-ethyl -5-sulfamylbenzimidazole, 1-ethyl-5-N-ethylsulfamylbenzimidazole, 1-ethyl-5,6-difluorobenzimidazole, 1-ethyl-5,6-dicyanobenzimidazole, 1-ethyl-5-ethylsulfonylbenzimidazole, 1-ethyl-5-methylsulfonylbenzimidazole, 1-ethyl-5-trifluoromethylbenzimidazole, 1-ethyl- 5-trifluoromethylsulfonylbenzimidazole, or 1-ethyl-5-trifluoromethylsulfinylbenzimidazole).

In Formulae (1) and (2), a and b are each 0 or 1.

In Formula (1) , $X^{\ominus}$ represents an anion (e.g. chloride, bromide, iodide, perchlorate, benzene-sulfonate, p-toluenesulfonate, methylsulfate, ethylsulfate, or propylsulfate anion). However, $X^{\ominus}$ is not contained in the formula when $R_{11}$ and/or $R_{12}$ itself has an anion (e.g. $-SO_3^{\ominus}$, $-OSO_3^{\ominus}$, $-COO^{\ominus}$, $-HNSO_2^{\ominus}$, $-SO_2-N^{\ominus}-CO-$, or $-SO_2-N^{\ominus}-SO_2-$). $M^{\oplus}$ represents a cation (e.g. proton, sodium ion, ammonium ion, potassium ion, or pyridinium ion).

Among the croconic methine dyes represented by Formula (1) or (2) , preferred ones are enumerated below. For convenience, structural formulae thereof are expressed in betaine form, though these dyes are generally obtained and used, as mixtures of betaine and salt forms.

| Compound No. | Croconi methine dyes<br>Chemical Formula |
|---|---|
| I-(1) | |
| I-(2) | |
| I-(3) | |
| I-(4) | |
| I-(5) | |

-continued
Croconi methine dyes
| Compound No. | Chemical Formula |
|---|---|
| I-(6) | 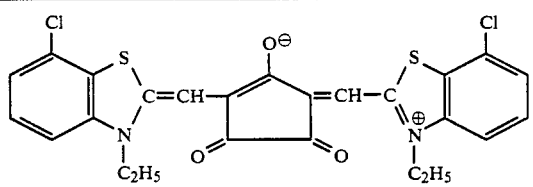 |
| I-(7) | 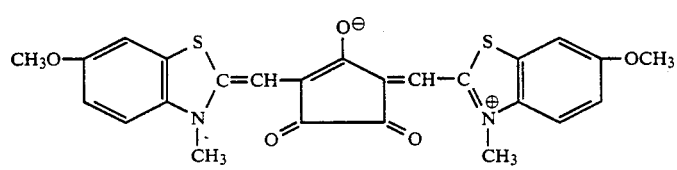 |
| I-(8) | 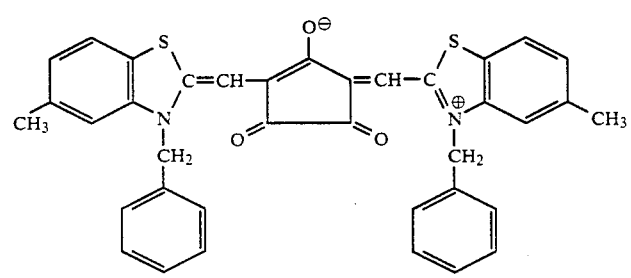 |
| I-(9) | 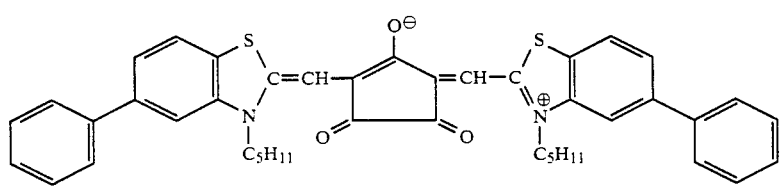 |
| I-(10) | 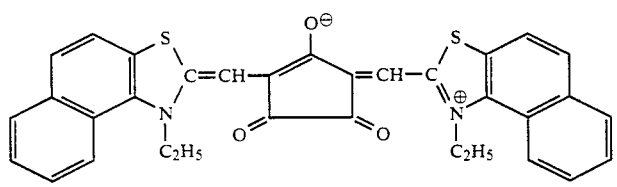 |
| I-(11) | 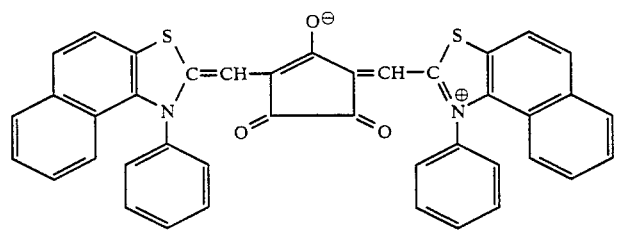 |
| I-(12) | 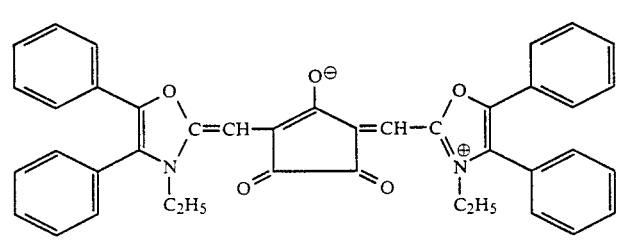 |

-continued
Croconi methine dyes
| Compound No. | Chemical Formula |
|---|---|
| I-(13) | 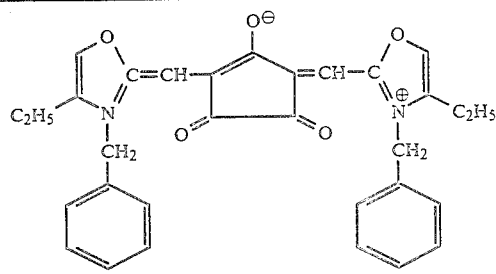 |
| I-(14) | 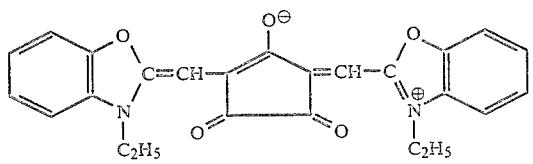 |
| I-(15) | 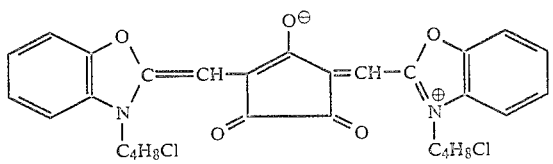 |
| I-(16) | 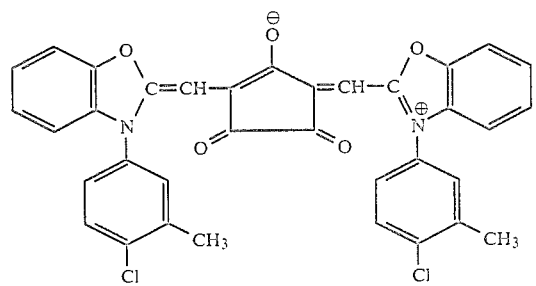 |
| I-(17) | 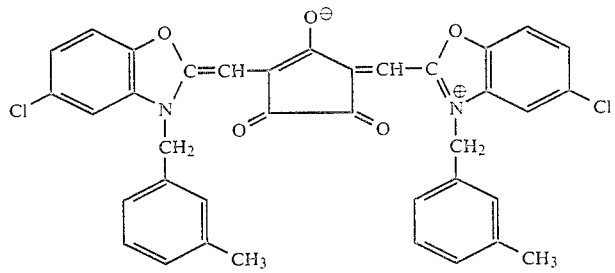 |
| I-(18) | 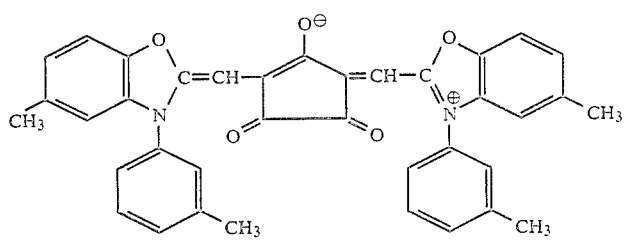 |
| I-(19) | 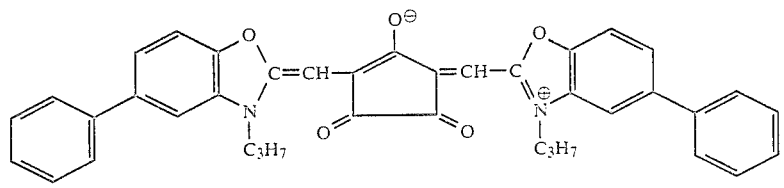 |

|                                | Croconi methine dyes |
| --- | --- |
| Compound No. | Chemical Formula |
| I-(20) | 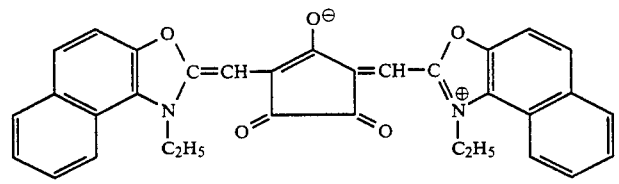 |
| I-(21) | 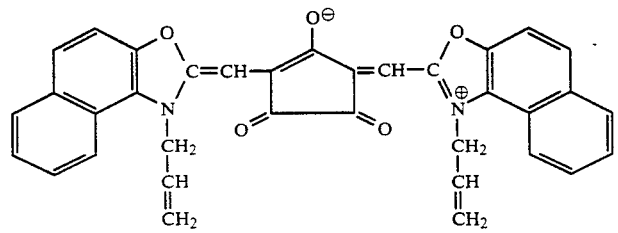 |
| I-(22) | 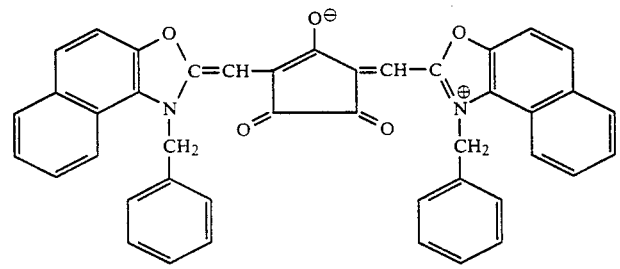 |
| I-(23) | 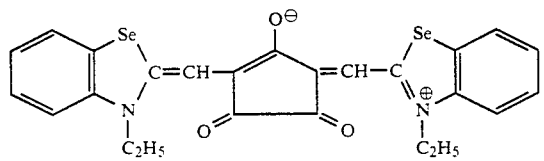 |
| I-(24) | 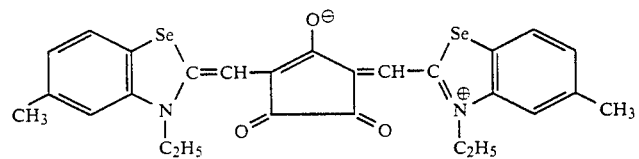 |
| I-(25) | 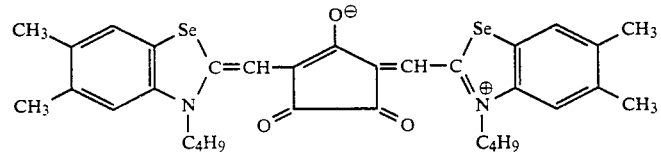 |
| I-(26) | 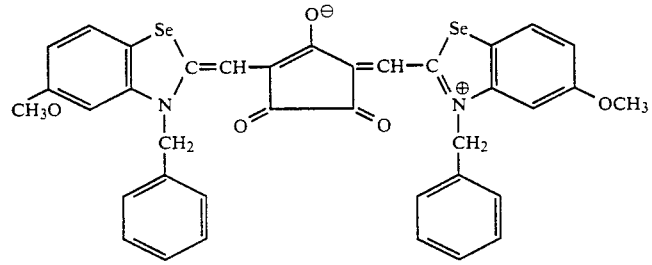 |

-continued

Croconi methine dyes

| Compound No. | Chemical Formula |
|---|---|
| I-(27) | |
| I-(28) | |
| I-(29) | |
| I-(30) | |
| I-(31) | |
| I-(32) | |
| I-(33) | |

-continued

| Compound No. | Croconi methine dyes Chemical Formula |
|---|---|
| I-(34) | (structure: CH₃—N-quinoline=CH—[croconate core with O⁻, O=, O=]=CH—quinoline-N⁺—CH₃) |

The dyes can be used in this invention separately or in combination.

As described in Japanese Patent Publication No. 41061/1976, these croconic methine dyes can be prepared, for instance, by condensation of croconic acid or its derivative (e.g. mono- or dialkyl croconate) with 2-methyl-cyclo quaternary ammonium salt, which is well known in the chemistry of cyanine dyes, or with the 2-methylene base corresponding thereto.

The preparation of a typical croconic methine dye used in this invention is illustrated by the following Preparation Example:

PREPARATION EXAMPLE 1

Synthesis of the Above-Cited Compound No. I-(2)

A mixture of 1.20 g (0.00845 mole) of croconic acid, 5.06 g (0.0169 mole) of quinaldine ethiodide, and 50 ml of n-butanol was heated up to 110° C., and, by adding 4 ml of pyridine, was reacted at 110°-116° C. for 10 minutes. After addition of 4 ml of triethylamine and stirring at the same temperature for 5 minutes, the mixture was allowed to stand to precipitate a dye, which was then filtered off, washed with n-butanol and successively with tetrahydrofuran, and dried under reduced pressure. Thus, 2.1 g (yield 55%) of a purified dye was obtained. The absorption spectrum of this dye in dimethylsulfoxide is shown in FIG. 1 ($\lambda$, max=845 run).

In Formula (3), $Z_{32}$ represents sulfur, oxygen, or selenium, and $Z_{31}$ represents a hydrocarbon residue necesary to complete a pyrylium, thiapyrylium, selenapyrylium, benzopyrylium, benzothiapyrylium, benzoselenapyrylium, naphthopyrylium, naphthothiapyrylium, or naphthoselenapyrylium ring which may be substituted or not. Suitable substituents on the ring include halogens such as chlorine, bromine, and fluorine; alkyls such as methyl, ethyl, propyl, isoropyl, butyl, t-butyl, amyl isoamyl, hexyl, octyl, nonyl, and dodecyl; aryls such as phenyl, 60 -naphthyl, and $\beta$-naphthyi; substituted aryis such as tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminphenyl, and dibenzylaminophenyl; styryl; and substituted styryls such as chlorostyryl, dimethylaminostyryl diethylaminostyryl, dipropylaminostyryl, dibutylaminostyryl, dibenzylaminostyryl , diphenylaminostyryl, methoxystyryl, and ethoxystyryl.

$R_{31}$ and $R_{32}$ each represent hydrogen; alkyl particularly a $C_1$-$C_{15}$ alkyl (e.g. methyl, ethyl, propyl, isopropyl, butyl, t-butyl, amyl, isoamyl, hexyl, octyl, nonyl, or dodecyl); aryl (e.g. phenyl, α-naphthyl, or β-naphthyl); substituted aryl (e.g. tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl bromophenyl, dibromophenyl , nitrophenyl, diethylaminophenyl, dimethylaminophenyl, or dibenzytaminophenyl); styryl; or substituted styryl (e.g. chlorostyryl, dichlorostyryl, methylstyryl, dimethyistyryl, methoxystyryl, ethoxystyryl, dimethylaminostyryl, diethylaminostyryl, dipropylaminostyryl, dlbutylaminostyryl, dibenzylaminosryryl, or diphenylaminostyryl).

$R_{33}$ represents substituted or unsubstituted aryl (e.g. phenyl , α-naphthyl, β-naphthyl, tolyl, xylyl, biphenyl, ehtylphenyl, diethylphenyl, methoxyphenyl, dimethoxyphenyl, trimethoxlyphenyl, ethoxyphenyl, diethoxyphenyl, amyloxyphenyl, hydroxyphenyl, chlorophenyl, dichiorophenyl, trichlorophenyl, bromophenyl, dibromophenyl, tribromphenyl, nitrophenyl, dimethylaminophenyl, diethylaminophenyl, dibenzylaminophenyl, or diphenylaminophenyl) , or substituted or unsubstituted heterocyclic residue (e.g. 3-carbazolyl, 9-methyl-3-carbazolyl, 9-ethyl-3-carbazolyl, 7-nitro-9-ethyl-3-carbazolyl, 2-pyridyl, 4-pyridyl, 2-quinolyl 4-quinolyl, 3-indolyl, 2-phenyl-3-indolyl, or 1-methyl-2-phenyl-3-indolyl).

$R_{34}$ and $R_{35}$ each represent hydrogen or alkyl (e.g. methyl, ethyl, propyl , butyl , amyl, hexyl, octyl or nonyl). The letter d is 1 or 2 and e is 0, 1, or 2. When e is 2, the two $R_{34}$ are the same or different and the two $R_{35}$ are the same or different. $X^{\ominus}$ represents an anion (e.g. perchlorate, fluoroborate, iodide, chloride, bromide, sulfate, periodate, or p-toluenesulfonate anion).

Typical pyrylium dyes represented by Formula (3 ) are as follows:

| Compound No. | Chemical Formula |
|---|---|
| II-(1) | (structure: naphtho[pyrylium O⁺]—CH=CH—phenyl, $ClO_4^{\ominus}$) |

-continued
| Compound No. | Chemical Formula |
|---|---|
| II-(2) | 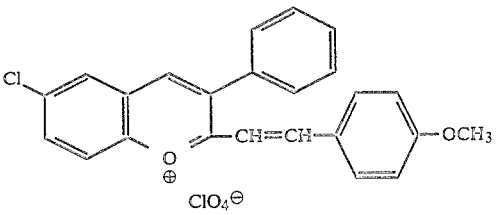 |
| II-(3) | 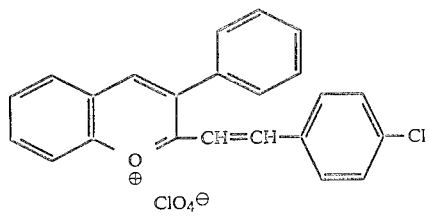 |
| II-(4) | 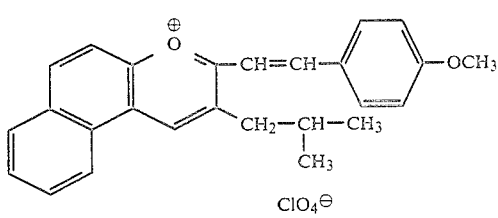 |
| II-(5) | 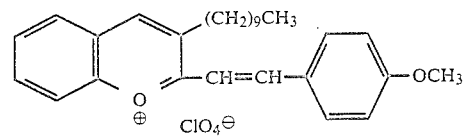 |
| II-(6) | 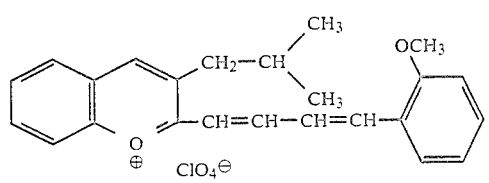 |
| II-(7) | 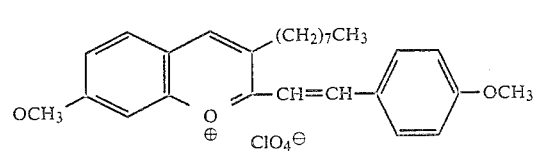 |
| II-(8) | 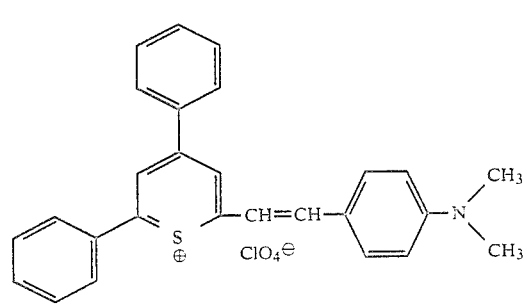 |

-continued

| Compound No. | Chemical Formula |
|---|---|
| II-(9) | |
| II-(10) | |
| II-(11) | |
| II-(12) | |
| II-(13) | |
| II-(14) | |

-continued

| Compound No. | Chemical Formula |
|---|---|
| II-(15) | |
| II-(16) | |
| II-(17) | |
| II-(18) | |
| II-(19) | |

-continued
| Compound No. | Chemical Formula |
|---|---|
| II-(20) | 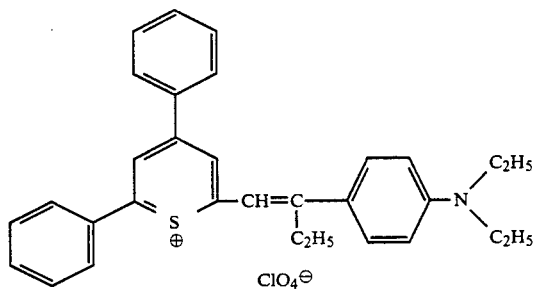 |
| II-(21) | 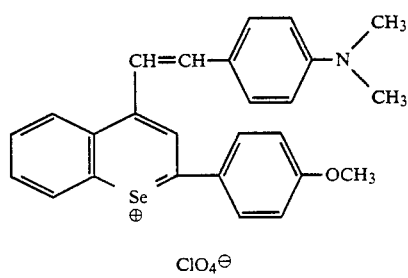 |
| II-(22) | 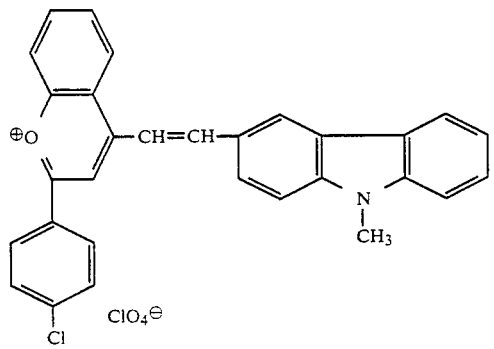 |
| II-(23) | 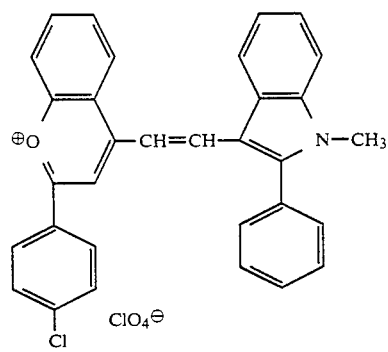 |
| II-(24) | 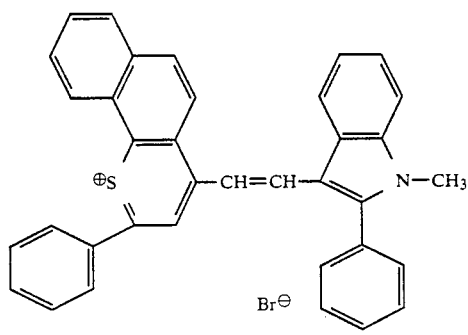 |

| Compound No. | Chemical Formula |
|---|---|
| II-(25) | 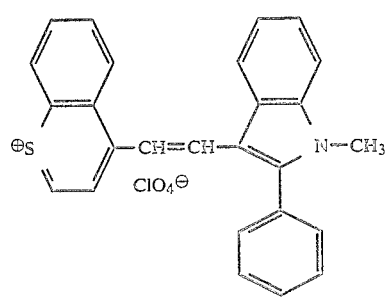 |
| II-(26) | 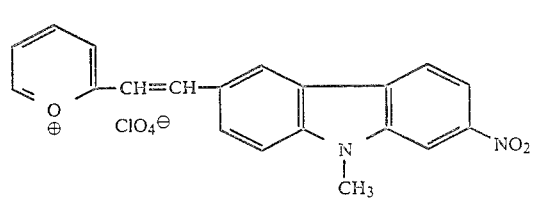 |
| II-(27) | 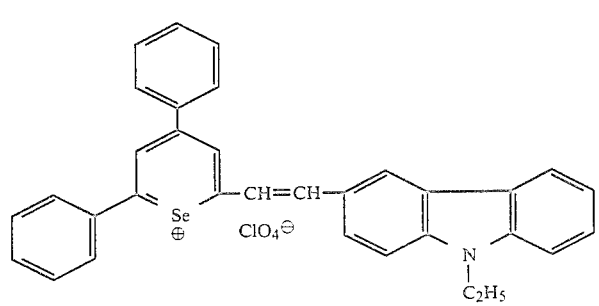 |
| II-(28) | 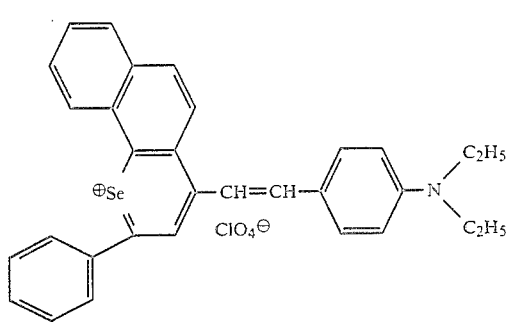 |
| II-(29) | 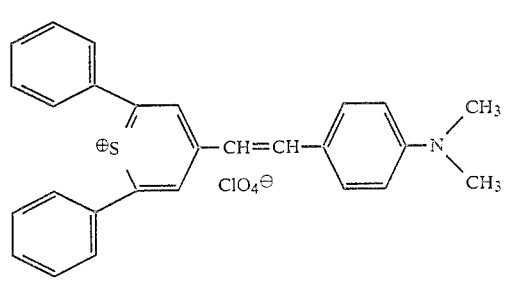 |

| Compound No. | Chemical Formula |
|---|---|
| II-(30) | 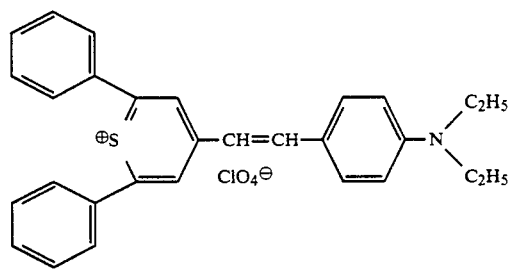 |
| II-(31) | 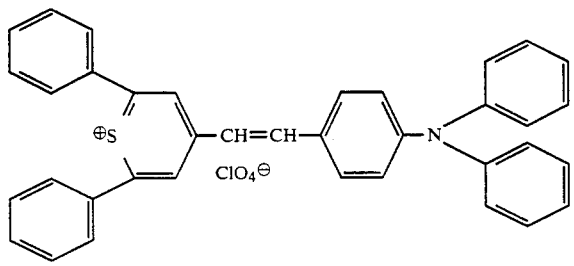 |
| II-(32) | 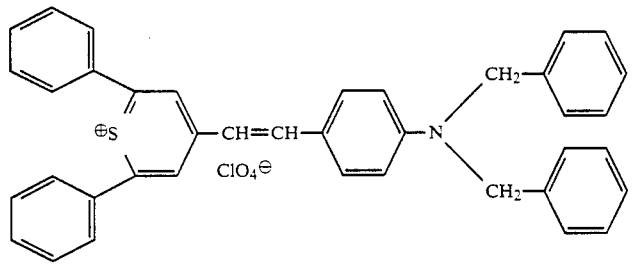 |
| II-(33) | 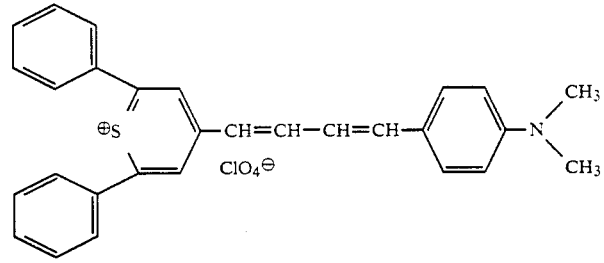 |
| II-(34) | 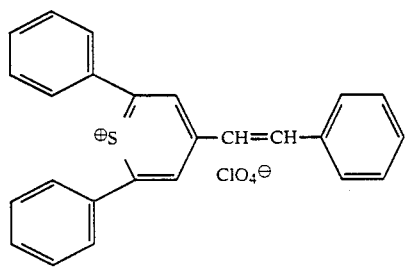 |

| Compound No. | Chemical Formula |
|---|---|
| II-(35) | 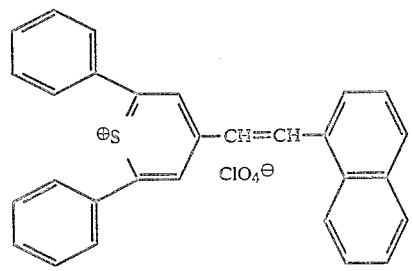 |
| II-(36) | 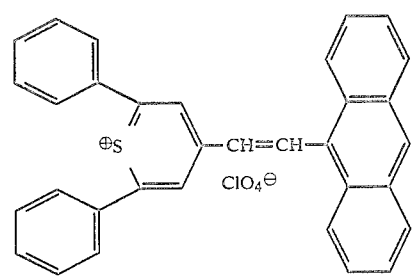 |
| II-(37) | 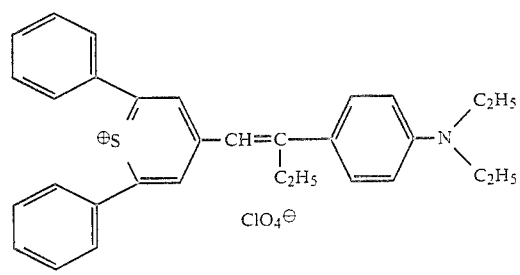 |
| II-(38) | 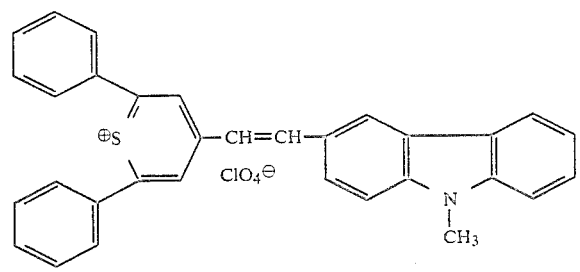 |
| II-(39) | 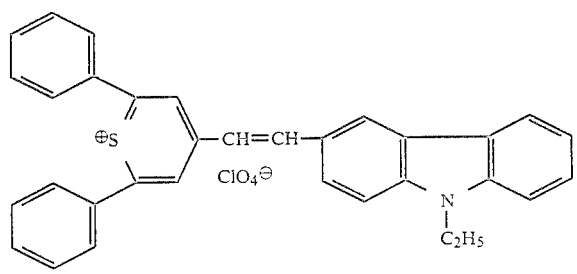 |

| Compound No. | Chemical Formula |
|---|---|
| II-(40) | 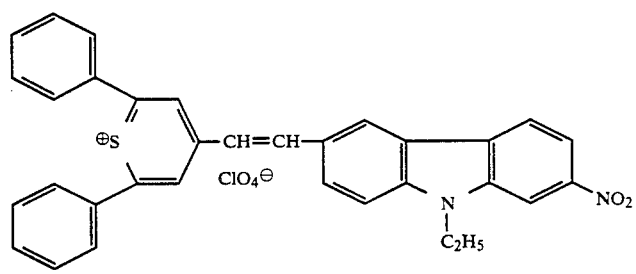 |
| II-(41) | 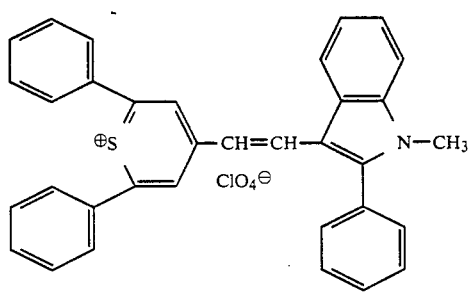 |
| II-(42) | 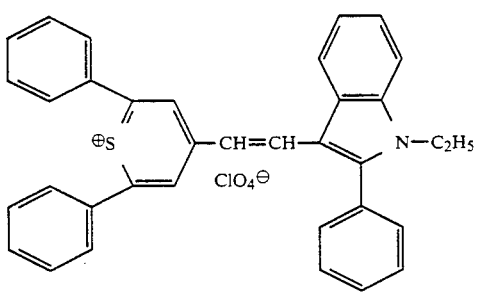 |
| II-(43) | 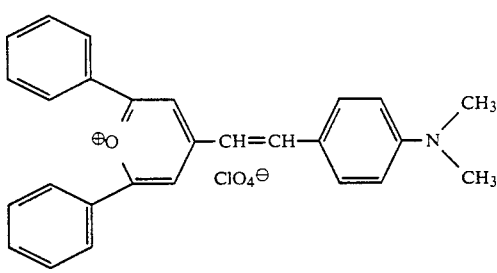 |
| II-(44) | 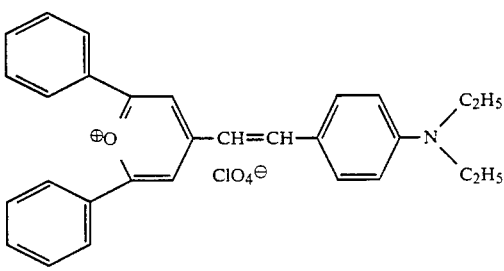 |

-continued
| Compound No. | Chemical Formula |
|---|---|
| II-(45) | 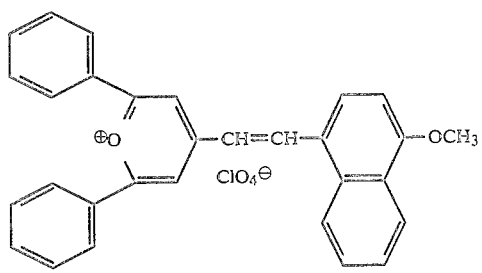 |
| II-(46) | 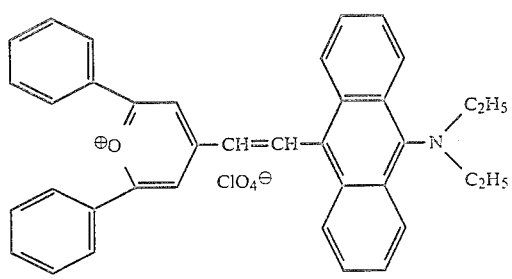 |
| II-(47) | 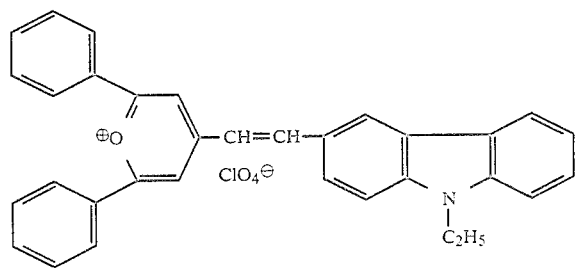 |
| II-(48) | 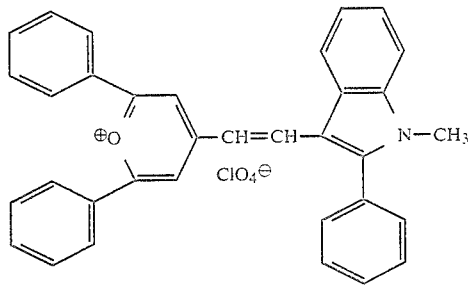 |
| II-(49) | 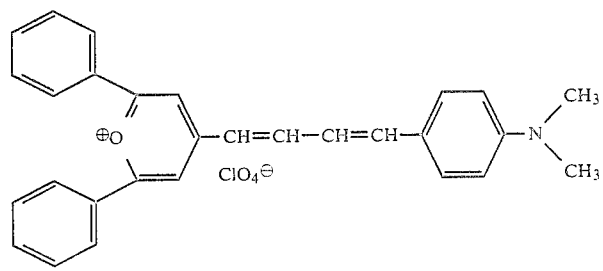 |

-continued
| Compound No. | Chemical Formula |
|---|---|
| II-(50) | 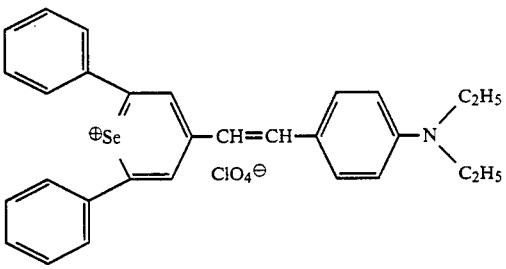 |
| II-(51) | 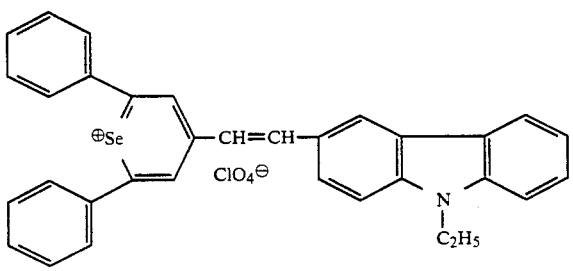 |
| II-(52) | 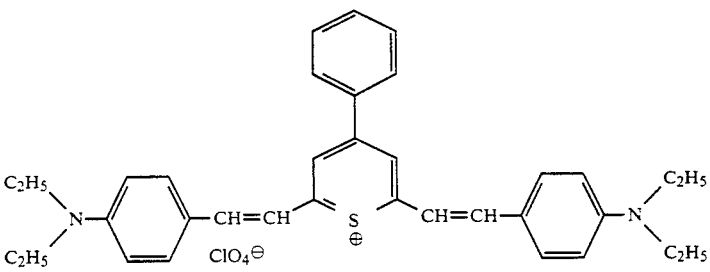 |
| II-(53) | 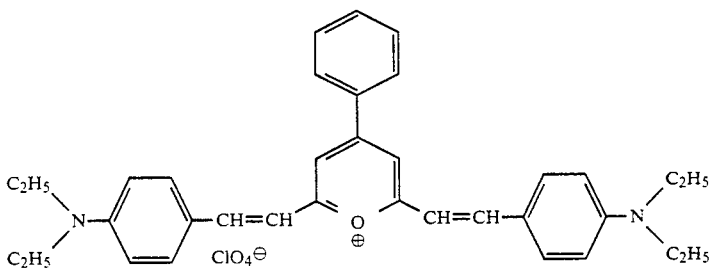 |
| II-(54) | 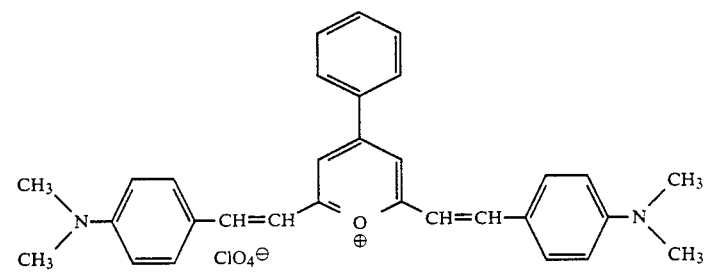 |
| II-(55) | 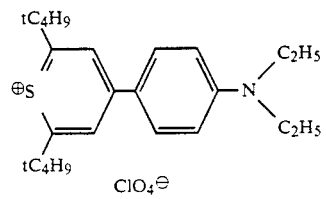 |

Pyrylium dyes of this invention can be obtained by reacting, for example, a salt of 2,6-diphenyl-4-methylthiapyrylium with 4-diethylaminobenzaldehyde. This reaction can be conducted in the presence of an amine or in a carboxylic acid anhydride. i) Reaction in the presence of amine: Though various solvents are acceptable for this reaction, suitable ones are alcohols such as ethanol, nitriles such as acetonitrile, ketones such as methyl ethyl ketone, nitro compounds such as nitrobenzene, halogenated hydrocarbons such as tetrachloroethane, etc., preferred ones of which are alcohols such as ethanol.

Suitable amines in this case are primary, secondary and tertiary alkyl. amines having 1–25 carbon atoms, such as piperidine, triethylamine, and hexylamine; aromatic amines having 6–25 carbon atoms, such as aniline and dimethylaniline; and nitrogen-containing unsaturated heterocyclic compounds such as pyridine and quinoline.

The amount of amine used ranges from 0.1 to 10 moles, preferably from 0.5 to 2 moles, per mole of the thiapyrylium salt. Sometimes, the amine is used in large excess also as a solvent. The reaction is carried out for 30 minutes–10 hours, preferably for 1–3 hours, at temperatures of about 50° C. to about the reflux temperature of the amine or the solvent, preferably at temperatures around the reflux temperature. The amount of the solvent ranges from 1 to 100 ml, preferably from 3 to 10 ml, for 1 g of the salt of 2,6-diphenyl-4-methylthiapyrylium. ii) Reaction in carboxylic acid anhydride: The amount of carboxylic acid anhydride, for example in the case of acetic anhydride, ranges from 1 to 20 ml, preferably from 2 to 10 ml, for 1 g of the salt of 2,6-diphenyl-4-methylthiapyrylium. The reaction is carried out for 1 minute to 1 hour, preferably for 3 to 20 minutes, at temperatures of about 80° C. to about the reflux temperature of the acid anhydride (140° C. in the case of acetic anhydride), preferably at about 100° C.

Preparation examples are given below referring to typical pyrylium salts used in this invention.

PREPARATION EXAMPLE 2

Synthesis of a Pyrylium: the Above-Cited Compound No. II-(45)

A mixture of 5.0 g of 2,6-diphenyl-4-methlylpyrylium perchlorate and 3.7 g of 4-dimethylaminobenzaldehyde was heated in 140 ml of acetic anhydride at 95° C. for 20 minutes. The mixture was left to cool, and the precipitate obtained by filtration was recrystallized from a 1:1 acetic acid-acetic anhydride mixture, thus giving 1.8 g of a dye; m. p. 271°–272° C.

Analysis for $C_{27}H_{24}O_5NCl$:
Calcd (%); C, 67.85; H, 5.07; N, 2.93.
Found (%); C, 68.01; H, 5.11, N, 2.88.

PREPARATION EXAMPLE 3

Synthesis of a Thiapyrylium: the Above-Cited compound No. II-(29)

In 150 ml of acetone was dispersed 1.4 g of the pyrylium [compound No. II-(45)] obtained in Preparation Example 2. A solution of 1 g of sodium sulfide in 10 ml of water was added thereto. The mixture was stirred for 2 minutes and further for 1 hour with 15 ml of 20% aqueous perchloric acid and 150 ml of water. After standing, the resulting precipitate was filtered off and re. crystallized from 1:1 acetic acid-acetic anhydride mixture, thus giving 1.1 g of a dye; m.p. 277°–281.5° C.

Analysis for $C_{27}H_{24}O_4NClS$:
Calcd (%): C, 65.64; H, 4.91.
Found (%): C, 65.88; H, 4.84; S, 6.56.

In Formula (4), $Z_{43}$ and $Z_{44}$ each represent sulfur, oxygen, or selenium; $Z_{41}$ represents a hydrocarbon residue necessary to complete a pyrylium, thiapyrylium, selenapyrylium, benzopyrylium, benzothisapyrylium benzoselenapyrylium, naphthopyrylium, naphthothiapyrylium, or naphthoselenapyrylium ring which may be substituted or not; and $Z_{42}$ represents a hydrocarbon residue necessary to complete a pyrane, thiapyrane, selenapyrane, benzopyrane, benzothiapyrane, benzoselenayrane, naphthopyrane, naphthothiapyrane, or naphthoselenapyrane ring which may be substituted or not. Suitable substituents on these rings include halogens (e.g. chlorine, bromine, and fluorine), alkyls (e.g. methyl, ethyl, propyl, isopropyl, butyl, t-butyl, amyl, isoamyl, hexyl, octyl, nonyl, and dodecyl), alkoxyls (e.g. methoxy, ethoxy, propoxy, butoxy, amyloxy, hexoxy, and octoxy), aryls (e.g. phenyl, α-naphthyl, and β-naphthyl), and substituted aryls (e.g. tolyl, xylyl, biphenyl, ethylphenyl, methoxyphenyl, ethoxyphenyl, amyloxyphenyl, dimethoxyphenyl, diethoxyphenyl, hydroxlphenyl, chlorophenyl, dichlorophenyl, bromophenyl, dibromophenyl, nitrophenyl, diethylaminophenyl dimethylaminophenyl and dibenzylaminophenyl).

$R_{41}$, $R_{42}$, $R_{43}$, and $R_{44}$ each represent hydrogen, alkyl particularly a $C_1$–$C_{15}$ alkyl (e.g. methyl ethyl propyl, isopropyl, butyl, t-butyl, amyl, isoamyl, hexyl, octyl, nonyl, or dodecyl), aryl (e.g. phenyl, α-naphthyl, or β-naphthyl), or substituted aryl (e.g. tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, or dibenzylaminophenyl).

$R_{45}$, $R_{46}$, and $R_{47}$ each represent hydrogen, halogen (e.g. chlorine, bromine, or fluorine), alkyl or substituted alkyl (e.g. methyl, ethyl, propyl, butyl, amyl, hydroxyethyl, methoxyethyl, or carboxypropyl), aryl or substituted aryl (e.g. phenyl, tolyl, xylyl, hydroxyphenyl, carboxyphenyl, α-naphthyl, or β-naphthyl), or aralkyl or substituted aralkyl (e.g. benzyl, phenethyl, 3-phenylpropyl, methoxybenzyl, or methylbenzyl).

$X^\ominus$ represents an anion (e.g. perchlorate, fluoroborate, iodide, chloride, bromide, sulfate, periodate, or p-toluene-sulfonate anion).

The letters f and h are each 1 or 2 and g is 0, 1, or 2 When g is 2, the two $R_{45}$ may be the same or different and the two $R_{46}$ may be the same or different.

Typical pyrylium dyes represented by Formula (4) are as follows:

| Compound No. | Chemical Formula |
|---|---|
| III-(1) | 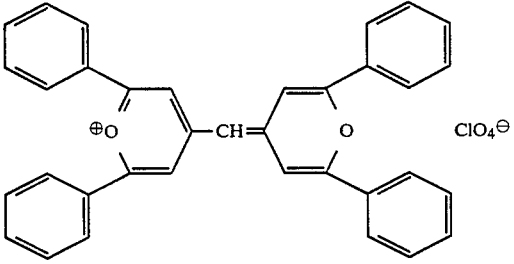 |
| III-(2) | 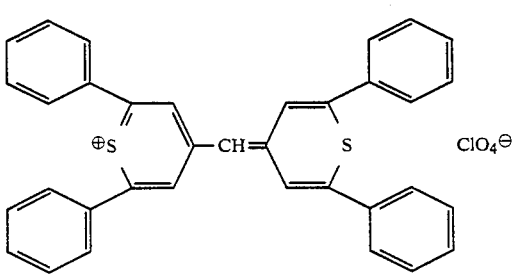 |
| III-(3) | 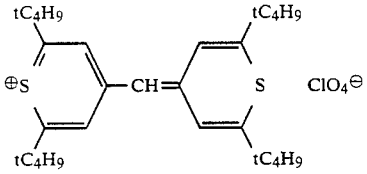 |
| III-(4) | 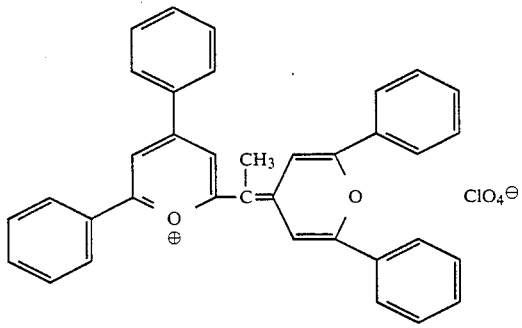 |
| III-(5) | 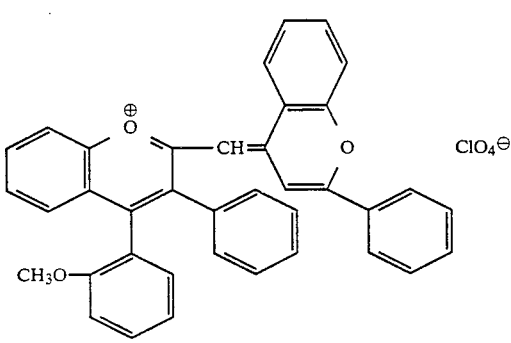 |

-continued
| Compound No. | Chemical Formula |
|---|---|
| III-(6) | 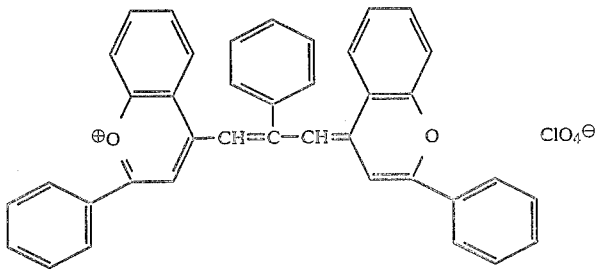 ClO$_4^\ominus$ |
| III-(7) | 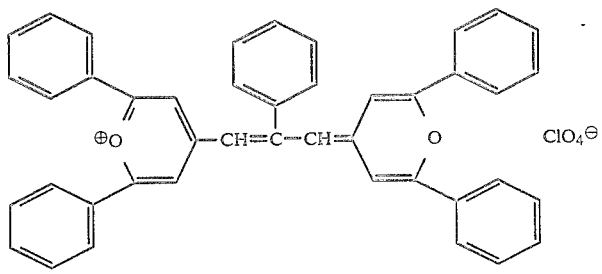 ClO$_4^\ominus$ |
| III-(8) | 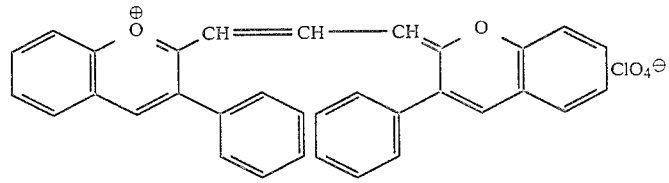 ClO$_4^\ominus$ |
| III-(9) | 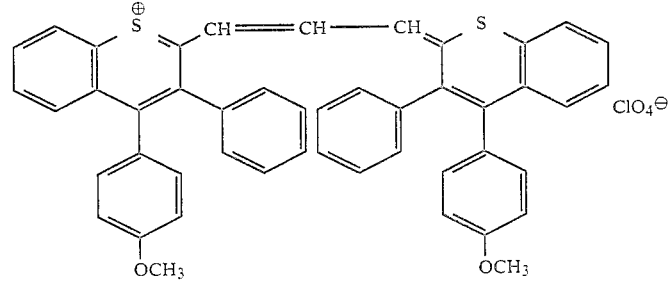 ClO$_4^\ominus$ |
| III-(10) | 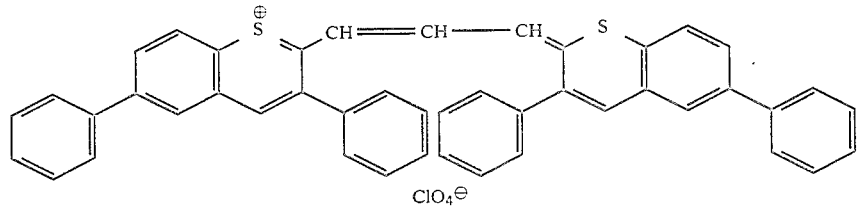 ClO$_4^\ominus$ |
| III-(11) | 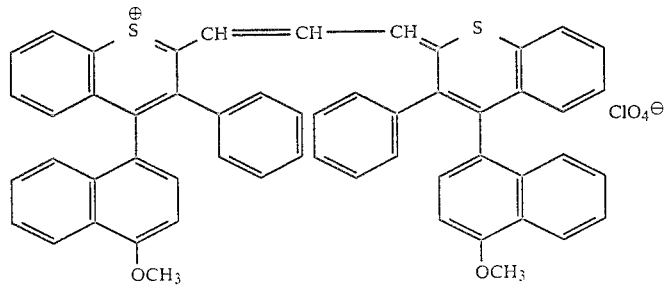 ClO$_4^\ominus$ |

| Compound No. | Chemical Formula |
|---|---|
| III-(12) | |
| III-(13) | |
| III-(14) | |
| III-(15) | |
| III-(16) | |
| III-(17) | |

-continued
| Compound No. | Chemical Formula |
|---|---|
| III-(18) | 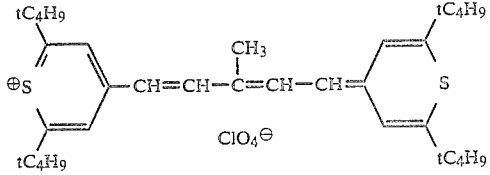 |
| III-(19) | 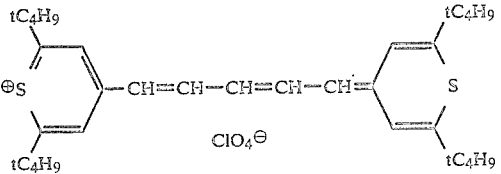 |
| III-(20) | 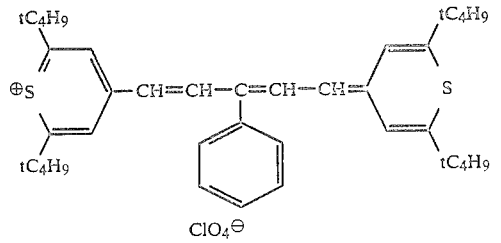 |
| III-(21) | 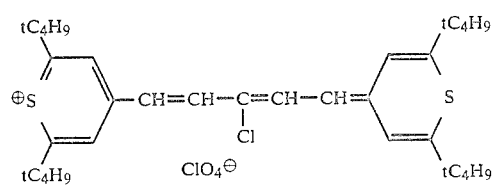 |
| III-(22) | 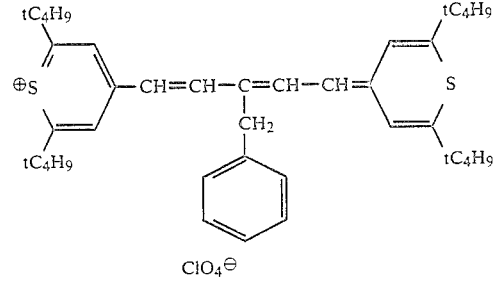 |
| III-(23) | 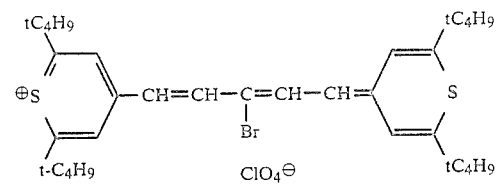 |
| III-(24) | 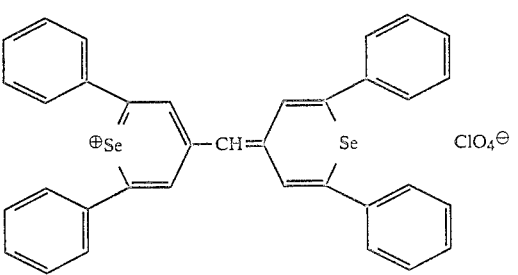 |

These compounds can be prepared according to a method described in, for example, U.S. Pat. No. 4315983.

In Formula (5), which represents polymethine dyers; A, B, D, and E each represent aryl or substituted aryl (e.g. phenyl, tolyl, xylyl, ethylphenyl, chlorophenyl, dichlorophenyl, trichlorophenyl, bromophenyl, dibromophenyl, nitrophenyl, methoxyphenyl, ethoxyphenyl, dimethyminophenyl, diethylaminophenyl, dipropylaminophenyl, dibenzylaminophenyl, or diphenylaminophenyl); $R_{51}$, $R_{52}$, $R_{53}$, $R_{54}$ and $R_{55}$ each represent hydrogen, halogen (e.g. chlorine or bromine), or alkyl (e.g. methyl, ethyl, propyl, butyl, or amyl); Y represents a divalent residue (e.g. ethylene, propylene, or o-phenylene) necessary to complete a 5- or 6-membered ring; and $X^{\ominus}$ represents an anion (e.g. perchlorate, fluoroborate, iodide, chloride, bromide, or p-toluenesulfonate anion).

Typical polymethine dyes represented by Formula (5) are shown below.

| Compound No. | Chemical Formula |
|---|---|
| IV-(1) | 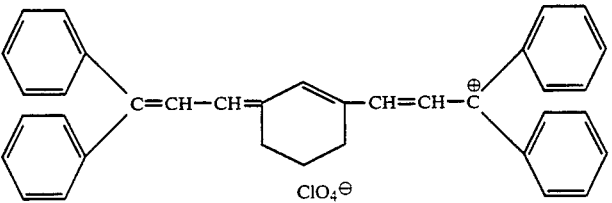 |
| IV-(2) | 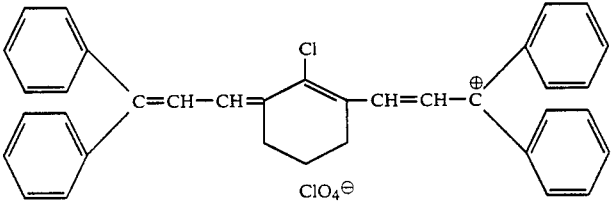 |
| IV-(3) | 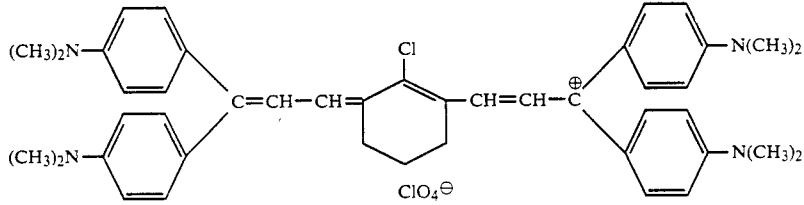 |
| IV-(4) | 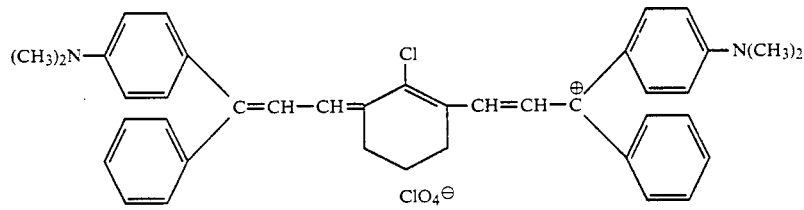 |
| IV-(5) | 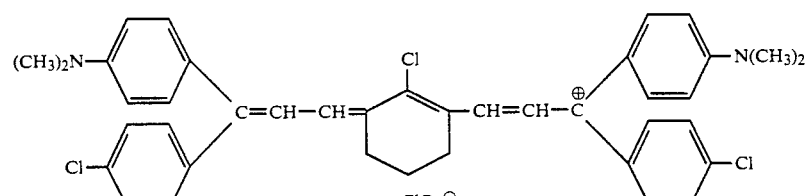 |
| IV-(6) | 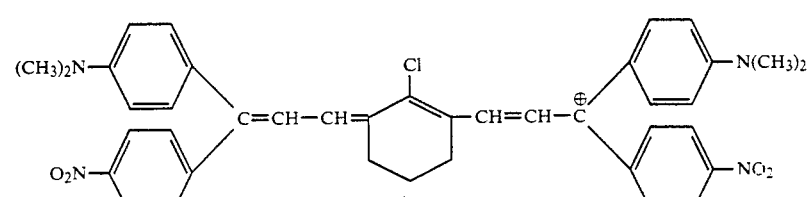 |

-continued
| Compound No. | Chemical Formula |
|---|---|
| IV-(7) | 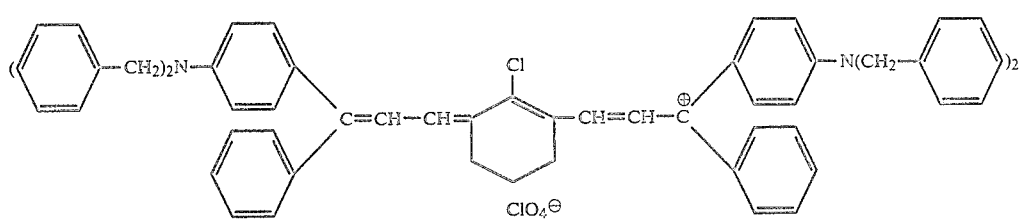 |
| IV-(8) | 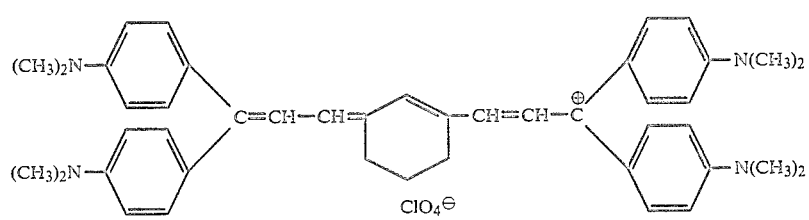 |
| IV-(9) | 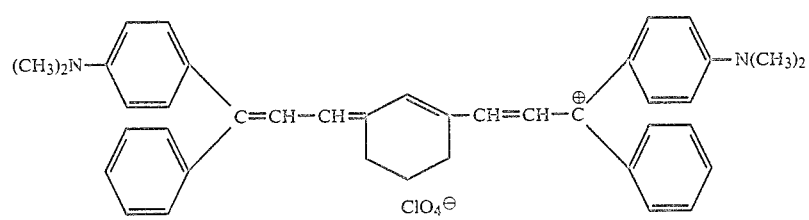 |
| IV-(10) | 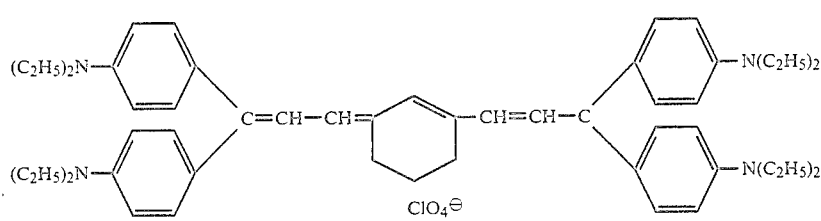 |
| IV-(11) | 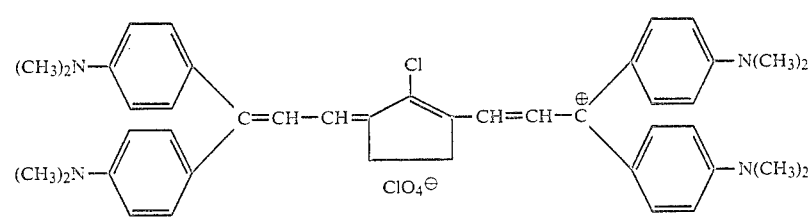 |
| IV-(12) | 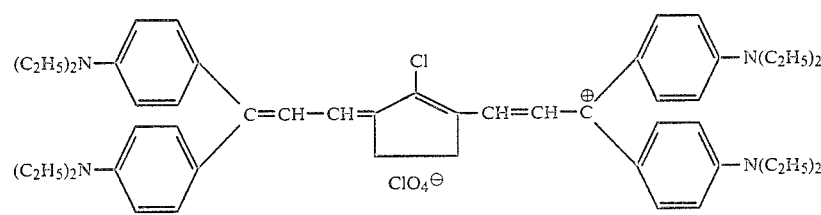 |
| IV-(13) | 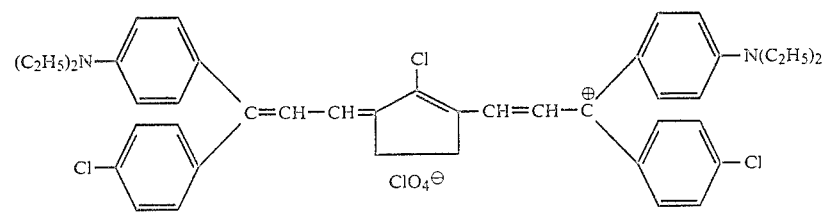 |

-continued
| Compound No. | Chemical Formula |
|---|---|
| IV-(14) | 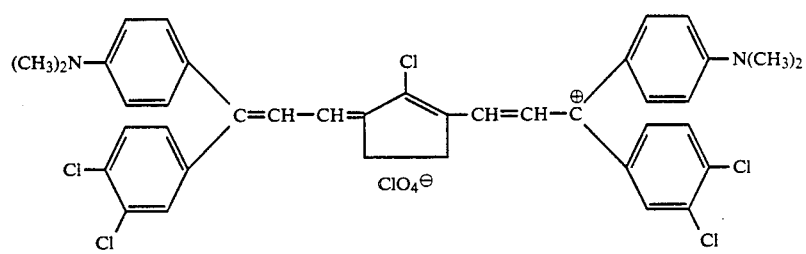 |
| IV-(15) | 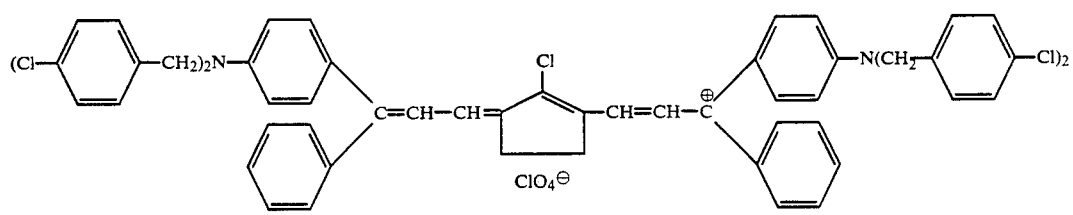 |
| IV-(16) | 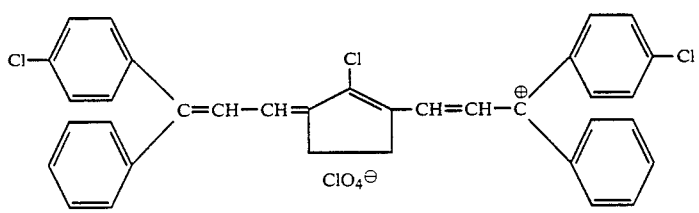 |
| IV-(17) | 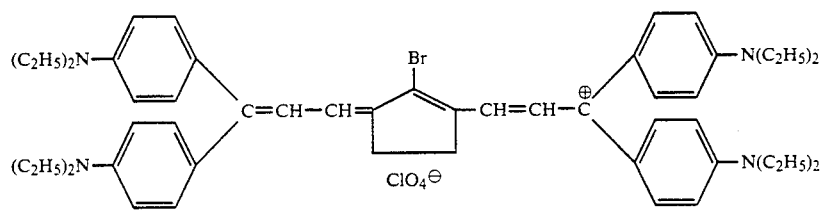 |
| IV-(18) | 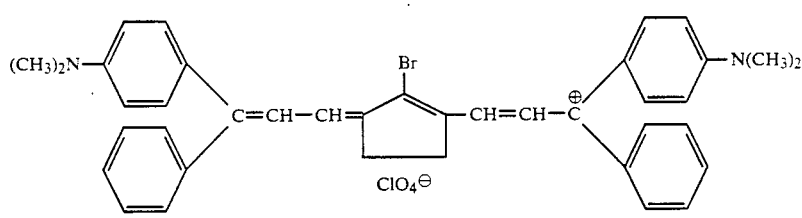 |
| IV-(19) | 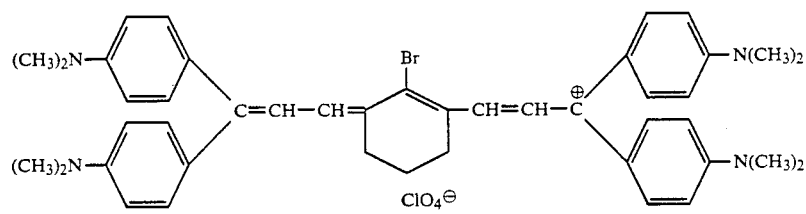 |
| IV-(20) | 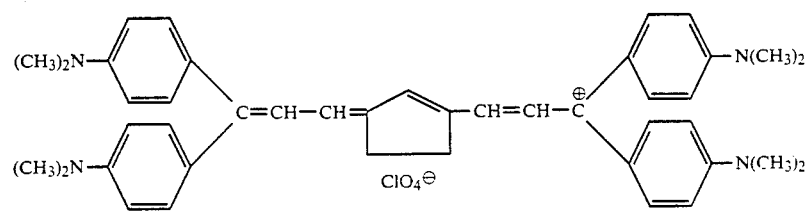 |

-continued
| Compound No. | Chemical Formula |
|---|---|
| IV-(21) | 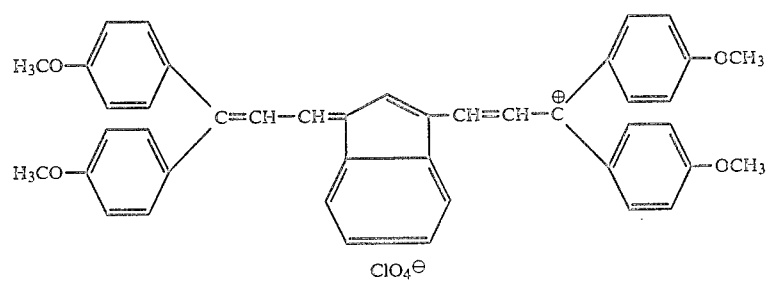 |
| IV-(22) | 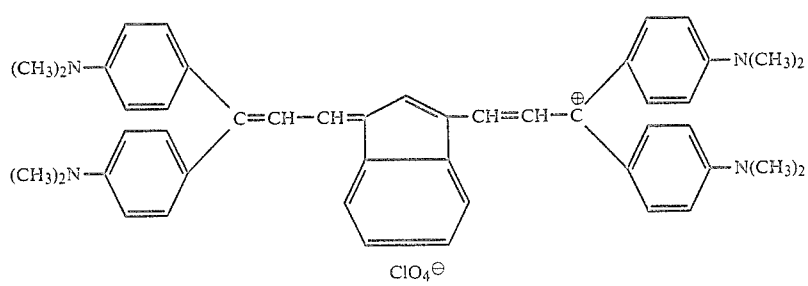 |
| IV-(23) | 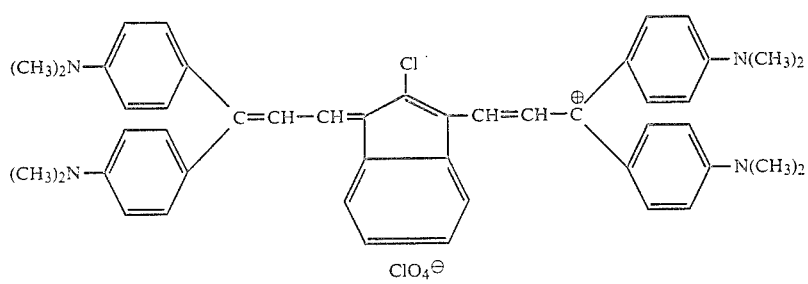 |
| IV-(24) | 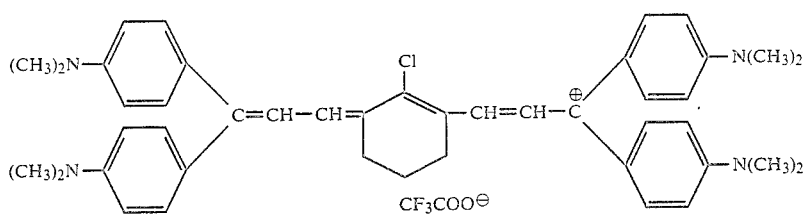 |
| IV-(25) | 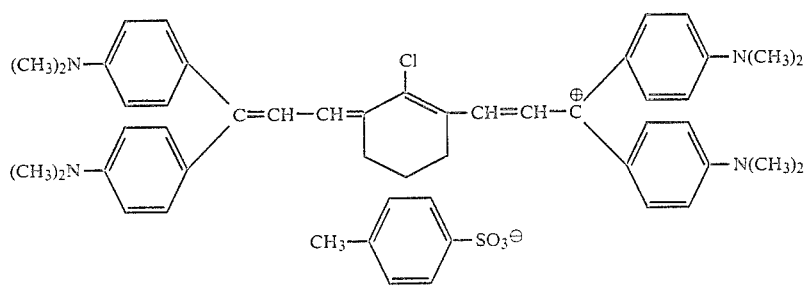 |

| Compound No. | Chemical Formula |
|---|---|
| IV-(26) | 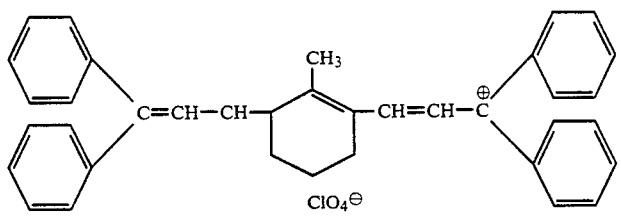 |

These polymethine dyes can be prepared according to a method described in, for example, Japanese Patent No. 8149/1981.

In Formula (6), which represents polymethine dyes, $R_{61}$, $R_{62}$, $R_{63}$, $R_{64}$, and $R_{65}$ each represent hydrogen, alkyl (e.g. methyl, ethyl, n-propyl, isopropyl, n-butyl, sec-butyl, isobutyl, t-butyl, n-amyl, t-amyl, n-hexyl, n-octyl, or t-octyl), substituted alkyl (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)carbamylmethyl, 3-(acetylsulfamyl)propyl, or 4-(acetylsulfamyl)butyl), cycloalkyl (e.g. cyclohexyl), alkenyl (e.g. allyl-)$CH_2$=CH—$CH_2$-)), aralkyl (e.g. benzyl, phenethyl, α-naphthyl, or βB-naphthyl), substituted aralkyl (e.g. carboxybenzyl, sulfobenzyl, or hydroxybenzyl), aryl or substituted aryl (e.g. phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, dibenzylaminophenyl, or diphenylaminophenyl), substituted or unsubstituted heterocyclic residue (e.g. pyridyl, quinolyl, lepidyl, methylpyridyl, furyl, thienyl, indolyl, pyrrolyl, carbazolyl, or N-ethylcarbazolyl), or styryl or substituted styryl (e.g. methoxystyryl, dimethoxystyryl, trimethoxystyryl, ethoxystyryl, dimethylaminostyryl, diethylaminostyryl, dipropylaminostyryl, dibenzylaminostyryl, diphenylaminosyryl, 2,2-diphenylvinyl, 2-phenyl-2-methylvinyl, 2-dimethylaminophenyl-2-phenylvinyl, 2-diethylaminophenyl-2-phenylvinyl, 2-dibenzylaminophenyl-2-phenylvinyl, 2,2-di (diethylaminophenyl) vinyl, 2,2-di(methoxyphenyl) vinyl, 2,2-di(ethoxyphenyl) vinyl, 2-dimethylaminophenyl-2-methylvinyl, or 2-diethylaminophenyl-2-ethylvinyl, i is 0 or 1, j is 0, 1, or 2; and $X^{\ominus}$ represents an anion (e.g. chloride, bromide, iodide, perchlorate, benzenesulfonate, p-toluenesulfonate, methylsulfate, ethylsulfate, or propylsulfate anion).

Typical examples of the polymethine compounds represented by Formula (6) are given below.

| Compound No. | Chemical Formula |
|---|---|
| V-(1) | 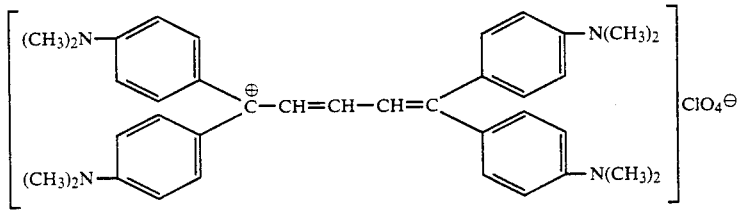 |
| V-(2) | 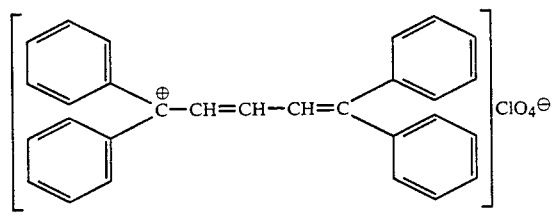 |
| V-(3) | 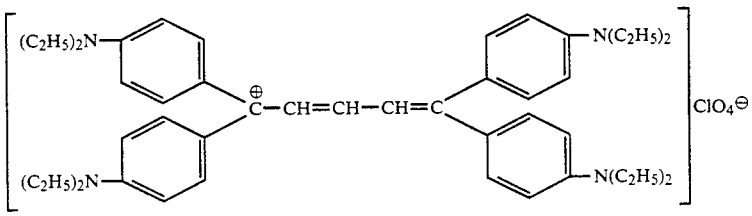 |

-continued

| Compound No. | Chemical Formula |
|---|---|
| V-(4) | [Bis(4-methoxyphenyl)methylium]-CH=CH-CH=C-[bis(4-methoxyphenyl)] ClO₄⁻ |
| V-(5) | [Bis(4-diethylaminophenyl)C⁺-(CH=CH)₂-CH=C-bis(4-diethylaminophenyl)] ClO₄⁻ |
| V-(6) | [Bis(2,4-diethoxyphenyl)C⁺-(CH=CH)₂-CH=C-bis(2,4-diethoxyphenyl)] ClO₄⁻ |
| V-(7) | [(4-diethylaminophenyl)(CH₃)C⁺-(CH=CH)₂-CH=C-bis(4-diethylaminophenyl)] ClO₄⁻ |
| V-(8) | [Phenyl(CH₃)C⁺-(CH=CH)₂-CH=C(CH₃)-phenyl] ClO₄⁻ |
| V-(9) | [(2-pyridyl)(phenyl)C⁺-(CH=CH)₂-CH=C-(2-pyridyl)(phenyl)] ClO₄⁻ |
| V-(10) | [(C₂H₅)₂N-C₆H₄-CH=CH-C⁺H-CH=CH-C₆H₄-N(C₂H₅)₂] ClO₄⁻ |

-continued
| Compound No. | Chemical Formula |
|---|---|
| V-(11) | 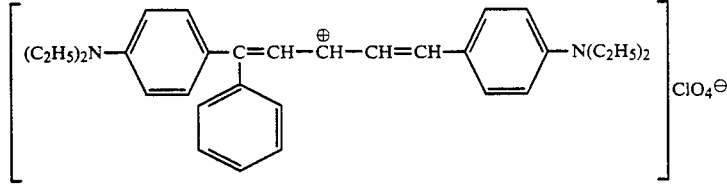 |
| V-(12) | 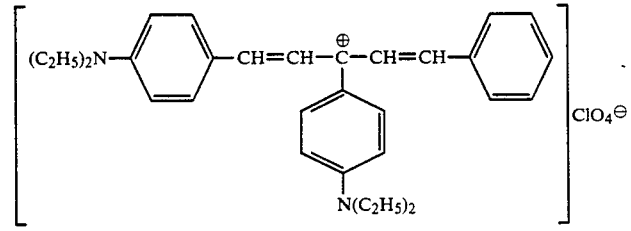 |
| V-(13) | 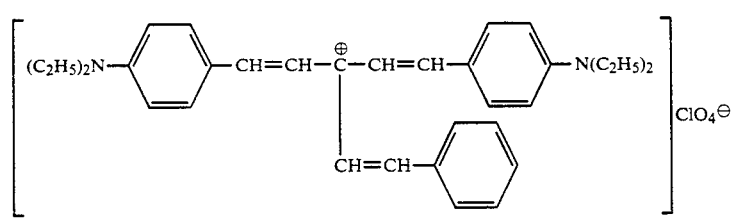 |
| V-(14) | 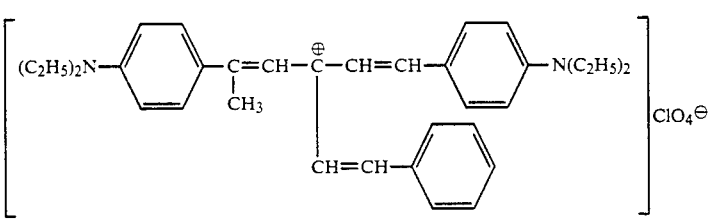 |
| V-(15) | 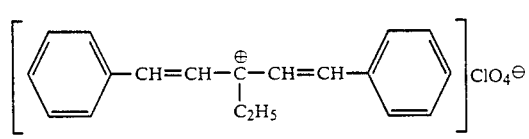 |
| V-(16) | 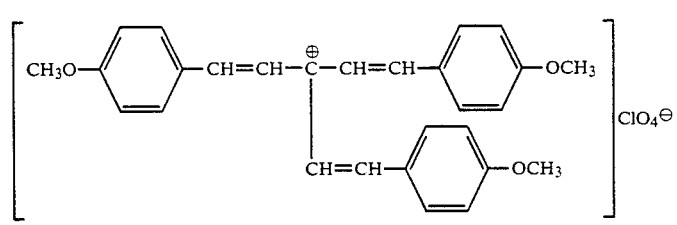 |
| V-(17) | 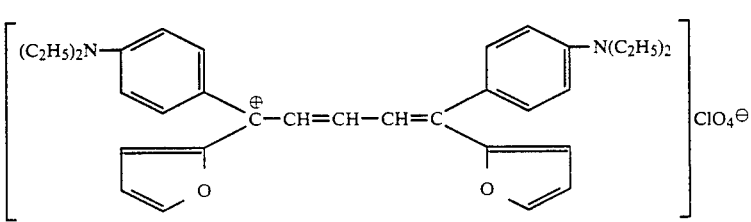 |

| Compound No. | Chemical Formula |
|---|---|
| V-(18) | [(CH₃)₂N-C₆H₄]₂C⁺-CH=CH-(furyl) ClO₄⁻ |
| V-(19) | [(CH₃)₂N-C₆H₄]₂C⁺-CH=CH-C₆H₄-N(CH₃)₂ ClO₄⁻ |
| V-(20) | (CH₃)₂N-C₆H₄-C⁺(CH₃)(CH₃)-CH=CH-(CH₃)C₆H₄-N(C₂H₅)₂ ClO₄⁻ |

These polymethine compounds can be readily prepared according to synthetic methods disclosed by Bernard S. Wildi et al. in J. Am. Chem. Soc., 80, 3772–3777 (1958), H. Schmidt et al. in Ann., 623, 204–216, and R. Wizinger et al. in Helv. Chim. Acta., 24, 369, etc.

In formula (7), which represents cyanine dyes, $Z_{71}$ and $Z_{72}$ each represent a nonmetal atomic group necessary to complete a nitrogen-containing heterocyclic ring substituted or unsubstituted, such as a thiazole family ring (e.g. thiazole, 4-methylthiazole, 4-phenylthiazole, 5-methylthiazole, 5-phenylthiazole, 4,5-dimethylthiazole, 4,5-diphenylthiazole, or 4-(2-thienyl) thiazole), benzothiazole family ring (e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-hydroxymethylbenzothiazole, 5-hydroxybenzothiazole, 6-hydroxybenzothiazole, or 4,5,6,7-tetrahydrobenzothiazole), naphthothiazole family ring (e.g. naphtho (2,1-d) thiazole, naphtho (1,2-d) thiazole, 5-methoxynaphtho (1,2-d) thiazole, 5-ethoxynaphtho 1,2-d thiazole, 8-methoxynaphtho (2,2-) thiazole, or 7-methoxynaphtho (2,2-d) thiazole), thianaphthene family ring (e.g. 7-methoxythianaphthene (7,6-d) thiazole), oxazole family ring (e.g. 4-methyloxazole, 5-methyloxazole, 4-phenyloxazole, 4,5-diphenyloxazole, 4-ethyloxazole, 4,5-dimethyloxazole, or 5-phenyloxazole), benzoxazole family ring (e.g. benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole or 6-hydroxybenzoxazole), naphthoxazole family ring (e.g. naphtho [2,1-d] oxazole or naphtho [1,2-d] oxazole), selenazole family ring (e.g. 4-methylselenazole or 4-phenylselenazole), benzoselenazole family ring (e.g. benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dihydroxymethylbenzoselenazole, 5-hydroxybenzoselenazole, or 4,5,6,7-tetrahydroselenazole), naphthoselenazole family ring (e.g. naphtho [2, 1-d] selenazole or naphtho [1,2-d] selenazole) , thiazoline family ring (e.g. thiazoline, 4-methylzoine, thiazoline, 4-hydroxymethyl-4-methylthiazoline, or 4,4-dihydroxmethylthiazoline), oxazoline family ring (e.g. oxazoline), selenazoline family ring (e.g. selenazoline), 2-quinolyl family ring (e.g. quinoline, 6-methylquinoline, 6-chloroquinoline, 6-methoxyquinoline, 6-ethoxyquinoline, or 6-hydroxyquinoline), 4-quinolyl family ring (e.g. quinoline, 6-methoxyquinoline, 7-methylquinoline, or 8-methylquinoline), 1-isoquinolyl family ring (e.g. isoquinoline or 3,4-dihydroxyisoquinoline) , 3-isoquinolyl family ring (e.g. isoquinoline), 3,3-dialkylindolenine family ring (e.g. 3,3-dimethylindolenine, 3,3-dimethyl-5-chloroindolenine, 3,3,5-trimethylindolenine, or 3,3,7-trimethylindolenine), pyridine family ring (e.g. pyridine or 5-methylpyridine), or benzimidazole family ring (e.g. 1-ethyl-5,6-dichlorobenzimidazole, 1-hydroxyethyl-5,6-dichlorobenzimidazole, 1-ethyl-5-chlorobenzoimidazole, 1-ethyl-5,6-dibromobenzimidazole, 1-ethyl-5-phenylbenzimidazole, 1-ethyl-5-fluorobenzimidazole, 1-ethyl-5-cyanobenzimidazole, 1-(β-acetoxyethyl ) -5-cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-carboxybenzimidazole, 1-ethyl-5-ethoxycarbonylbenzimidazole, 1-ethyl-5-sulfamylbenzimidazole, 1-ethyl-5-ethylsulfamylbenzimidazole, 1-ethyl-5,6-difluorobenzimidazole, 1-ethyl-5,6-dicyanobenzimidazole, 1-ethyl-5-ethylsulfonylbenzimidazole, 1-ethyl-5-methylsulfonylbenzimidazole, 1-ethyl-5-trifluoromethylbenzimidazole, 1-ethyl-5-trifluoromethylsulfonylbenzimidazole, or 1-ethyl-5-trifluoromethylsulfinylbenzimidazole).

$A_1$ and $A_2$ each represent a divalent hydrocarbon residue (e.g. —CH$_2$—CH$_2$—, —CH$_2$—CH$_2$—CH$_2$—,

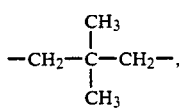

or —CH=CH—) necessary to form a substituted or unsubstituted 5- or 6-membered ring, which is condensed or not with a benzene ring, naphthalene ring, or the like.

$R_{71}$ and $R_{72}$ each represent hydrogen, alkyl (e.g. methyl, ethyl, n-propyl, isopropyl, n-butyl, sec-butyl, isobutyl, t-butyl, n-amyl, t-amyl, n-hexyl, n-octyl, or t-octyl), substituted alkyl (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl) carbomylmethyl, 3-acethylsulfamylpropyl, or 4-acetylsulfamylbutyl), cycloalkyl (e.g. cyclohexyl), alkenyl (e.g. allyl (CH$_2$=CH—CH$_2$—)), aralkyl (e.g. benzyl, phenethyl, α-naphthylmethyl, or β-naphthylmethyl), or substituted aralkyl (e.g. carboxybenzyl, sulfobenzyl, or hydroxybenzyl).

$R_{73}$ and $R_{74}$ each represent hydrogen or halogen (e.g. chlorine, bromine, or iodine).

$X^\ominus$ represents an anion (e.g. chloride, bromide, iodide, perchlorate, benzenesulfonate, p-toluenesulfonate, methylsufate, ethylsulfate, or propylsulfate anion). However, $X^{63}$ is not contained in Formula (7) when $R_{71}$ or $R_{72}$ itself has an anion (e.g. —SO$_3^\ominus$, OSO$_3^\ominus$, —COO$^\ominus$, SO$_2^\ominus$NH—, —SO$_2$—$^\ominus$N—CO—, —SO$_2$—$^\ominus$N—SO$_2$—). The letters m and k are each $\overline{0}$ or 1, and l is 1 or 2.

Typical examples of the cyanine compounds represent by Formula (7) are shown below.

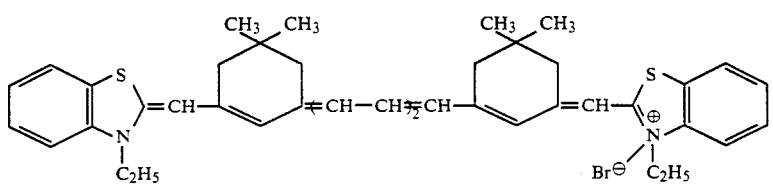

VI-(1)

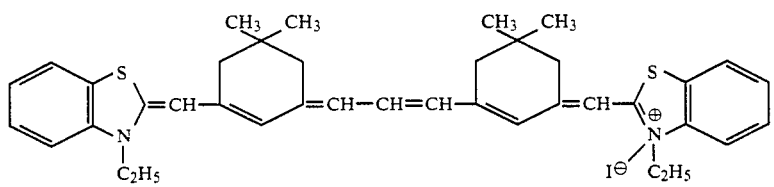

VI-(2)

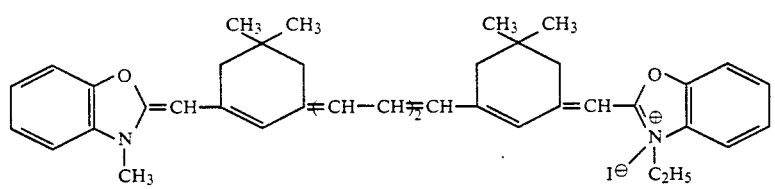

VI-(3)

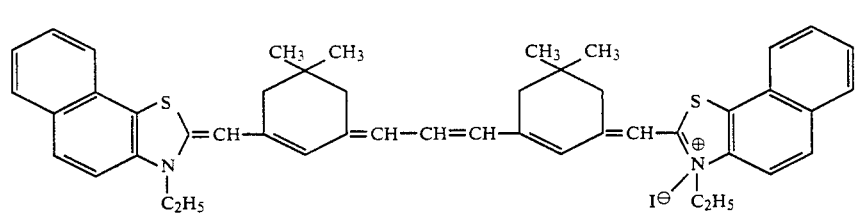

VI-(4)

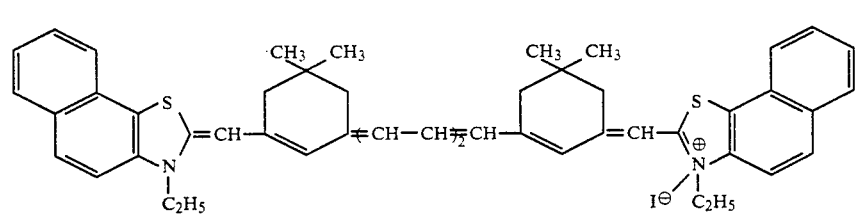

VI-(5)

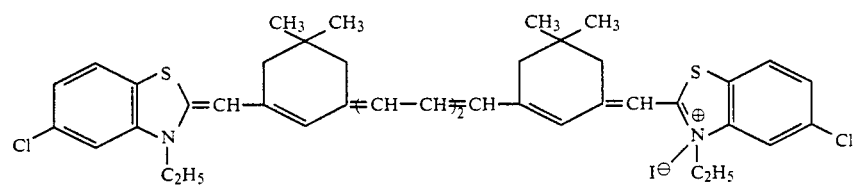

VI-(6)

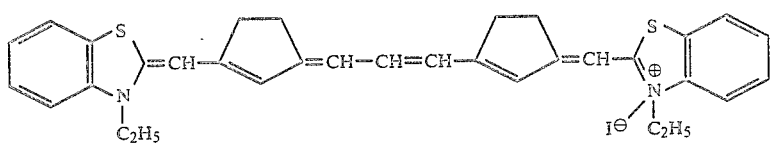

VI-(7)

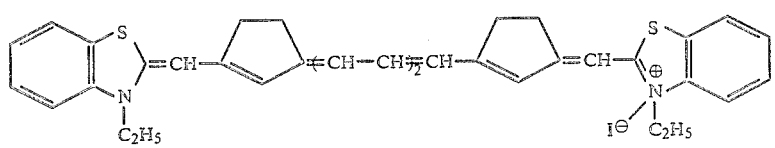

VI-(8)

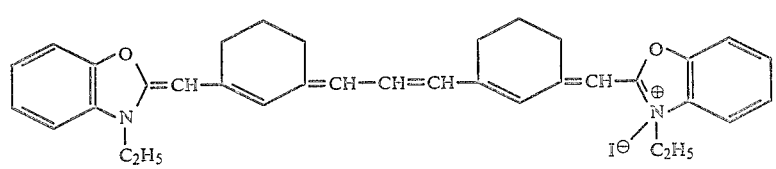

VI-(9)

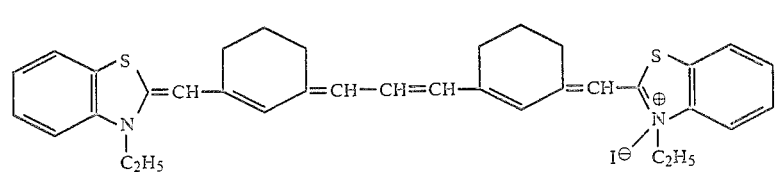

VI-(10)

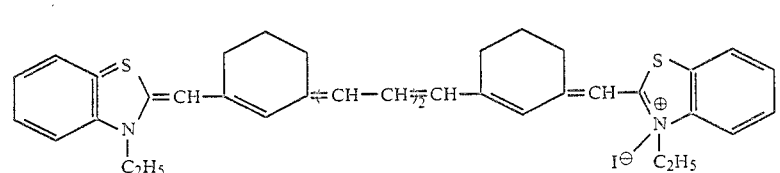

VI-(11)

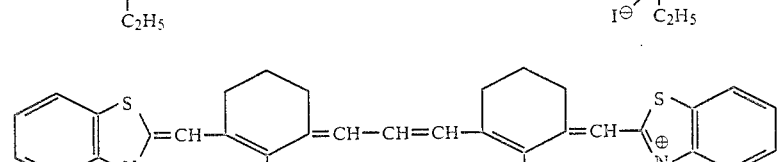

VI-(12)

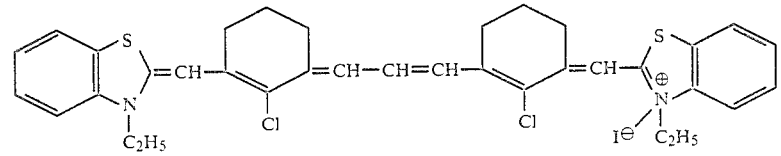

VI-(13)

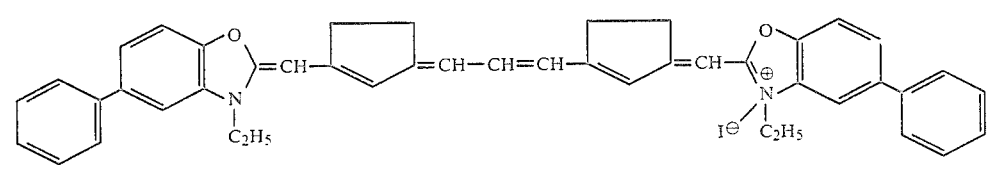

VI-(14)

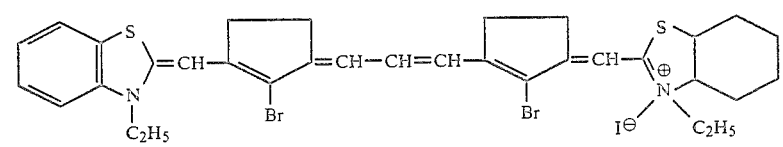

These compounds can be prepared according to a method described in, for example, U.S. Pat. No. 2,734,900.

In Formula (8), which represents cyanine dyes, $Z_{81}$ and $Z_{82}$ each represent a nonmetal atomic group necessary to complete a substituted or unsubstituted nitrogen-containing heterocyclic ring such as a thiazole family ring (e.g. thiazole, 4-methylthiazole, 4-phenylthiazole, 5-methylthiazole, 5-phenylthiazole, 4,5-dimethylthiazole, 4,5-diphenylthiazole, or 4-(2-thienyl) thiazole), benzothiazole family ring (e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-dihydromethylbenzothiazole, 5-hydroxybenzothiazole, 6-hydroxybenzothiazole, or 4, 5,6,7-tetrahydrobenzothiazole), naphthothiazole family ring (e.g. naphtho(2,1-d)thiazole, naphthol, (1,2-d)thiazole, 5-methoxynaphtho(2,1-d)thiazole, 5-ethoxynaphtho(1,2-d)thiazole 8-methoxynaphtho(2, 1-d)thiazole, or 7-methoxynaphtho(2,1-d)thiazole), thionaphthene (7,6-d)thiazole family ring (e.g. 7-methoxythionaphthene (7,6-d)thiazole), oxazole family ring (e.g. 4-methyloxazole, 5-methyloxazole, 4-phenyloxazole, 4,5- diphenyloxazole, 4-ethyloxazole, 4,5-dimethyloxazole, or 5-phenyloxazole), benzoxazole family ring (e.g. benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole 5-hydroxybenzoxazole, or 6-hydroxybenzoxazole), naphthoxazole family ring (e.g. naphto[2,1-d]oxazole or naphtho [1,2-d]oxazole), selenazole family ring (e.g. 4-methylselenazole or 4-phenylselenazole), benzoselenazole family ring (e.g. benzoselenazole, 5-chlorobenzoselenazole, 5-methylbenzoselenazole, 5,6-dimethylbenzoselenazole, 5-methoxybenzolselenazole, 5-methyl-6-methoxybenzoselenazole, 5,6-dihydroxymethylbenzoselenazole, 5-hydroxybenzoselenazole, or 4,5,6,7-tetrahydrobenzoselenazole), naphthoselenazole family ring (e.g- naphtho(2,1-d)selenazole or naphtho (1,2-d)-selenazole), thiazoline family ring (e.g. thiazoline, 4-methylthiazoline, 4-hydroxymethyl-4-methylthiazoline or 4,4-dihydroxymethylthiazoline), oxazoline family ring (e.g. oxazoline), selenazoline family ring (e.g. selenazoline), 2-quinolyl family ring (e.g. quinoline, 6-methylquinoline, 6-chloroquinoline, 6-methoxyquinoline 6-ethoxyquinoline, or 6-hydroxyquinoline), 4-quinolyl family ring (e.g. quinoline, 6-methoxyquinoline, 7-methylquinoline, or 8-methylquinoline), 1-isoquinolyl family ring (e.g- isoquinoline or 3,4-dihydroxyisoquinoline), 3-dialkylindolenine family ring (e.g. isoquinoline) 3,3-dialkylindolenine family ring (e.g. 3,3-dimethylindolenine, 3,3-dimethyl-5-chloroindolenine, 3,3,5-trimethylindolenine, or 3,3,7-trimethylindolenine), pyridine family ring (e.g. pyridine or 5-methylpyridine), or benzimidazole family ring (e.g. 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-phenylbenzimidazole, 1-ethyl-5-fluorobenzimidazole, 1-ethyl-5-cyanobenzimidazole, 1- (β-acetoxyethyl) -5-cyanobenzimidazole, 1-ethyl-5-chloro-6-cyanobenzimidazole, 1-ethyl-5-fluero-6-cyanobenzimidazole, 1-ethyl-5-acetylbenzimidazole, 1-ethyl-5-carboxybenzimidazole, 1-ethyl-5-ethoxycabonylbenzimidazole, 1-ethyl- 5-sulfamylbenzimidazole, 1-ethyl-5-N-ethylsulfamylbenzimidazole, 1-ethyl-5,6-difluorobenzimidazole, 1-ethyl-5,6-dicyanobenzimidazole, 1-ethyl-5-ethylsulfonylbenzimidazole, 1-ethyl-5-methylsulfonylbenzimidazole, 1-ethyl-5-trifluoromethylbenzimidazole, 1-ethyl-5-trifluoromethylsulfonylbenzimidazole, or 1-ethyl- 5-trifluoromethylsulfinylbenzimidazole).

$Z_{83}$ represents a divalent hydrocarbon residue (e. g. —$CH_2$—$CH_2$—, —$CH_2$—$CH_2$—$CH_2$—, —CH═CH—, or —CH═CH—$CH_2$—) necessary to complete a 5- or 6-membered ring, which is condensed or not with a benzene ring, naphthalene ring, or the like.

$RS_{81}$ and $R_{82}$ each represent hydrogen, alkyl (e.g. methyl, ethyl, n-propyl, isopropyl, n-butyl, sec-butyl, isobutyl, t-butyl, n-amyl, t-amyl, n-hexyl, n-octyl, or t-octyl), substituted alkyl (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N- (methylsulfonyl)carbamylmethyl, 3- (acetylsulfamyl) propyl, or 4-(acetylsulfamyl)butyl), cycloalkyl (e.g. cyclohexyl), alkenyl (e.g. allyl ($CH_2$═CH—$CH_2$—)), aralkyl (e.g. benzyl, phenethyl, α-naphthylmethyl, or β-naphthylmethyl), or substituted aralkyl (e.g. carboxybenzyl, sulfobenzyl, or hydroxybenzyl).

Q represents oxygen, sulfur, imino, or substituted iraino (e.g. methylimino, ethylimino, propylimino, butylimino, or benzylimino), or organic divalent residue, e.g.

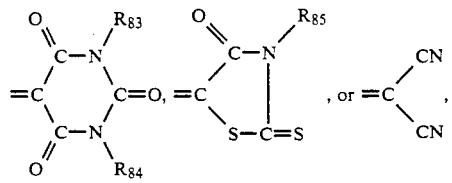

wherein $R_{83}$, $R_{84}$ and $R_{85}$ each represent hydrogen or alkyl (similar as cited above referring to $R_{81}$ and $R_{82}$).

The letters s, t, and r are each 0 or 1 and p and q are each 0, 1, or 2.

Typical examples of the cyanine dyes represented by Formula (8) are given below.

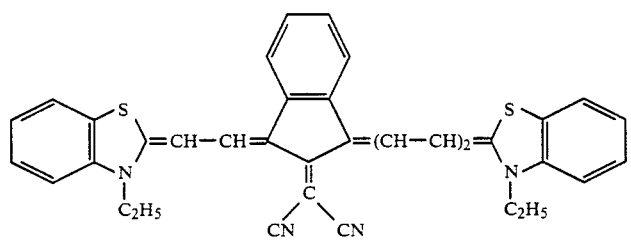

VII-(1)

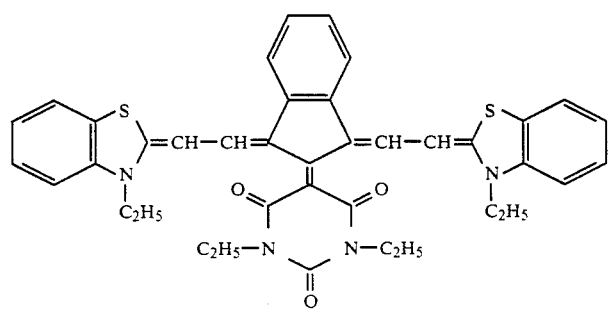

VII-(2)

-continued
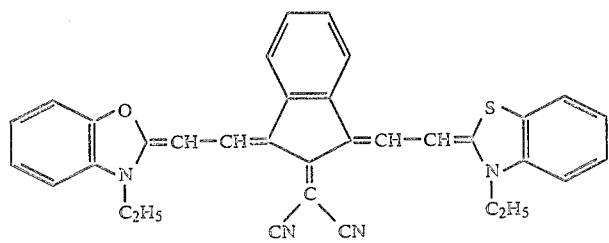
VII-(3)
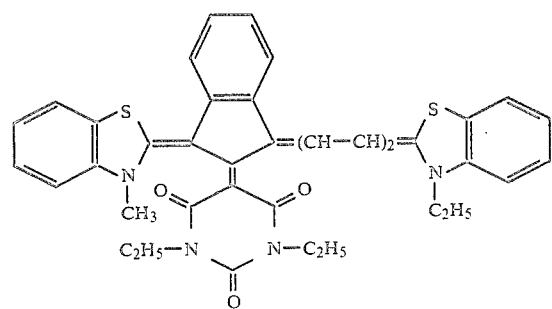
VII-(4)
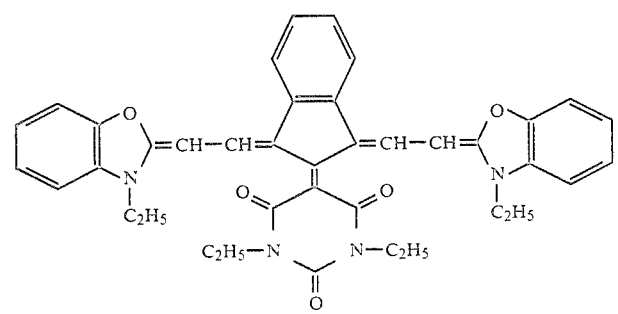
VII-(5)
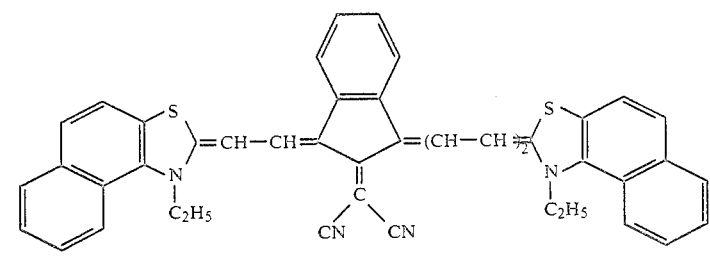
VII-(6)
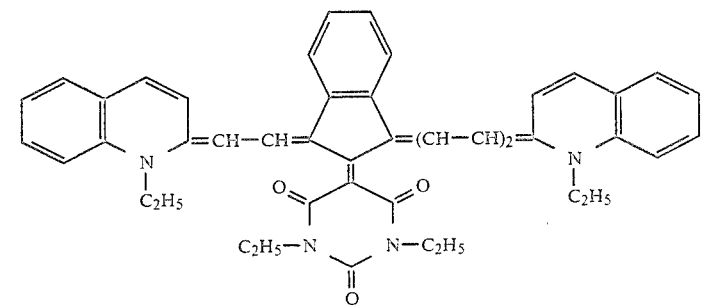
VII-(7)

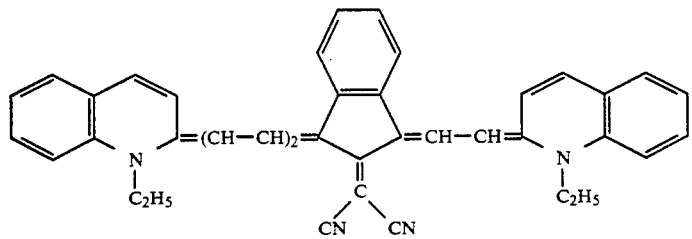
VII-(8)
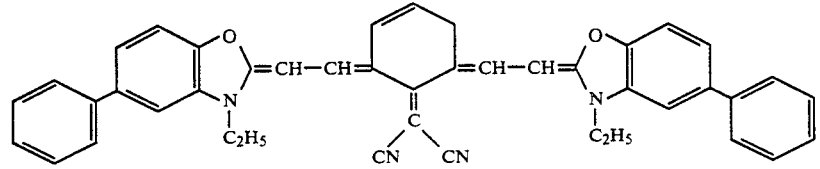
VII-(9)
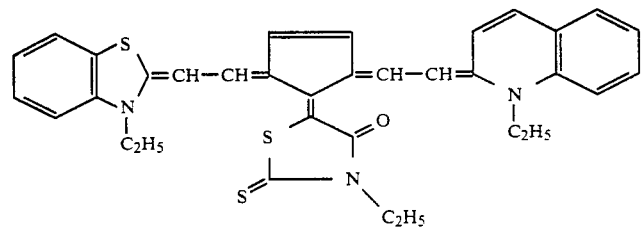
VII-(10)
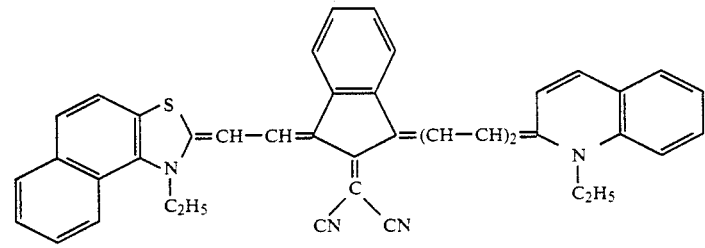
VII-(11)
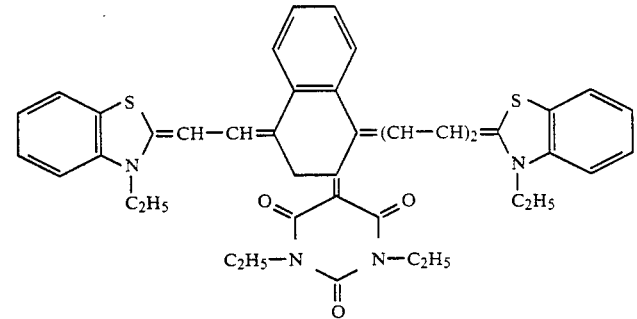
VII-(12)
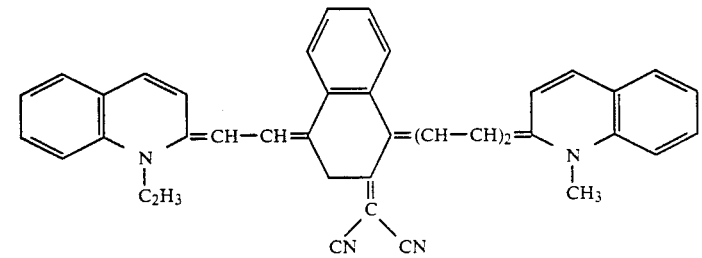
VII-(13)

VII-(14)

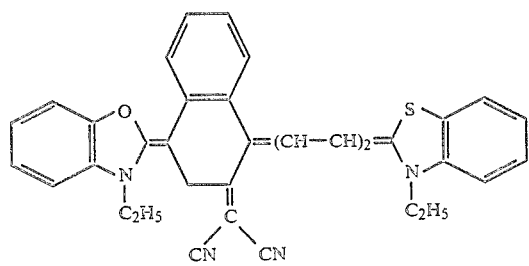

VII-(15)

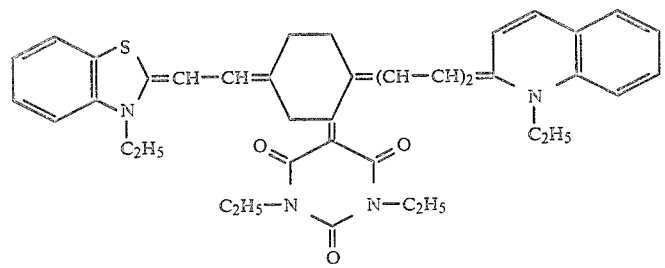

VII-(16)

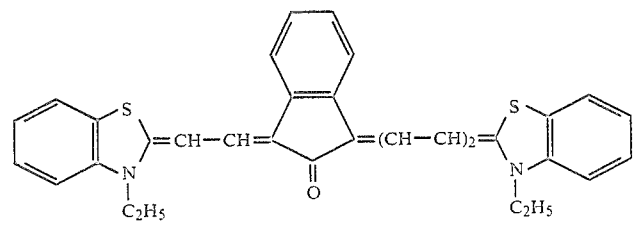

VII-(17)

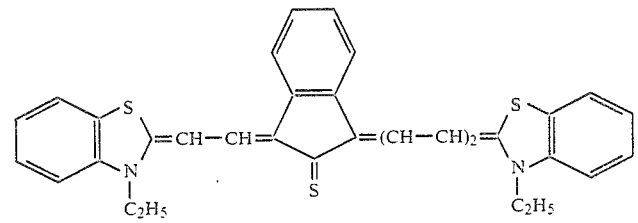

VII-(18)

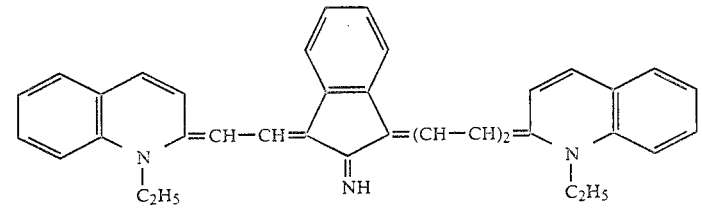

These cyanine compounds can be readily obtained by condensation a cyclic ketone such as indan-2-one, cyclohexanone, cyclopentanone, cyclohexene-one, cyclopentadiene-one, or 1,2,3,4-tetrahydronaphtalene-2-one with dicyanomethane, barbituric acid or its derivative, or rhodanine or its derivative, and reacting the condensation product with a benzothiazolium salt, benzoxazolium salt, quinolium salt, or naphthothiazolium salt, these salts being generally in use in the field of cyanine chemistry.

In Formula (9), which represents pyrylium dyes $Z_{93}$ and $Z_{94}$ each represent sulfur, oxygen, or selenium; $Z_{91}$ represents an atomic group necessary to complete a pyrylium, thiapyrylium, seleneapyrylium, benzopyrylium, benzathiopyrylium, benzoselenaepyrylium, naphthopyrylium, naphthothiapyrylium, or naphthoselenapyrylium, ring which may be substituted or not; and $Z_{92}$ represents an atomic group necessary to complete a pyrane, thiepyrane, selenapyrane, benzopyrane, benzothiopyrane, benzoselenapyrane, naphthopyrane, naphthothiopyrane, or naphthoselenopyrane ring which may be substituted or not. Suitable substituents on these rings include alkyls (e.g. methyl, ethyl, n-propyl, isopropyl, n-butyl, t-butyl, n-amyl, t-amyl, n-hexyl, n-octyl, t-octyl, and 2-ethylhexyl), alkoxyls (e.g. methoxy, ethoxy, propoxy, and butoxy), aryls and substituted aryls (e.g. phenyl, tolyl, xylyl, biphenyl, ethylphenyl, methoxyphenyl, ethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, and dibenzylaminophenyl), styryl, substituted styryls (e.g. methoxystyryl, dimethoxystyryl, ethoxystyryl, diethoxystyryl, and dimethylaminostyryl), 4-phenyl1,3-butadienyl, substituted 4-phenyl-1,3-butadienyls (e.g. 4- (p-dimethylaminophenyl)-1,3-butadienyl and 4- (p-diethylaminophenyl) -1,3-butadienyl) , and heterocyclic residues (e.g. 3-carbazoyl, 9-methyl-3-carbazoyl, 9-ethyl-3-carbazolyl, and 9-carbazolyl).

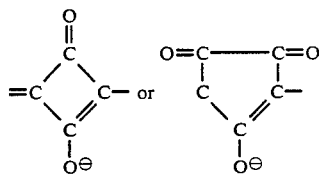

$R_{91}$, $R_{92}$, $R_{93}$ and $R_{94}$ each represent hydrogen, alkyl, particularly $C_1$-$C_{15}$ alkyl (e.g. methyl, ethyl, propyl , isopropyl, butyl, t-butyl, amyl, isoamyl, hexyl, octyl, nonyl, or dodecyl) , alkoxyl (e.g. methoxy, ethoxy, propoxy, butoxy, amyloxy, hexoxy, or octoxy) , aryl (e.g- phenyl, α-naphthyl, or β-naphthyl) , substituted aryl (e.g. tolyl, xylyl, biphenyl, ethylphenyl, methoxyphenyl-, ethoxyphenyl, amyloxyphenyl, dimethoxyphenyl, diethoxyphenyl, hydroxyphenyl, chlorophenyl, dichlorophenyl, bromophenyl; dibromophenyl, nitrophenyl, diethylaminophenyl, dimethylaminophenyl, or dibenzylaminophenyl), styryl, substituted styryl (e.g. methoxystyryl, dimethoxystyryl, ethoxystyryl, diethoxystyryl, dimethylaminostyryl, or diethylaminostyryl), 4-phenyl-1,3-butadienyl, substituted 4-phenyl-1,3-butadienyl (e.g. 4-(p-dimethylaminophenyl)-1,3-butadienyl or 4-(p-diethylaminophenyl)-1,3-butadienyl), or substituted or unsubstituted heterocyclic residue 0 (e.g. 3-carbazolyl, 9-methyl-3-carbazolyl, 9-ethyl-3-carbazolyl, or 9-carbazolyl) , where $R_{91}$ coupled with $R_{92}$ and $R_{93}$ coupled with $R_{94}$ can form each a substituted or unsubstituted benzene ring. The letters v and w are each 1 or 2.

Typical examples of the pyrylium dyes represented by Formula (9) are as follows:

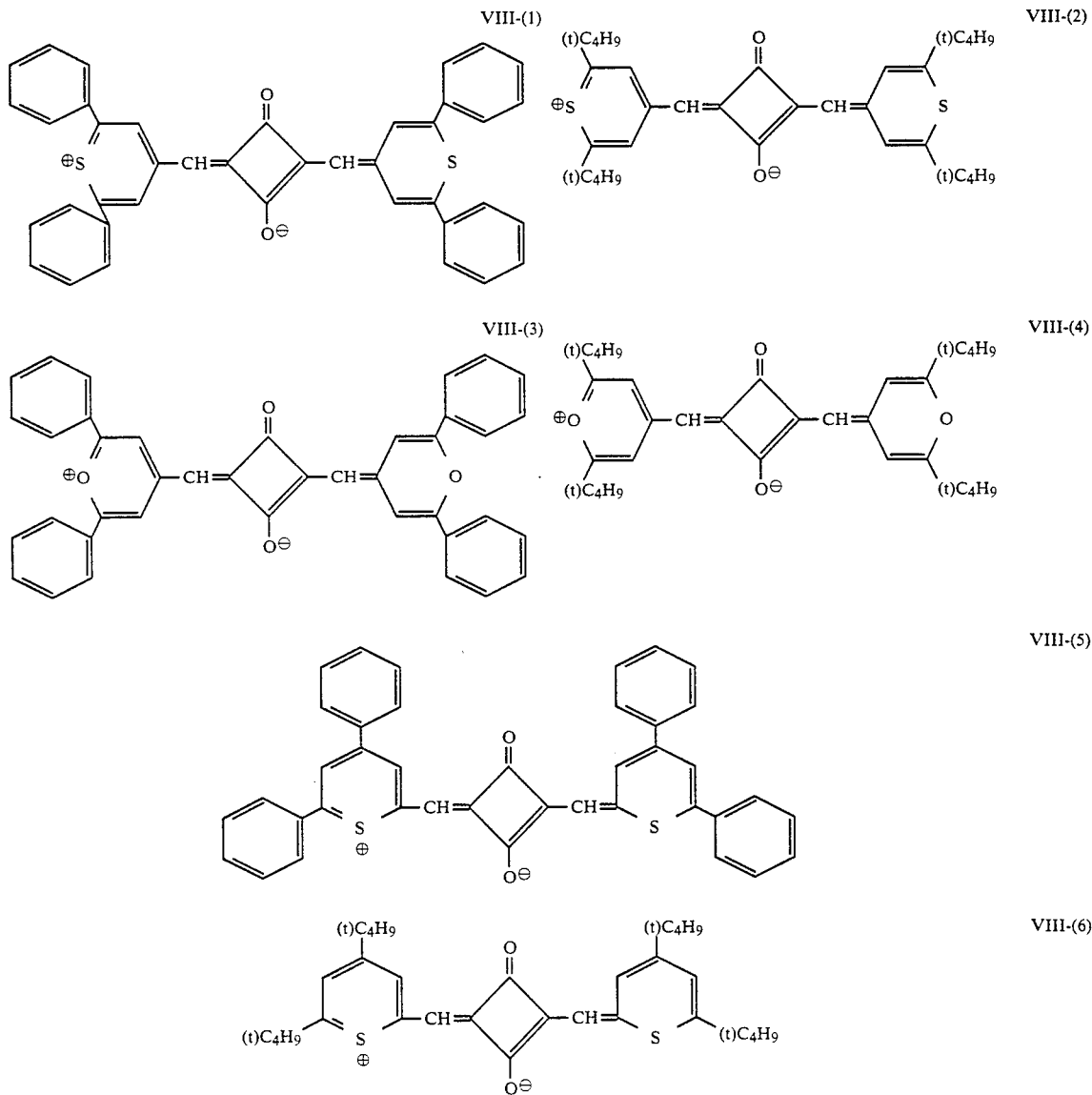

-continued
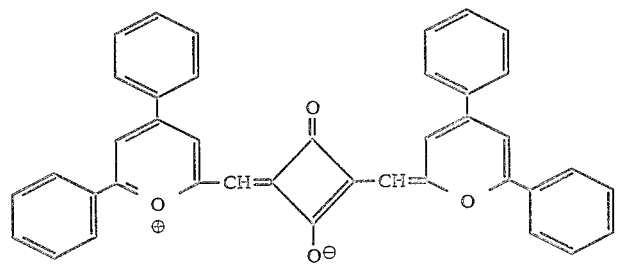
VIII-(7)
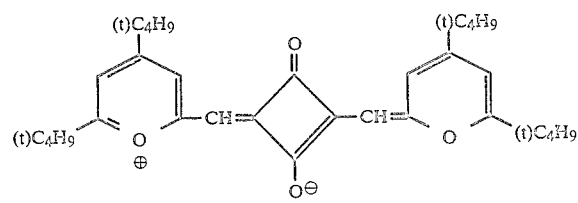
VIII-(8)
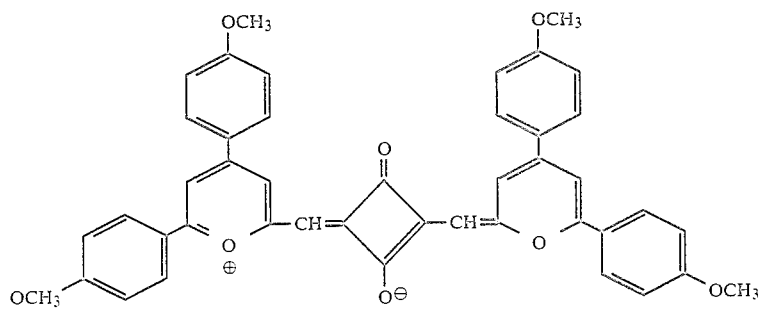
VIII-(9)
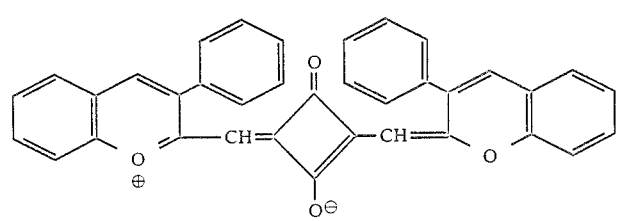
VIII-(10)
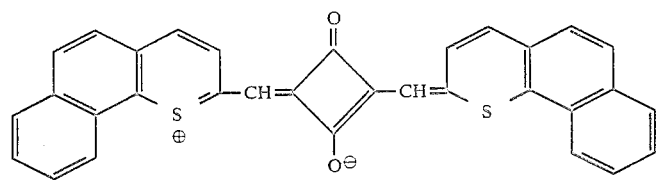
VIII-(11)
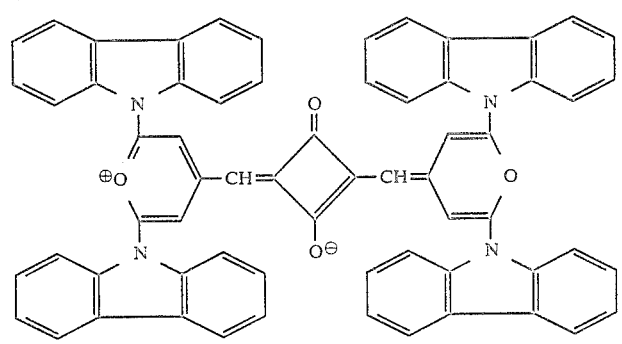
VIII-(12)

-continued
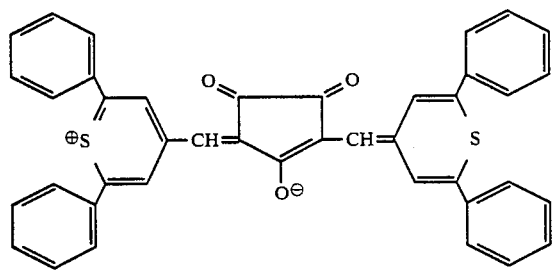 VIII-(13)
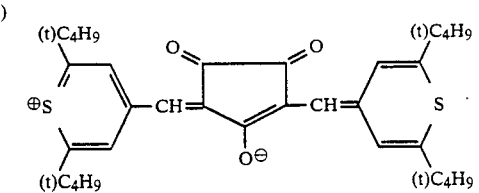 VIII-(14)
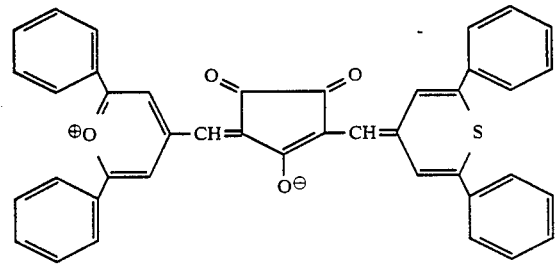 VIII-(15)
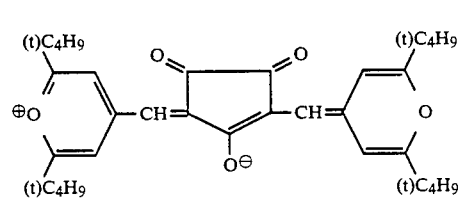 VIII-(16)
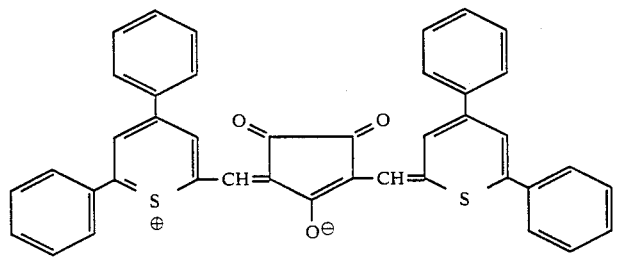 VIII-(17)
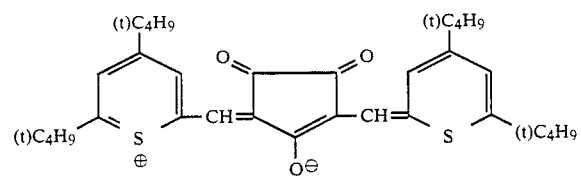 VIII-(18)
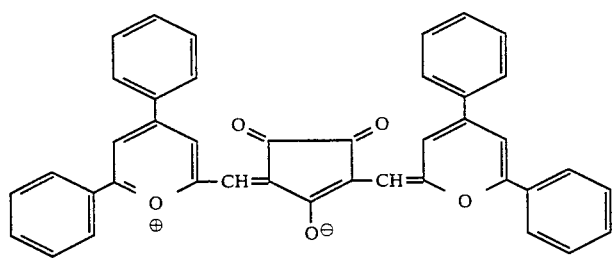 VIII-(19)
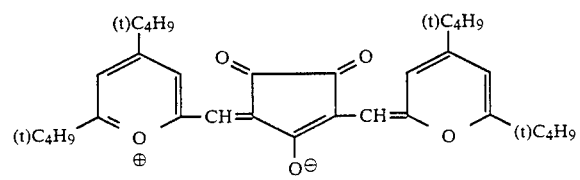 VIII-(20)

VIII-(21)

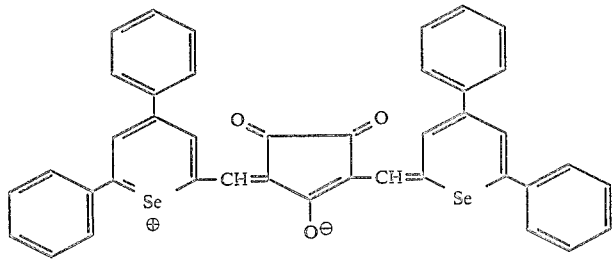

VIII-(22)

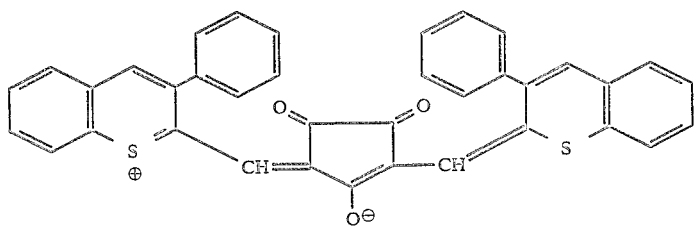

These compounds can be readily obtained, for instance, by reacting a pyrylium salt represented by the formula

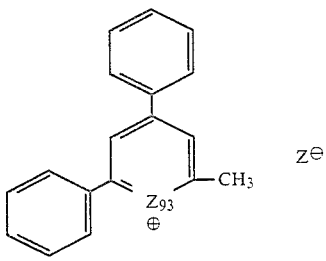

($Z_{93}$ is as defined above and $Z^\ominus$ represents an anion such as a perchlorate, fluoroborate, sulfoacetate, iodide, or bromide anion) with 3,4-dihydroxy- 3-cyclobutene-1,2-dione, croconic acid, or its derivative (e.g. mono- or dialkyl croconate) in a solvent.

2-Methyl-4,6-diphenylpyrylium salt, represented by the above formula, can be prepared, for instance, according to the method of Schneider et al. reported in Ber., 54, 2289 (1921) and 2-methyl-4,6-diphenylthiopyrylium salt according to the method of Wizinger et al. reported in Holy. Chin. Acta., 39, 221 (1956). Besides these-pyrylium salts, it is possible to use, as a starting material of the preparation, known pyrylium salts having an active methyl group, such as 2,6-di-t-butyl-4-methylthiayrylium salt, which has been-disclosed in U.S. Pat. No. 4,315,983.

While a wide variety of organic solvents can be used for this reaction, preferred ones are alcohols such as ethanol, butanol, and benzyl alcohol; nitriles such as acetonitrile and propionitrile; carboxylic acids such as acetic acid, and acid anhydrides such as acetic anhydride. An aromatic hydrocarbon such as benzene may also be used in mixture with butanol, benzyl alcohol, or the like.

Amounts of pyrylium salt used are 1.0-5.0, preferably 1.5-3.0, moles equivalent per mole of 3,4-dihydroxy-3-cyclobutene-1,2-dione or crocontic acid. The reaction solvent is used in amounts of 0.5-100 ml, preferably 2-10 ml, for 1 g of the whole raw material.

The reaction is carried out at temperatures of 25°–100° C., preferably 60°–140° C., for 5 minutes–30 hours, preferably 20 minutes–5 hours.

To promote the reaction, a base can be added, including, for example, triethylamine, pyridine, quinoline, or sodium acetate.

Synthesis of typical compounds represented by Formula (9) is illustrated referring to Preparation Examples 4 and 5.

PREPARATION EXAMPLE 4

Synthesis of Compound No. VIII-(7)

A solution was prepared by heating 1.2g (0.0105 mole) of 3,4-dihydroxy-3-cyclobutene-1,2-dione and 36 ml of n-butanol up to 100° C. while stirring in a 100 ml, three-necked flask. To the solution were added in succession 3 ml of quinoline, 7.3 g (0.0211 mole) of 2-methyl-4,6-diphenylpyrylium perchlorate, and 15 ml of benzene to start the reaction. The reaction was continued for 3.5 hours at 95°–110° C. while adding in parts 30 ml of benzene and 20 ml of butanol and removing water by azeotropic distillation. The reaction mixture was cooled and filtered with suction. The filter cake was washed with 30 ml of butanol to give a crude dye. It was rinsed five times with 200 ml each of boiling methanol and then twice with 100 ml each of boiling tetrahydrofuran, giving 1.9 g of compound No. VIII-(7); yield 31.7%, m.p. 255°–258° C.

Analysis for $C_{40}H_{26}O_4$:

Calcd. (%): C, 84.18; H, 4.60.

Found (%): C, 84.02; H, 4.76.

Visible-to-infrared ray absorption spectrum in dimethylformamide:

$\lambda$max 910 nm, 815 nm $\epsilon 6.6 \times 10^4, 6.2 \times 10^4$

PREPARATION EXAMPLE 5

Synthesis of Compound No. VIII-(5)

A solution was prepared by heating 1.0 g (0.0088 mole) of 3,4-dihydroxy-3-cyclobutene-1,2-dione and 50 ml of n-butanol up to 100° C. while stirring in a 100 ml, three-necked flask. To the solution were added in succession 2.5 ml of quinoline, 6.36 g (0.0176 mole) of 2-methyl-4,6-diphenylthiapyrylium perchlorate, and 10 ml of benzene to start reaction. The reaction was continued for 3 hours at 95°–110° C. while adding in parts 30 ml of benzene and 10 ml of n-butanol and removing water by azeotropic distillation.

The reaction mixture was allowed to stand overnight and filtered with suction. The cake was washed with 30 ml of n-butanol to give a crude dye. It was rinsed five times with 200 ml each of boiling methanol and then twice with 100 ml each of boiling tetrahydrofuran, giving 1.36 g of compound No. VIII-(5); yield 25.7%, m.p. 232.5°–235° C.

Analysis for $C_{40}H_{26}O_2S_2$:
Calcd. ( % ): C, 79.70; H, 4.36, S, 10.64.
Found (%): C, 79.59, H, 4.45, S, 10.69.

Visible-to-infrared ray absorption spectrum, in dimethyl formamide:
$\lambda$max: 975 nm, 885 nm
$\epsilon$: $5.13 \times 10^4$, $5.29 \times 10^4$ The pyrylium type compounds according to the present invention can be used also in the form of co-crystalline complex with a polymer having repeating units of alkylidene diarylene. Such polymers can be represented by the formula

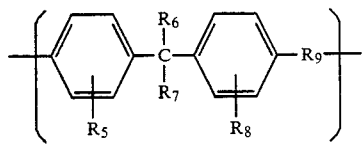

wherein; $R_6$ and $R_7$ each represent hydrogen, alkyl (e.g. methyl, ethyl, propyl, isopropyl, butyl, t-butyl, amyl, hexyl, octyl, nonyl, or decyl), subsituted alkyl (e.g. trifluoromethyl), aryl (e.g. phenyl or naphthyl), or substituted aryl (e.g. tolyl, xylyl, ethylpehnyl, propylphenyl, amylpehnyl, chlorophenyl, dichlorophenyl, or bromophenyl), $R_6$ and $R_7$ being allowed for form cojointly a cycloalkane such as cyclohexyl or a polycycloalkane such as norbornyl; $R_5$ and $R_8$ each represent hydrogen, $C_1$–$C_5$ alkyl, or halogen (e.g. chlorine, bromine, or iodine); and $R_9$ represents a divalent residue selected from the group consisting of

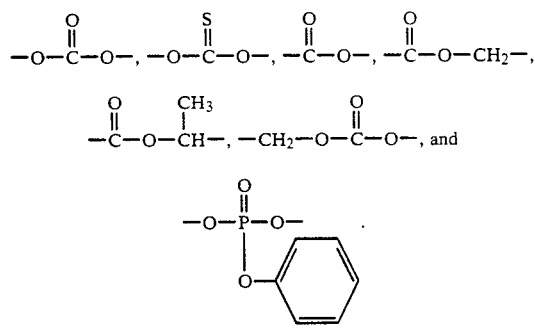

Typical examples of these polymers are as follows:

| Polymer No. | Polymer name |
| --- | --- |
| 1. | Poly(4,4'-isopropylidenediphenylene-CO-1,4-cyclohexyl-dimethyl carbonate) |
| 2. | Poly(3,3'-ethylenedioxyphenylene thiocarbonate) |
| 3. | Poly(4,4'-isopropylidenediphenylene carbonate-CO-terephthalate) |
| 4. | Poly(4,4'-isopropylidenediphenylene carbonate) |

-continued

| Polymer No. | Polymer name |
| --- | --- |
| 5. | Poly(4,4'-isopropylidenediphenylene thiacarbonate) |
| 6. | Poly[2,2-butanebis(4-phenylene)carbonate] |
| 7. | Poly(4,4'-isopropylidenediphenylene carbonate-block-ethyleneoxide) |
| 8. | Poly(4,4'-isopropylidenediphenylene carbonate-block-tetramethyleneoxide) |
| 9. | Poly(4,4'-isopropylidenebis(2-methylphenylene)carbonate) |
| 10. | Poly(4,4'-isopropylidenediphenylene-CO-1,4-phenylene carbonate) |
| 11. | Poly(4,4'-isopropylidenediphenylene-CO-1,3-phenylene carbonate) |
| 12. | Poly(4,4'-isopropylidenediphenylene-CO-4,4'-diphenylene carbonate) |
| 13. | Poly(4,4'-isopropylidenediphenylene-CO-4,4'-oxydiphenylene carbonate) |
| 14. | Poly(4,4'-isopropylidenediphenylene-CO-4,4'-carboxyldiphenylene carbonate) |
| 15. | Poly(4,4'-isopropylidenediphenylene-CO-4,4'-ethylenediphenylene carbonate) |
| 16. | Poly(4,4'-methylenebis(2-methylphenylene)-carbonate) |
| 17. | Poly(1,1-(p-bromophenylethane)bis(4-phenylene)carbonate) |
| 18. | Poly(4,4'-isopropylidenediphenylene-CO-sulfonylbis(4-phenylene)carbonate) |
| 19. | Poly(4,4'-isopropylidenebis(2-chlorophenylene)carboante) |
| 20. | Poly(hexafluoroisopropylidenebis(4-phenylene)carbonate) |
| 21. | Poly(4,4'-isopropylenediphenylene 4,4'-isopropylidenedibenzoate) |
| 22. | Poly(4,4'-isopropylidenedibenzyl 4,4'-isopropylidenedibenzoate) |
| 23. | Poly(2,2-(3-methylbutane)bis(4-phenylene)-carbonate) |
| 24. | Poly(2,2-(3,3-dimethylbutane)bis(4-phenylene)carbonate) |
| 25. | Poly(1,1-(1-naphthyl)bis(4-phenylene)-carbonate) |
| 26. | Poly(2,2-(4-methylpentane)bis(4-phenylene)-carboante) |

Co-crystalline complexes of the pyrylium type compound with these polymers can be obtained according to methods disclosed in, for example, U.S. Pat. No. 3,684,502 and Austral. Patent Laid-Open No. 87757/1975, respectively. As an example, such a complex can be prepared by dissolving said pyrylium type compound and polymer in a halogenated hydrocarbon solvent (dichloromethane) and adding a non-halogenated, nonpolar solvent (e.g. hexane, octane, decane, ligroin, or toluene) to precipate the complex.

In Formula (10), $R_{21}$ and $R_{22}$ represent each alkyl (e.g. methyl, ethyl, propyl, or butyl) or $R_{21}$ and $R_{22}$ together with the nitrogen atom to which they are attached form a ring residue such as morpholino, piperidino, or pyrrolidinyl; $R_{23}$, $R_{24}$, $R_{25}$, and $R_{26}$ each represent hydrogen, halogen (e.g. chlorine, bromine, or iodine), alkyl (e.g. methyl, ethyl, propyl, or butyl), alkoxyl (e.g. methoxy, ethoxy, propoxy, or butoxy), or hydroxyl, where combinations of $R_{23}$ and $R_{24}$ and combinations of $R_{25}$ and $R_{26}$ can each form a benzene ring.

Typical examples of the compounds represented by Formula (10) are as follows:

| Compound No. | Chemical Formula |
|---|---|
| IX-(1) | (CH₃)₂N-C₆H₃(OH)=C-C(=O)-C(O⁻)=C(=O)-C₆H₃(OH)=N⁺(CH₃)₂ |
| IX-(2) | (CH₃)₂N-C₆H₄=C-C(=O)-C(O⁻)=C(=O)-C₆H₄=N⁺(CH₃)₂ |
| IX-(3) | (CH₃)₂N-C₆H₃(Cl)=C-C(=O)-C(O⁻)=C(=O)-C₆H₃(Cl)=N⁺(CH₃)₂ |
| IX-(4) | (CH₃)₂N-C₆H₃(CH₃)=C-C(=O)-C(O⁻)=C(=O)-C₆H₃(CH₃)=N⁺(CH₃)₂ |
| IX-(5) | (CH₃)₂N-C₆H₃(OCH₃)=C-C(=O)-C(O⁻)=C(=O)-C₆H₃(OCH₃)=N⁺(CH₃)₂ |
| IX-(6) | (C₂H₅)₂N-C₆H₃(OH)=C-C(=O)-C(O⁻)=C(=O)-C₆H₃(OH)=N⁺(C₂H₅)₂ |
| IX-(7) | (CH₃)₂N-naphthyl=C-C(=O)-C(O⁻)=C(=O)-naphthyl=N⁺(CH₃)₂ |
| IX-(8) | (CH₃)₂N-anthryl=C-C(=O)-C(O⁻)=C(=O)-anthryl=N⁺(CH₃)₂ |

A representative example of the processes for preparing these compounds is given below.

PREPARATION EXAMPLE 6

Synthesis of Compound No. IX-(1)

Figure 2:
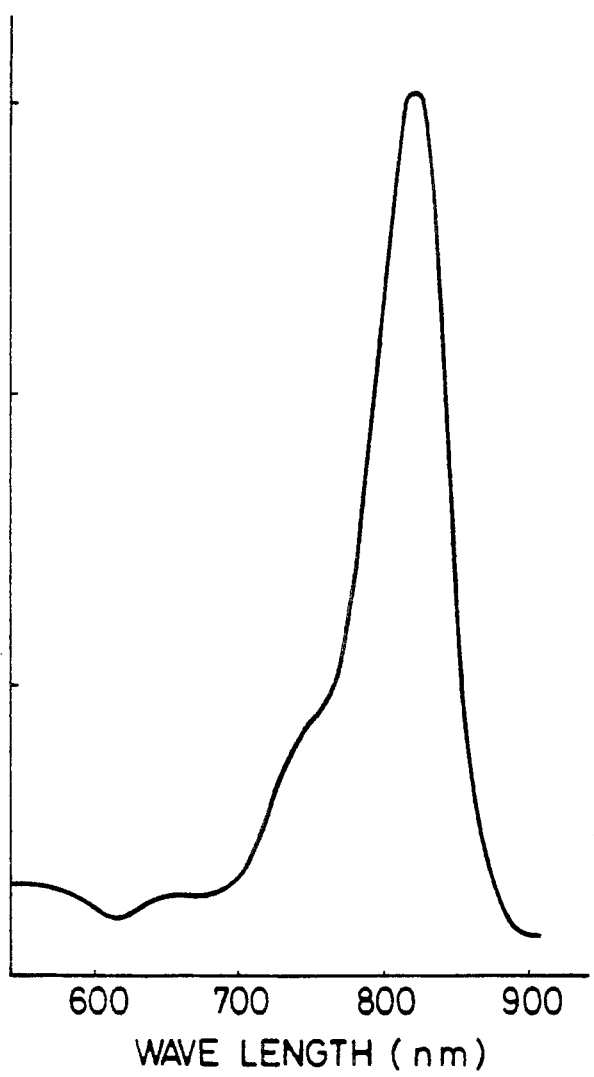
Figure 3:
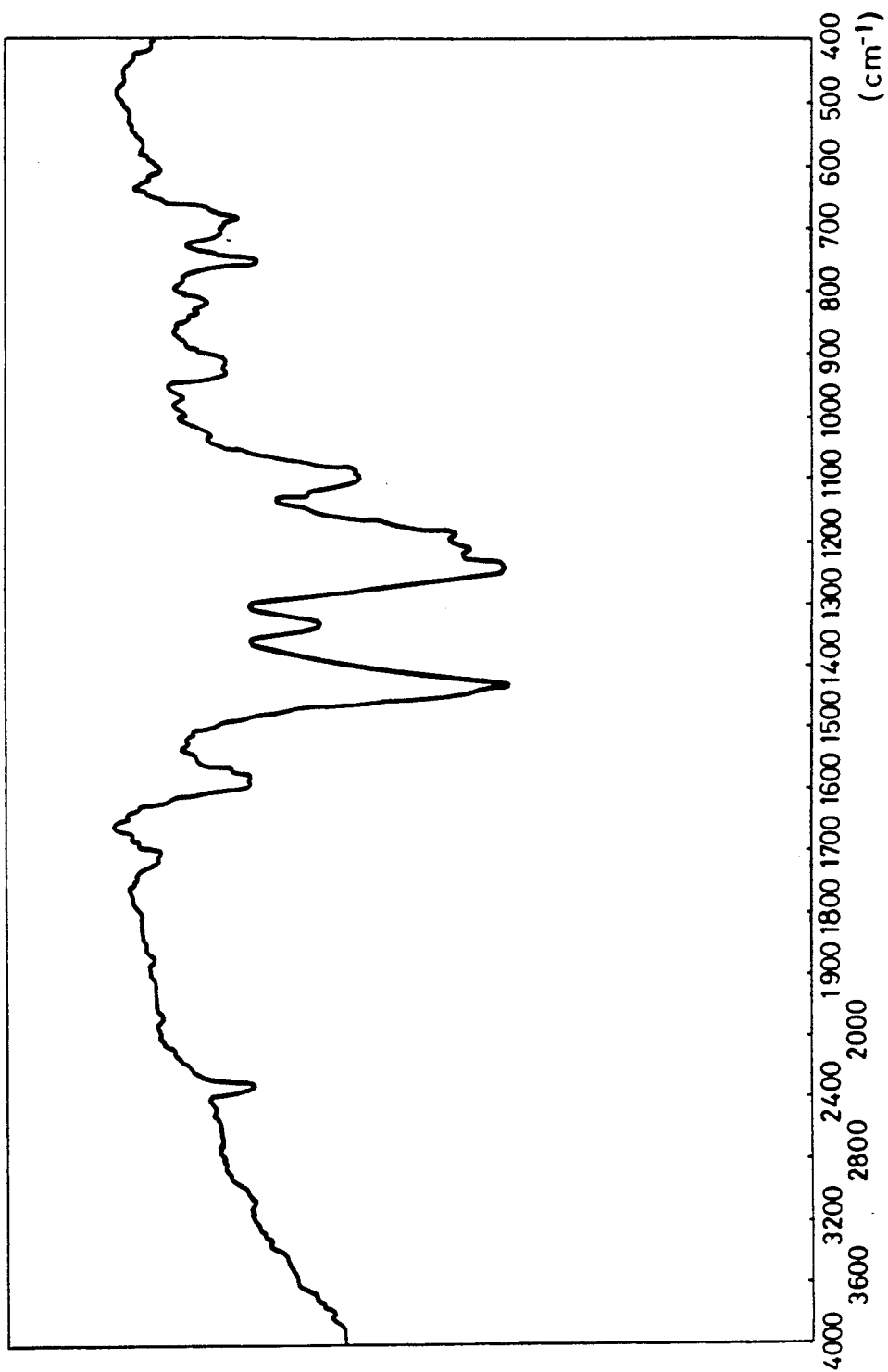
FIG. 3 is an absorption spectrum of Compound Mo. VIII-(7) covering visible and infrared ray wavelength regions.

A solution was prepared by mixing 10.6 g of N,N-dimethyl-m-aminophenol and 180 ml of n-butanol in a three-necked flask. The solution, after addition of 5.0 g of croconic acid and 50 ml of benzene, was heated to react at 90°–100° C. for 1 hour while distilling off water. After cooling, the resulting precipitate was filtered off, washed with 40 ml of n-butanol, three times with 200 ml of hot methyl Cellosolve, and with 200 ml of hot tetrahydrofuran. By drying the precipitate, 6.3 g of the objective product was obtained; yield 47%. An absorption spectrum thereof in dimethylformamide is shown in FIG. 2 ($\lambda$ max=818 run).

Figure 4:
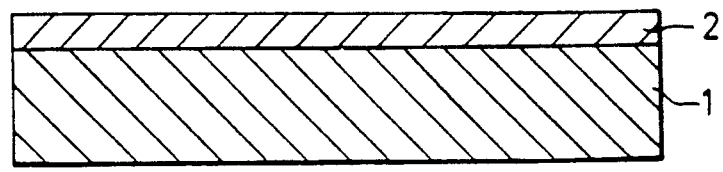
FIGS. 4 and 5 are cross-sectional views of optical recording media of this invention.

The optical recording medium of this invention has a structure, for example, as shown in FIG. 4. The recording medium shown in FIG. 4 can be prepared by forming an organic thin film 2 containing a dye represented by Formulae (1)–(10), on a substrate 1. The organic thin film 2 is formable by vacuum deposition of the dye or applying a coating liquid comprising the dye and a binder onto the substrate 1. In this case, the dye may be contained in the form of either dispersion or non-crystal, in the binder. Suitable binders of the dye can be selected from a wide variety of resins including, for example, cellulose esters such as nitrocellulose, cellulose phosphate, cellulose sulfate, cellulose acetate, cellulose propionate, cellulose butyrate, cellulose myristate, cellulose palmirate, cellulose acetate-propionate, and cellulose acetate-butyrate; cellulose ethers such as methyl cellulose, ethyl cellulose, propyl cellulose, and butyl cellulose; vinyl type resins such as polystyrene, poly(vinyl chloride), poly(vinyl acetate), poly(vinyl butyral), poly (vinyl acetal), poly (vinyl alcohol), and polyvinylpyrrolidone; vinyl type copolymer resins such as styrene-butadiene copolymer, styrene-acrylonitrile copolymer, styrene-butadiene-acrylonitrile copolymer, vinyl chloride-vinylidene chloride copolymer, and vinyl chloride-vinyl acetate copolymer; acrylic resins such as poly(methyl methacrylate), poly(methyl acrylate), poly(butyl acrylate), poly(acrylic acid), poly(methacrylic acid), polyacrylamide, and polyacrylonitrile; polyesters such as poly(ethylene terephthalate); polycarbonates and co-polyesters thereof such as poly(4,4'-isopropylidenediphenylene CO-1,4-cyclohexylenedimethylene carbonate), poly(ethylenedioxy-3,3'-phenylene thiocarbonate), poly(4,4'-isopropylidenediphenylene carbonate), poly(4,4'-sec-butylidenediphenylene carbonate), and poly(4,4'-isopropylidenediphenylene carbonate block-oxyethylene); polyarylates such as poly (4,4'-isopropylidenediphenylene terephthalate); polyamides; polyimides; epoxy resins; phenolic resins; and polyolefins such as polyethylene, polypropylene, and chlorinated polyethylene.

While the organic solvent used for the coating varies depending upon the kind of binder and upon the form of the dye dispersed or non-crystal in the binder, generally the following solvents are suitable: alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethylsulfoxide; ethers such as tetrahydrofuran, dioxane, and ethylene glycol monomethyl ether; esters such as methyl acetate and ethyl acetate; halogenated aliphatic hydrocarbons such as chloroform, methylene chloride, dichloroethylene, carbon tetrachloride, and trichloroethylene; aromatic hydrocarbons such as benzene, toluene, xylene, and ligroin; and halogenated aromatic hydrocarbons such as monochlorobenzene and dichlorobenzene.

The coating can be accomplished by various methods including dip coating, spray coating, spinner coating, bead coating, Meyer bar coating, blade coating, roller coating, curtain coating, and the like.

The dye content in the film 2 ranges from 1 to 90%, preferably from 20 to 70%, by weight when forming the organic thin film 2 together with a binder. Dry thickness of the film 2 is up to 10 $\mu$, preferably up to 2 $\mu$.

Figure 5:
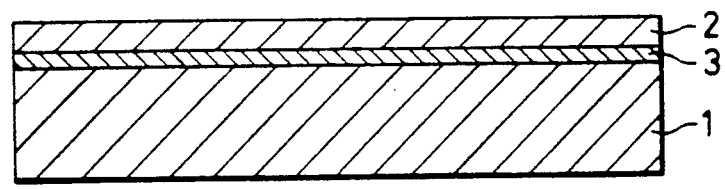

The optical recording medium of this invention can be provided with a reflecting layer 3 between the substrate 1 and the organic thin film 2, as shown in FIG. 5. This reflecting layer 3 may be a vapour deposition film or laminate film of reflective metal such as aluminum, silver, or chromium.

Figure 6:
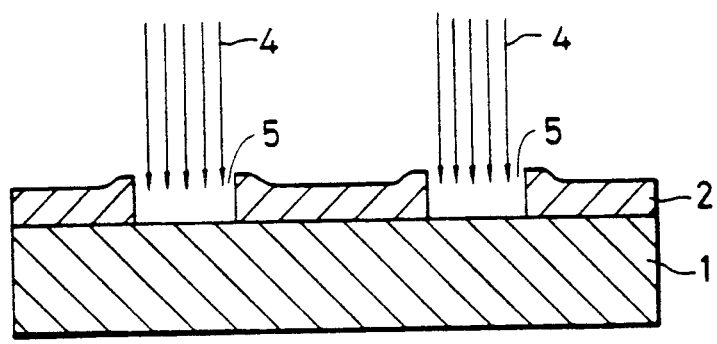
FIG. 6 is an illustration showing an embodiment of the process for making a record on the optical recording medium of this invention.

In the film 2, pits 5 can be formed, as shown in FIG. 6, by irradiation with a convergent laser beam 4. When depths of the pits 5 are made equivalent to the thickness of the film 2, an increased reflectance is obtained for the reading laser beam at the pit areas. If a laser beam having the same wavelength as the writing laser beam but a lower intensity is used for reading, the reading beam will be sufficiently absorbed at the pit-free areas while highly reflected at the pit areas. Another reading method is to use a laser beam that has a wavelength different from that of the real-time-writing laser beam highly absorbable by the film 2 and will be substantially transmitted by the film 2. The reading lasers are responsive to a change in the reflecting phase due to the difference of the film thickness between the pit areas and the pit-free areas.

Recording upon the optical recording medium of this invention can be accomplished by irradiating it with a gas laser such as the argon laser (wavelength 488 nm), helium-neon laser (wavelength 633 nm), or helium-cadmium laser (wavelength 442 nm). However, more suitable lasers are those of wavelengths. 750 nm and more, particularly those having a wavelength in the near infrared region or infrared region, such as the gallium-aluminum-arsenic semiconductor laser. Another method of forming pits is to irradiate the optical recording medium with a light beam including rays from various short-pulse emitting lamps such as xenon flash lamps and rays from infrared lamps or to bring a heater into contact with the recording medium.

Since pit areas of the recording medium are different in reflectance from pit-free areas thereof, a track of pits, for instance, is formed by scanning it with an relectromagnetic radiation and the resulting reflectance differences can be read with a photodetector by tracing the track with a low power laser.

The substrate constructing the optical recording medium of this invention, if information recording is carried out with a recording light beam (electromagnetic wave) incident on the substrate side, is desired to be transparent to the light beam. A substrate suitable in transparency for the wavelength or spectrum of a given recording light beam is desirable for improving the sensitivity, since various recording light beams are applicable including, as mentioned above, semiconductor lasers, argon gas laser, helium-neon gas laser, other lasers the wavelengths of which are in the region of visible Go infrared rays, and various short-pulse emission lamps such as xenon flash lamps. Transparency acceptable of the-substrate in this case is such that about 90% or more of the incident light is transmittable.

Substrates having adequate transparency to any of the above-mentioned rays of light are films or sheets of, for example, inorganic transparent materials such as glass; organic polymers such as polyester, polypropylene, polycarbonates, poly(vinyl chloride), polyamides, polystyrene, and poly(methyl methacrylate); and their modified polymers, copolymers, and blend polymers. When the surface smoothness of the substrate itself has a great influence on the S/N ratio as in the case of video disks, it is desirable to use a substrate coated with the above-cited polymer by means of a spinner coater or the like. Transparent substrate materials particularly preferred are polyesters and poly(methyl methacrylate).

On the contrary, when a recording light beam is incident on the opposite side of substrate, it is possible to use substrates, besides said transparent substrates, such as films or sheets prepared by adding dyes, pigments, or reinforcing agents to inorganic materials or to organic polymers and sheets of metals such as aluminum alloys.

According to this invention, the S/N ratio can. be improved sufficiently and in addition a high intensity light beam such as a laser beam can be utilize more efficiently. Further, this invention permits recording by use of a laser beam having a wavelength of 750 run or more.

This invention will be illustrated in more detail with reference to the following Examples, wherein parts and percentages are by weight:

EXAMPLE 1

A mixture of 3 parts of the croconic methine dye No. I-(29), 12 parts of a nitrocellulose solution (methyl ethyl ketone containing 25% of OH-less lacquer nitrocellulose, mfd. by Daicel Chem. Industries, Ltd.), and 110 parts of methyl ethyl ketone was ground in a ball mill for 2 hours. The resulting dispersion was applied onto a Pyrex glass substrate by dip coating and was dried at 100° C. for 2 hours to give a recording layer of 0.6 g/m$^2$.

The optical recording medium thus prepared was set on a turntable, and while rotating the turntable at a speed of 1800 rpm, the recording layer side was irradiated with a 5-mW, 8-MHz gallium-aluminum-arsenic semiconductor laser ($\lambda$780 am) converged to a spot size of 1.0 $\mu$, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLE 2

A solution was prepared by thoroughly mixing 3 parts of the croconic methine dye No. I-(3) with 10 parts of a nitrecellulose solution (same as used in Example 1) and 120 parts of methyl Cellosolve. This solution was applied onto a Pyrex glass substrate by means of a spinner coater at 500 rpm so as to give a dry coating weight of 0.6 g/m$^2$. The coating was dried at 100° C. for 2 hours to form a recording layer. The resulting optical recording medium was subjected to the same recording and reading tests as in Example 1, giving similar results.

EXAMPLE 3

A molybdenum boat containing 500 mg of the croconic methine dye No. I-(5) and a Pyrex glass substrate were placed in a vacuum chamber, which was then evacuated to $1 \times 10^{-6}$ mmHg or less. The dye was heated to evaporate and deposit on the substrate while regulating the heater so as to keep the chamber pressure below $1 \times 10^{-5}$ torr. The optical recording medium thus prepared was subjected to the same recording and reading tests as in Example 1, giving similar results.

EXAMPLES 4–7

Optical recording media each comprising a Pyrex substrate and a 0.6 g/m$^2$ recording layer were prepared in the same manner as in Example 1 except for using severally the croconic methine dyes Nos. I-(11), I-(14), I-(31), and I-(32) in place of the croconic methine dye No. I-(29). These optical recording media were subjected to the same recording and reading tests as in Example 1, giving similar results.

EXAMPLE 8

An optical recording medium comprising a Pyrex substrate and a recording layer vapour-deposited was prepared in the same manner as in Example 3 except for using the croconic mothine dye No. I-(20) in place of the croconic methine dye No. I-(5). This optical recording medium was subjected to the same recording and reading tests as in Example 1, giving similar results.

EXAMPLE 9

A solution was prepared by mixing 3 parts of the thiopyrylium dye No. II-(9), 12 parts of a nitrocellulose solution (same as used inExample 1), and 150 parts of tetrahydrofuran. The solution was applied onto a Pyrex glass substrate by means of a spinner coater at 500 rpm and was dried at 100° C. for 2 hours to form a recording layer of 0.7 g/m$^2$.

The resulting optical recording medium was set on a turntable, and while rotating the turntable at a speed of 1800 rpm, the recording layer side was irradiated with a 5-mW, 8-MHz gallium-aluminum-arsenic semiconductor laser (λ830 nm) converged to a spot size of 0.8 μ, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLE 10

A solution prepared by thorough mixing of 3 parts of the thiapyrylium dye No. II-(29), 10 parts of a nitrecellulose solution (same as used in Example 1), and 100 parts of monochlorobenzene was applied onto a Pyrex glass substrate by means of a spinner coater at 500 rpm so as to give a dry coating weight of 0.6 g/m$^2$. The coating was dried at 100° C. for 2 hours to form a recording layer. The optical recording medium thus prepared was subjected to the same recording and reading tests as in Example 9, giving similar results.

EXAMPLE 11

A molybdenum boat containing 500 mg of the thiapyrylium dye No. II-(3) and a Pyrex glass substrate were placed in a vacuum chamber, which was then evacuated to 1×10$^{-6}$ mmHg or less. The dye was heated to evaporate and deposit on the substrate while regulating the heater so as to keep the chamber pressure below 1×10$^5$ tort. The optical recording medium thus obtained was subjected to the same recording and reading tests as in Example 9, giving similar results.

EXAMPLES 12-20

Optical recording media each comprising a Pyrex substrate and a 0.7 g/m$^2$ recording layer were prepared in the same manner as in Example 9 except for using severally the naphthopyrylium dye No. II-(14), pyrylium dye No. II-(14) , pyrylium dye No. II-(17), naphthothiapyrylium dye No. II-(24), thiapyrylium dye No. II- (30) selenapyrylium dye No. II-(27), thiapyrylium dye No. II-(36), thiapyrylium dye No. II-(38), thieayrylium dye No. II-(43) and pyrylium dye No. II-(45) in place of the thiapyrylium dye No. II-(9). These optical recording media were subjected to the same recording and reading tests as in Example 9, giving similar results.

EXAMPLE 21

A solution prepared by mixing 3 parts of the thiapyrylium dye No. III-(18), 12 parts of a nitrocellulose solution (same as used in Example 1), and 150 parts of tetrahydrofuran was applied onto a Pyrex glass substrate by means of a spinner coater at 500 rpm and was dried at 100° C. for 2 hours to form a recording layer of 0.7 g/m$^2$.

The optical recording medium thus prepared 5 was set on a turntable, and while rotating the turntable at a speed of 1800 rpm, the recording layer side was irradiated with a 5-mW, 8-MHz gallium-aluminum-arsenic semiconductor laser (λ 830 run) converged to a spot size of 0.8 μ, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLE 22

A solution was prepared by thoroughly mixing 3 parts of the benzopyrylium dye No. III-(12), 10 parts of a nitrocellulose solution (same as used in Example 1), and 100 parts of monochlorobenzene, and was applied onto a Pyrex glass substrate by means a spinner coater at 500 rpm so as to give a dry coating weight of 0.6 g/m$^2$. The coating was dried at 100° C. for 2 hours to give a recording layer.

The optical recording medium thus prepared was subjected to the same recording and reading tests as in Example 21, giving similar results.

EXAMPLE 23

A molybdenum boat containing 500 mg of the thiepyrylium dye No. III-(11) and a Pyrex glass substrate were placed in a vacuum chamber, which was then evacuated to 1×10$^{-6}$ mmHg or less. The dye was heated to evaporate and deposit on the substrate while regulating the heater to keep the chamber pressure thus prepared was subjected to the same recording and reading tests as in Example 21, giving similar results.

EXAMPLES 24-27

Optical recording media each comprising a Pyrex substrate and a 0.7 g/m$^2$ recording layer were prepared in the same manner as in Example 21 except for using the thiapyrylium dye No. III-(19) benzopyrylium dye No. III-(14), thiapyrylium dye No. III-(21) and thiapyrylium dye No. III-(22) in place of the thiapyrylium dye No. III-(18). These recording media were subjected to the same recording and reading tests as in Example 21, giving similar results.

EXAMPLE 28

A solution was prepared by thoroughly mixing 3 parts of the polymethine dye No. IV-(10), 12 parts of a nitrocellulose solution (same as used in Example 1), and 70 parts of methyl ethyl ketone. The solution was applied onto a Pyrex glass substrate by means of a spinner coater and was dried at 100° C. for 2 hours to form a recording layer of 0.6 g/m$^2$.

The optical recording medium thus prepared was set on a turntable, and while rotating the turntable at a speed of 1800 rpm, the recording layer side was irradiated with a 5-mW, 8-MHz gallium-aluminum-arsenic semiconductor laser (7.780 nm) converged to a spot size of 1.0 µ, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLES 29-33

Optical recording media each comprising a Pyrex substrate and a 0.6 g/m² recording layer were prepared in the same manner as in Example 28 except for using the polymethine dyes Nos. IV-(3), IV-(11), IV-(17), IV-(22), and IV-(25) in place of the polymethine dye No. IV-(10). These optical recording media were subjected to the same recording and reading tests as in Example 28, giving similar results.

EXAMPLE 34

A mixture of 3 parts of the polymethine compound No. V-(3), 12 parts 6f a nitrocellulose solution (same as used in Example 1), and 70 parts of methyl ethyl ketone was thoroughly mixed in a ball mill. The resulting dispersion was applied by dip coating onto an aluminum layer vapour-deposited on a glass plate and was dried to form a recording layer of 0.6 g/m².

The optical recording medium thus prepared was set on a turntable, and while rotating the turntable at a speed of 1800 rpm, the recording layer side was irradiated with a 5-mW, 8-MHz gallium-aluminum-arsenic semiconductor laser ($\lambda$ 780 nm) converged to a spot size of 1.0 µ, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLES 35-39

Optical recording media each comprising an aluminum-vapour-deposited glass substrate and a recording layer were prepared in the same manner as in Example 34 except that the polymethine compounds Nos. V- (5), V- (10), V- (14), V- (17), and V- (20) were used severally in place of the polymethine compound No. V-(3) but the coating weight when using the compound No. V-(14) was made 0.8 g/m². These recording media were subjected to the same recording and reading tests as in Example 34, giving similar results.

EXAMPLE 40

A molybdenum boat containing 500 mg of the polymethine compound No. V-(1) and an aluminum-vapour-deposited glass plate were placed in a vacuum chamber, which was then evacuated to $1 \times 10^{-6}$ mmHg or less. The compound was heated to evaporate and deposit to a thickness of 0.2 µ on the aluminum surface while regulating the heater to keep the chamber pressure below $1 \times 10^5$ mmHg. The optical recording medium thus prepared was subjected to the same recording and reading tests as in Example 34, giving similar results.

EXAMPLES 41 AND 42

Optical recording media each comprising an aluminum-vapour-deposited glass substrate and a 0.2-µ recording layer were prepared in the same manner as in Example 40 except for using severally the polymethine compounds Nos. V-(5) and V-(13) in place of the polymethine compound No. V-(1). The optical recording media thus prepared were subjected to the same recording and reading tests as in Example 34, giving similar results.

EXAMPLE 43

A mixture of 3 parts of the cyanine compound No. VI-(1), 12 parts of a nitrocellulose solution (same as used in Example 1), and 70 parts of methyl ethyl ketone was thoroughly mixed in a ball mill. The resulting dispersion was applied by dip coating onto an aluminum layer vapour-deposited on a glass plate, and was dried to form a recording layer of 0.6 g/m².

The optical recording medium thus prepared was set on a turntable, and while rotating the turn-table at a speed of 1800 rpm, the recording layer side was irradiated was a 5-mW, 8-MHz gallium-aluminum-arsenic semiconductor laser ($\lambda$ 780 run) converged to a spot size of 1.0 µ, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLES 44 AND 47

Optical recording media each comprising an aluminum-vapour-deposited glass substrate and a recording layer were prepared in the same manner as in Example 43 except for using the cyanine compounds Nos. VI- (6) (coating weight 0.6 g/m²), VI- (8) (coating weight 0.6 g/m2), VI-(10) (coating weight 0.7 g/m²) and VI-(12) (coating weight 0.8 g/m²) in place of the cyanine compound No. VI-(1). The same recording and reading tests of these recording media as in Example 43 gave similar results.

EXAMPLE 48

A molybdenum boat containing the cyanine compound No. VI-(6) and an aluminum-vapour-deposited glass plate were placed in a vacuum chamber, which was then evacuated to $1 \times 10^{-6}$ mmHg or less. The compound was heated to evaporate and deposit to a thickness of 0.2 µ on the aluminum surface while regulating the heater to keep the chamber pressure below $1 \times 10^{-5}$ mmHg.

The optical recording medium thus prepared was subjected to the same recording and reading tests as in Example 43, giving similar results.

EXAMPLE 49

A mixture of 3 parts of the cyanine compound No. VII-(1), 12 parts of a nitrocellulose solution (same as used in Example 1), and 70 parts of methyl ethyl ketone was thoroughly mixed in a ball mill. The resulting dispersion was applied by dip coating onto an aluminum layer vapour-deposited on a glass plate and was dried to form a recording layer of 0.6 g/m².

The optical recording medium thus prepared was set on a turntable, and while rotating the turntable at a speed of 1800 rpm, the recording layer side was irradiated with a 5-mW, 8-MHz gallium-aluminum-arsenic semiconductor laser ($\lambda$ 780 nm) converged to a spot size of 1.0 µ, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLES 50–53

Optical recording media each comprising an aluminum-vapour-deposited glass substrate and a recording layer were prepared in the same manner as in Example 49 except that the cyanine compounds Nos. VII-(6), VII-(7), VII-(12), and VII-(13) were used severally in place of the cyanine compound No. VII-(1) but the coating weight when using the compound No. VII-(12) was made 0.8 g/m². The recording media were subjected to the same recording and reading tests as in Example 49, giving similar results.

EXAMPLE 54

A molybdenum boat containing 500 mg of the cyanine compound No. VII-(1) and an aluminum-vapour-deposited glass plate were placed in a vacuum chamber, which was then evacuated to $1 \times 10^{-6}$ mmHg or less. The cyanine compound was heated to evaporate and deposit to a thickness of 0.2 $\mu$ on the aluminum surface while regulating the heater to keep the chamber pressure below $1 \times 10^{-5}$ mmHg. The optical recording medium thus prepared was subjected to the same recording and reading tests as in Example 49, giving similar results.

EXAMPLE 55

Three parts of the pyrylium type dye No. VIII-(5) was thoroughly dispersed in a mixture of 12 parts of a nitrocellulose solution (same as used in Example 1) and 70 parts of methyl ethyl ketone. The dispersion was applied by dip coating onto an aluminum layer vapour-deposited on a glass plate and was dried to form a recording layer of 0.6 g/m².

The optical recording medium thus prepared was set on a turntable, and while rotating the turntable at a speed of 1800 rpm, the recording layer side was irradiated with a 5-mW, 8-MHz gallium-aluminum-arsenic semiconductor laser ($\lambda$ 780 nm) converged to a spot size of 1.0 $\mu$, so as to form a spiral track of pits.

Distinct pits were noted as a result of observing the record-bearing surface of the optical disk with a scanning electron microscope. The track of pits was traced with a low power gallium-aluminum-arsenic semiconductor laser and the reflected light was detected, giving a wave pattern with a sufficient S/N ratio.

EXAMPLE 56

A molybdenum boat containing 500 mg of the pyrylium type dye No. VIII-(7) and an aluminum-vacuum-metallized glass plate were placed in a vacuum chamber, which was then evacuated to $1 \times 10^{-6}$ mmHg or less. The dye was heated to evaporate and deposit to a thickness of 0.2 $\mu$ on the aluminum surface while regulating the heater to keep the chamber pressure below $1 \times 10^{-5}$ mmHg.

The optical recording medium thus prepared was subjected to the same recording and reading tests as in Example 55, giving similar results.

EXAMPLES 57–59

Optical recording media each consisting of an aluminum-vapour-deposited glass substrate and a 0.2 $\mu$ recording layer were prepared in the same manner as in Example 56 but using severally the pyrylium type dyes Nos. VIII-(5), VIII-(13), and VIII-(15) in place of the pyrylium type dye No. VIII-(5).

The same recording and reading tests on these recording media as in Example 55 gave similar results.

EXAMPLE 60

In 100 ml of dichloromethane were dissolved 2.0 g of the pyrylium type compound No. vIII-(5) and 2.0 g of poly(4,4'-isopropylidenediphenylene carbonate) with stirring. A precipitate was formed by adding 50 g of toluene to the solution, and was redissolved by pouring a sufficient amount of dichloromethane into the mixture. The resulting solution separated violet-blue crystals on pouring 500 g of n-hexane thereinto with stirring. These crystals were filtered off and recrystallization thereof was repeated.

Using this co-crystalline complex in place of the compound No. VIII-(5), an optical recording medium was prepared in the same manner as in Example 55. The same recording and reading tests on this recording medium as in Example 55 gave similar results.

EXAMPLE 61

A solution of 1.5 parts of the compound No. IX-(1) in a mixture of 12 parts of a nitrocellulose solution (same as used in Example 1) and 30 parts of dimethylformamide was thoroughly mixed with 125 parts of cyclohexanone. The resulting mixture was applied by dip coating onto a Pyrex glass substrate and was dried at 100° C. for 2 hours to form a recording layer of 0.5 g/m².

The optical recording medium thus prepared was set on a turntable, and while rotating the turntable at a speed of 1800 rpm, the recording layer side was irradiated with a 5-mW, 8-MHz gallium-aluminum-arsenic semiconductor laser ($\lambda$ 780 nm) converged to a spot size of 1.0 $\mu$, so as to form a spiral track of pits.

Distinct pits were noted as a result of observing the record-bearing surface of the optical disk with a scanning electron-microscope. The track of pits was traced with a low power gallium-aluminum-arsenic semiconductor laser and the reflected light was detected, giving a wave pattern with a sufficient S/N ratio.

EXAMPLES 62–64

Optical recording media each consisting of a Pyrex glass substrate and a 0.5 g/m² recording layer were prepared in the same manner as in Example 61 except for using severally the compounds Nos. IX-(2), IX-(4), and IX-(6) in place of the compound No. IX,(1). These recording media were subjected to the same recording and reading tests as in Example 61, giving similar results.

What is claimed is:

1. An optical recording process comprising selectively irradiating an optical recording medium comprising a substrate and recording layer with a recording light beam to form optically detectable pits on said recording layer thereby recording information, said recording layer having a thickness of 10 $\mu$ or less and containing at least 1% by weight of at least one of the compounds represented by Formulas (3)–(5), (7) and 8:

Formula (3):

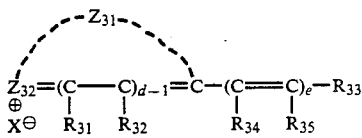

wherein $Z_{32}$ is sulfur, oxygen, or selenium; $Z_{31}$ is a hydrocarbon residue necessary to complete a pyrylium, thiapyrylium, selenapyrylium, benzopyrylium, benzothiapyrylium, benzoselenapyrylium, naphthapyrylium, naphthothiapyrylium, napththoselenapyrylium ring which is substituted or unsubstituted; $R_{31}$ and $R_{32}$ are each hydrogen or a substituted or unsubstituted alkyl, aryl, or styryl residue; $R_{33}$ is a substituted or unsubstituted aryl or heterocyclic residue; $R_{34}$ and $R_{35}$ are each hydrogen or alkyl; $X^{\ominus}$ is an anion; d is 1 or 2; and e is 0, 1, or 2; wherein, when e is 2, each $R_{34}$ is the same or different and each $R_{35}$ is the same or different;

Formula (4):

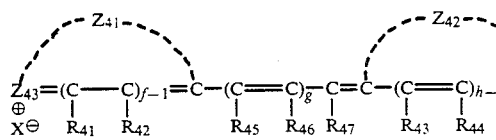

wherein $Z_{43}$ and $Z_{44}$ are each sulfur, oxygen, or selenium $Z_{41}$ is a hydrocarbon residue necessary to complete a pyrylium, thiapyrylium, selenapyrilium, benzopyrylium, benzothiapyrylium, benzoselenapyrylium, naphthopyrylium, napthothiapyrylium, or napthoselenapyrylium ring which is substituted or unsubstituted; $Z_{42}$ is a hydrocarbon residue necessary to complete a pyrane, thiapyrane, selenapyrane, benzopyrane, benzothiapyrane, banzoselenapyrane, naphthopyrane, napththothiapyrane, or napthoselenapyrane ring which is substituted or unsubstituted; $R_{41}$, $R_{42}$, and $R_{44}$ are each hydrogen or a substituted or unsubstituted alkyl or aryl residue; $R_{45}$, $R_{46}$, and $R_{47}$ are each hydrogen, halogen, or a substituted or unsubstituted alkyl, aryl, or aralkyl residue, f and h are each 1 or 2; g is 0, 1, or 2; and $X^{\ominus}$ is an anion; wherein when g is 2, each $R_{45}$ is the same or different;

Formula (5):

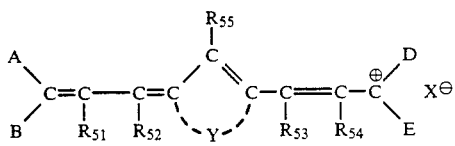

wherein A, B, D, and E are each aryl or substituted aryl; $R_{51}$, $R_{52}$, $R_{53}$ $R_{54}$ and $R_{55}$ are each hydrogen, halogen, or alkyl; Y is a divalent residue necessary to complete a 5- 6-membered ring; and $X^{\ominus}$ is an anion;

Formula (7):

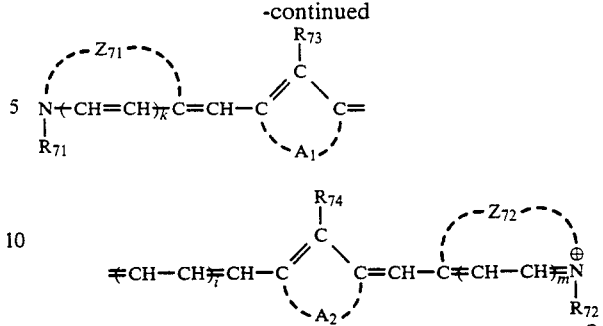

wherein $Z_{71}$ and $Z_{72}$ are each groups necessary to complete a nitrogen-containing heterocyclic ring which is substituted or unsubstituted; $A_1$ and $A_2$ are each a divalent hydrocarbon residue necessary to complete a 5- or 6-membered ring; $R_{71}$ and $R_{72}$ are each hydrogen, alkyl, substituted alkyl, cyclic alkyl, alkenyl, aralkyl, or substituted aralkyl; $R_{73}$ and $R_{74}$ are each hydrogen or halogen; $X^{\ominus}$ is an anion; k and m are each 0 or 1; and l is 1 or 2;

Formula (8):

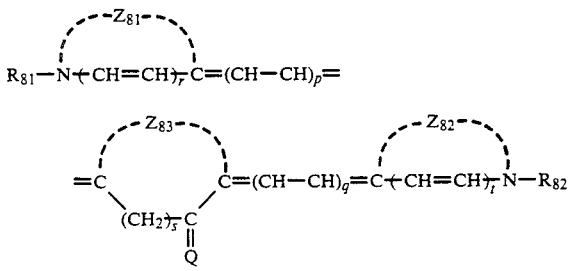

wherein $Z_{81}$ and $Z_{82}$ are each groups necessary to complete a nitrogen-containing heterocyclic ring which is substituted or unsubstituted; $Z_{83}$ is a divalent hydrocarbon residue necessary to complete a 5- or 6-member ring; $R_{81}$ and $R_{82}$ are each hydrogen, alkyl, substituted alkyl, cyclic alkyl, alkenyl, aralkyl, or substituted aralkyl; Q is oxygen, sulfur, imino, substituted imino, or an organic divalent residue; s, t, and r are each 0 or 1; and p and qu are each 0, 1, or 2.

2. The recording process of claim 1, including employing a laser as said recording light beam.

3. The recording process of claim 2, including employing as said recording light beam a xenon flash.

4. The recording process of claim 1, wherein the recording medium is scanned with a recording light beam along a track.

5. The recording process of claim 1, wherein the recording light beam irradiates the recording layer side.

6. The recording process of claim 1, wherein the recording light beam irradiates the substrate side.

7. The recording process of claim 1, including employing a recording layer containing a binder and at least one of the compounds represented by the Formulas (3)–(5), (7) and (8).

8. The recording process of claim 7, including employing as said binder at least one member selected from the group consisting of cellulose esters, cellulose ethers, vinyl type resins and copolymers thereof, acrylic resins, polyester resins, polycarbonates and copolyesters thereof, polyarylates, polymides, epoxy resins, phenolic resins and polyolefins.

9. The recording process of claim 7, including employing a cellulose ester as said binder.

10. The recording process of claim 7, including employing nitrocellulose as said binder.

11. The recording process of claim 7, including employing an organic thin film having a dry thickness of 2 $\mu$ or less as said recording layer.

12. The recording process of claim 1, including employing a reflecting layer between said substrate and said recording layer.

13. The recording process of claim 12 including employing a vapor-deposited film or aluminum, silver or chromium as said reflecting layer.

14. The recording process of claim 12, including employing a laminate film or aluminum, silver or chromium as said reflecting layer.

15. The recording process of claim 1, including employing the step of forming the recording layer by vapor depositing a compound represented by one of the Formulas (3)–(5), (7) and (8).

16. The recording process of claim 1, including employing optically-detectable pits.

17. The process of claim 1 including the step of illuminating said recording layer with a reading light to detect optical variation of said pits, thereby reading out said recorded information.

18. The process of claim 17, wherein said recorded information is read out by detecting the reflection of said reading light from said recording layer.

19. An optical recording process comprising:
selectively irradiating an optical recording medium comprising a substrate and a recording layer with a recording light beam to form optically detectable pits on said recording layer thereby recording information, said recording layer having a thickness of 10 microns or less and containing at least 1% by weight of a compound represented by Formula (3):

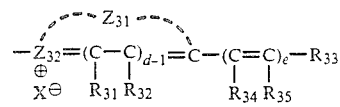

wherein $Z_{32}$ is sulfur, oxygen, or selenium; $Z_{31}$ is a hydrocarbon residue necessary to complete a pyrylium, thiapyrylium, selenapyrylium, benzopyrylium, benzothiapyrylium, benzoselenapyrylium, naphthapyrylium, naphthothiapyrylium, napththoselenapyrylium ring which is substituted or unsubstituted; $R_{31}$ and $R_{32}$ are each hydrogen or a substituted or unsubstituted alkyl, aryl, or styryl residue; $R_{33}$ is a substituted or unsubstituted aryl or heterocyclic residue; $R_{34}$ and $R_{35}$ are each hydrogen or alkyl; $X^\beta$ is an anion; d is 1 or 2; and e is 0, 1, or 2; wherein, when e is 2, each $r_{34}$ is the same or different and each $R_{35}$ is the same or different.

20. An optical recording process comprising: selectively irradiating an optical recording medium comprising a substrate and a recording layer with a recording light beam to form optically detectable pits on said recording layer thereby recording information, said recording layer having a thickness of 10 microns or less and containing at least 1% by weight of at least one of the compounds represented by Formula (4):

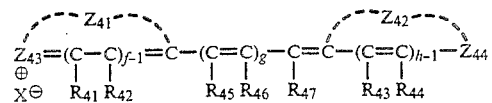

wherein $Z_{43}$ and $Z_{44}$ are each sulfur, oxygen, or selenium $Z_{41}$ is a hydrocarbon residue necessary to complete a pyrylium, thiapyrylium, selenapyrilium, benzopyrylium, benzothiapyrylium, benzoselenapyrylium, naphthopyrylium, naphthothiapyrylium, or naphthoselenapyrylium ring which is substituted or unsubstituted; $Z_{42}$ is a hydrocarbon residue necessary to complete a pyrane, thiapyrane, selenapyrane, benzopyrane, benzothiapyrane, banzoselenapyrane, naphthopyrane, papththothiapyrane, or naphthoselenapyrane ring which is substituted or unsubstituted; $R_{41}$, $R_{42}$, and $R_{44}$ are each hydrogen or a substituted unsubstituted alkyl or aryl residue; $R_{45}$, $R_{46}$, and $R_{47}$ are each hydrogen, halogen, or a substituted or unsubstituted alkyl, aryl, or aralkyl residue, f and h are each 1 or 2; is 0, 1, or 2; and $X^\ominus$ is an anion; wherein when g is 2, each $R_{45}$ is the same or different.

21. An optical recording process comprising:
selectively irradiating an optical recording medium comprising a substrate and a recording layer with a recording light beam to form optically detectable pits on said recording layer thereby recording information, said recording layer having a thickness of 10 microns or less and containing at least 1% by weight of a compound represented by Formula (5):

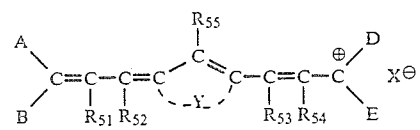

wherein A, B, D, and E are each aryl or substituted aryl; $R_{51}$, $R_{52}$, $R_{53}$ $R_{54}$ and $R_{55}$ are each hydrogen, halogen, or alkyl; Y is a divalent resiude necessary to complete a 5- or 6-membered ring; and $X^\ominus$ is an anion.

22. An optical reproducing process comprising:
selectively irradiating an optical recording medium comprising a substrate and a recording layer with a reading light to form optically detectable pits on said recording layer thereby recording information, said recording layer having a thickness of 10 $\mu$ or less and containing at least 1% by weight of a compound represented by Formula (7):

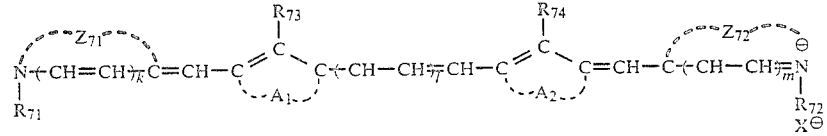

wherein $Z_{71}$ and $Z_{72}$ are each groups necessary to complete a nitrogen-containing heterocyclic ring which is substituted or unsubstituted; $A_1$ and $A_2$ are each a divalent hydrocarbon residue necessary to complete a 5- or 6- membered ring; $R_{71}$ and $R_{72}$ are each hydrogen, alkyl, substituted alkyl, cyclic alkyl, alkenyl, aralkyl, or substituted aralkyl; $R_{73}$ and $R_{74}$ are each hydrogen or halogen; $X^{\ominus}$ is an anion; k and m are each 0 or 1; and l is 1 or 2.

23. An optical recording process comprising:
selectively irradiating an optical recording medium comprising a substrate and a recording layer with a recording light beam to form optically detectable pits on said recording layer thereby recording information, said recording layer having a thickness of 10 microns or less and containing at least 1% by weight of a compound represented by Formula (8):

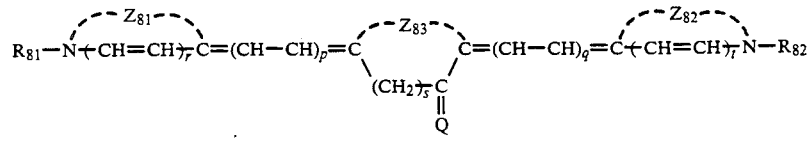

wherein $Z_{81}$ and $Z_{82}$ are each groups necessary to complete a nitrogen-containing heterocyclic ring which is substituted or unsubstituted; $Z_{83}$ is a divalent hydrocarbon residue necesary to complete a 5- or 6-membered ring; $R_{81}$ and $R_{82}$ are each hydrogen, alkyl, substituted alkyl, cyclic alkyl, alkenyl, aralkyl, or substituted aralkyl; Q is oxygen, sulfur, imino, subsituted imino, or an organic divalent residue; s, t, and r are each 0 or 1; p and q are each 0, 1, or 2.

* * * * *

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

Page 1 of 13

It is certified that error appears in the above-identified patent and that said Letters Patent is hereby corrected as shown below:

COLUMN 2

Line 54, "hetercocyclic" should read --heterocyclic--.
    Line 55, "and n" should read --and b--.

COLUMN 3

Line 9,  "(3)" should read --(3),--.
    Line 12, "prylium," should read --pyrylium,--.
    Line 15, "napthoselenopyrylium" should read
             --naphthoselenapyrylium--.
    Line 22, "on" should read --an--.
    Line 44, "thiapyrylium" should read --thiapyrylium,--.
    Line 45, "benyathrapyrylium," should read
             --benzothiapyrylium,--.
    Line 46, "zoselenopyrylium," should read
             --zoselenapyrylium,--.
    Line 50, "pyrane thiapyrane selenapyrane," should read
             --pyrane, thiapyrane, selenapyrane,--.
    Line 51, "benzothriapyrane" should read --benzothiapyrane,--.
    Line 63, "substituted" should read --a substituted--.

COLUMN 4

Line 7, "⊖     should read   --⊕
             C"                    C--.
    Line 55, insert: --Formula (8)--.

COLUMN 5

Line 7, "g" should read --q--.
    Line 8, insert: --Formula (9)--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 5

Line 14, "$A^{63}{}_3$" should read --$\Theta A_3$--.
Line 30, "naphthothiapyrium or naphthoselena" should read --naphthothiapyrylium, or naphthoselena- --.
Line 33, "thiaphrane" should read --thiapyrane,-- and "benso-" should --benzo- --.
Line 35, "thathiapyrane" should read --thothiapyrane,--.
Line 43, insert: --Formula (10)--.
Line 64, "Mo." should read --No.--.

COLUMN 6

Line 22, "4 (acetylsul-" should read --4-(acetylsul- --.
Line 23, "famyl)butyl)," should read --famyl)butyl,--.
Line 34, "4-methylthiazoie," should read --4-methylthiazole,--.
Line 61, "4-phenyiselenazole)," should read --4-phenylselenazole),--.
Line 67, "zoselenazole]," should read --zoselenazole),-- and "(e.g. naph-" should read --[e.g. naph- --.

COLUMN 7

Line 2, "4-hydorxymethyl-4-mehylthiazoline," should read --4-hydroxymethyl-4-methylthiazoline,--.
Line 4, "selena zoline" should read --selenazoline-- and "selenazoline)" should read --selenazoline),--.
Line 5, "," should be deleted.
Line 14, "pyridine)" should read --pyridine--.
Line 20, "1-ethy]" should read --1-ethyl--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 8

Line 20, "(2) ," should read --(2),--.
Line 28, "Croconi" should read --Croconic--.

COLUMN 9

Line 3, "Croconi" should read --Croconic--.

COLUMN 11

Line 3, "Croconi" should read --Croconic--.

COLUMN 13

Line 3, "Croconi" should read --Croconic--.

COLUMN 15

Line 3, "Croconi" should read --Croconic--.

COLUMN 17

Line 3, "Croconi" should read --Croconic--.
Line 28, "No. I-(2)" should read --No. I-(29)--.
Line 40, "845 run)." should read --845 nm).--.
Line 49, "isoropyl," should read --isopropyl,--.
Line 50, "amyl" should read --amyl,--.
Line 51, "60-naphthyl," should read --∝-naphthyl,--.
Line 52, "naphthyi;" should read --naphthyl;-- and "aryis" should read --aryls--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 18

Line 14, "dimethylaminphenyl," should read --dimethylaminophenyl,--.
Line 16, "thylaminostyryl" should read --thylaminostyryl,--.
Line 28, "dibenzytaminophenyl);" should read --dibenzylaminophenyl);--.
Line 30, "dimethyistryryl," should read --dimethylstyryl,--.
Line 32, "dlbutylaminostyryl," should read --dibutylaminostyryl,--.
Line 33, "zylaminosryryl," should read --zylaminostyryl,--.
Line 36, "ehtyphenyl," should read --ethylphenyl,--.
Line 37, "trimethoxlyphenyl," should read --trimethoxyphenyl,--.
Line 39, "dichiorophenyl," should --dichlorophenyl,--.
Line 40, "tribromphenyl," should read --tribromophenyl,--.
Line 45, "2-quinolyl" should read --2-quinolyl,--.
Line 49, "propyl , butyl ," should read --propyl, butyl,--.

COLUMN 39

Line 15, "alkyl." should read --alkyl--.
Line 60, "5.11," should read --5.11;--.
Line 64, "compound" should read --Compound--

COLUMN 40

Line 5, "re. crystallized" should read --recrystallized--.
Line 9, "4.91." should read --4.91; S, 6.49.--.
Line 15, "thisapyrylium" should read --thiapyrylium,--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 40

Line 21, "benzoselenayrane," should read --benzoselenapyrane,--.
Line 34, "hydroxlphenyl," should read --hydroxyphenyl,--.
Line 36, "nophenyl dimethylaminophenyl" should read --nophenyl, dimethylaminophenyl, and--
Line 39, "methyl ethyl" should read --methyl, ethyl,--.

COLUMN 49

Line 3, "4315983." should read --4,315,983.--.
Line 4, "dyers;" should read --dyes,--.
Line 9, "dimethyminophenyl," should read --dimethylaminophenyl,--.

COLUMN 57

Line 29, ")CH$_2$" should read --(Ch$_2$--.
Line 30, "ßB-naphthyl)," should read --ß-naphthyl),--.

COLUMN 58

Line 22, "phenylaminosyryl," should read --phenylaminostyryl,--.
Line 28, "2-ethylvinyl," should read --2-ethylvinyl);--.

COLUMN 63

Compound No. "V-(20), "$\oplus$ C—CH=CH" should read --$\oplus$ C—CH=C--.

UNITED STATES PATENT AND TRADEMARK OFFICE
CERTIFICATE OF CORRECTION

PATENT NO. : 5,320,930

DATED : June 14, 1994

INVENTOR(S) : KAZUHARU KATAGIRI, ET AL.

It is certified that error appears in the above-identified patent and that said Letters Patent is hereby corrected as shown below:

COLUMN 63

Line 53, "1,2-d" should read --(1,2-d)-- and
"(2,2-) thia-" should read --(2,1-d) thia- --.
Line 54, "(2,2-d)" should read --(2,1-d)--.
Line 66, "4-phenylselenazole)" should read
--4-phenylselenazole),--.
Line 67, "," should be deleted.

COLUMN 64

Line 39, "methylzoine, thiazoline," should read
--methylthiazoline,--.
Line 59, "yethyl  ) -5-cyanobenzimidazole," should read
--yethyl)-5-cyanobenzimidazole,--.
Line 64, "ethylsulfamylbenzimidazole," should read
--N-ethylsulfamylbenzimidazole,--.

COLUMN 66

Line 3, "thylsulfamylpropyl," should read
--tylsulfamylpropyl,--.
Line 13, "methylsufate," should read --methylsulfate,--.
Line 14, "$X^{63}$" should read --$X^{\ominus}$--.
Line 17, "$\overline{O}$" should read --O--.
Line 20, "sent" should read --sented--.

COLUMN 67

Line 67, "5-methylbenzoth iazole," should read
--5-methylbenzothiazole,--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 68

Line 63, "(2,1-d)" should read --(1,2-d)--.
Line 64, "tho(1,2-d)thiazole" should read
--tho(1,2-d)thiazole,--.

COLUMN 69

Line 12, "5-methoxybenzolselenazole," should read
--5-methoxybenzoselenazole,--.
Line 16, "(e.g-" should read --(e.g.--.
Line 27, "droxyisoquinoline)," should read
--croxyisoquinoline),--.
Line 37, "1-    (ß-acetoxyethyl)    -5-" should read
--1-(ß-acetoxyethyl)-5- --.
Line 39, "-fluero-" should read -- -fluoro- --.
Line 42, "ethyl- 5-sulfamylbenzimidazole," should read
--ethyl-5-sulfamylbenzimidazole,--.

COLUMN 70

Line 10, "RS$_{81}$" should read --R$_{81}$--.
Line 25, "iraino" should read --imino--.

COLUMN 75

Line 54, "1,2,3,4-tetrahydronaphtalene-" should read
--1,2,3,4-tetrahydronaphthalene- --.
Line 61, "dyes" should read --dyes,--.
Line 64, "seleneapyrylium," should read --selenapyrylium,--.
Line 65, "benzathiopyrylium," should read
--benzothiapyrylium,--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

Page 8 of 13

It is certified that error appears in the above-identified patent and that said Letters Patent is hereby corrected as shown below:

COLUMN 75

Line 66, "epyrylium," should read --pyrylium,--.
Line 67, "," should be deleted.

COLUMN 76

Line 53, "thiepyrane," should read --thiapyrane,--.
Line 54, "benzothiopyrane, benzoselenapyrane," should read
--benzothiapyrane, naphthoselenapyrane,--.
Line 68, "4-phenyl1" should read --4-phenyl-1,--.

COLUMN 77

Line 6, insert: $--A_3^{\ominus}$ represents--.
Line 20, "(e.g-" should read --(e.g.--.

COLUMN 78

Line 2, "yphenyl-," should read --yphenyl,--.
Line 4, ";" should read --,--.
Line 12, "0(e.g." should read --(e.g.--.

COLUMN 83

Line 49, "Holy. Chin." should read --Helv. Chim.--.
Line 50, "these-pyrylium" should read --these pyrylium--.
Line 53, "methylthiayrylium" should read
--methylthiapyrylium-- and "been-disclosed"
should read --been disclosed--.
Line 65, "crocontic" should read --croconic--.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 84

Line 29, "cf" should read --of--.

COLUMN 85

Line 4, "mixture-was" should read --mixture was--.
Line 12, "4.36," should read --4.36;--.
Line 13, "79.59," should read --79.59;-- and "4.45," should read --4.45;--.
Line 35, "situted" should read --stituted-- and "ethylpehnyl," should read --ethylphenyl,--.
Line 36, "amylpehnyl" should read --amylphenyl--.
Line 37, "for" should read --to--.
Line 40, "$C_1$-$C_5$ alkyl" should read --$C_1$-$C_5$ alkyl--.

COLUMN 86

Line 5, "[2," should read --2,-- and "carbonate]" should read --carbonate)--.
Line 32, "Poly(4,4'-isopropylenediphenylene" should read --Poly(4,4'-isopropylidenediphenylene--.
Line 42, "carboante" should read --carbonate--.

COLUMN 87

Line 53, "n-buthanol" should read --n-butanol--.
Line 63, "run)." should read --nm).--.

COLUMN 89

Line 31, "an relectro-" should read --electro- --.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 89

Line 46, "Go" should read --to--.
Line 48, "the-substrate" should read --the substrate--.

COLUMN 90

Line 1, "can." should read --can--.
Line 3, "utilize" should read --utilized--.
Line 5, "run" should read --nm--.
Line 26, "($\lambda$ 780 am)" should read --($\lambda$ 780 nm)--.
Line 38, "nitrecellulose" should read --nitrocellulose--.

COLUMN 91

Line 6, "mothine" should read --methine--.
Line 34, "nitrecel-" should read --nitrocel- --.
Line 50, "1x10$^5$" should read --1x10$^{-5}$--.
Line 51, "tort." should read --Torr.--.
Line 62, "II- (30)" should read --II-(30)--.
Line 63, "thieayrylium" should read --thiapyrylium--.

COLUMN 92

Line 10, "5" should be deleted.
Line 14, "($\lambda$ 830 run)" should read --($\lambda$ 830 nm)--.
Line 28, "means a" should read --means of a--.
Line 38, "thiepyrylium" should read --thiapyrylium--.
Line 42, "pressure" should read --pressure below 1x10$^{-5}$ Torr. the optical recording medium--.
Line 50, "No. III-(19)" should read --No. III-(19),--.
Line 51, "No. III-(21)" should read --No. III-(21),--.

UNITED STATES PATENT AND TRADEMARK OFFICE
CERTIFICATE OF CORRECTION

PATENT NO. : 5,320,930

DATED : June 14, 1994

INVENTOR(S) : KAZUHARU KATAGIRI, ET AL.

It is certified that error appears in the above-identified patent and that said Letters Patent is hereby corrected as shown below:

COLUMN 93

Line 1, "(7. 780 nm)" should read --($\lambda$ 780 nm)--.
Line 22, "6f" should read --of--.
Line 45, "Nos. V-(5)" should read --Nos. V-(5),--.
Line 46, "," should be deleted.
Line 48, "weight." should read --weight--.
Line 61, "1×10$^5$" should read --1×10$^{-5}$--.

COLUMN 94

Line 17, "turn-table" should read --turntable--.
Line 20, "($\lambda$ 780 run)" should read --($\lambda$ 780 nm)--.

COLUMN 95

Line 36, "was" should read --were--.

COLUMN 96

Line 14, "No. vIII-(5)" should read --No. VIII-(5)--.
Line 67, "8:" should read --(8):--.

COLUMN 97

Line 15, "napththoselenapyrylium ring" should read --naphthoselenapyrylium ring--.
Line 34, "nium" should read --nium;--.
Line 35, "selenapyrilium," should read --selenapyrylium,--.
Line 37, "napthothiapyrylium," should read --naphthothiapyrylium,-- and "nap-" should read --naph- --.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

Page 12 of 13

It is certified that error appears in the above-identified patent and that said Letters Patent is hereby corrected as shown below:

COLUMN 97

Line 41, "banzoselenapyrane," should read --benzoselenapyrane,--.
Line 42, "napththothiapyrane, or napthoselenapyrane ring" should read --naphthothiapyrane, or naphthoselenapyrane ring--.
Line 44, "$R_{42}$, and" should read --$R_{42}$, $R_{43}$ and--.
Line 63, "$R_{53}R_{54}$" should read --$R_{53}$, $R_{54}$--.

COLUMN 98

Line 11, "$\overset{\oplus}{N}$" should read --$\overset{\ominus}{N}$--.
Line 41, "5- or 6-member" should read --5- or 6-membered--.
Line 46, "qu" should read --q--.
Line 67, "polymides," should read --polyamides, polyimides,--.

COLUMN 99

Line 50, "napththoselenapyrylium" should read --naphthoselenapyrylium--.
Line 55, "$X^{\delta}$" should read --$X^{\ominus}$--.
Line 56, "$r_{34}$" should read --$R_{34}$--.

COLUMN 100

Line 13, "selenium" should read --selenium;--.
Line 21, "banzoselena-" should read --benzoselena- --.

UNITED STATES PATENT AND TRADEMARK OFFICE
CERTIFICATE OF CORRECTION

PATENT NO. : 5,320,930
DATED : June 14, 1994
INVENTOR(S) : KAZUHARU KATAGIRI, ET AL.

It is certified that error appears in the above-identified patent and that said Letters Patent is hereby corrected as shown below:

COLUMN 100

Line 22, "papththothiapyrane," should read --naphthothiapyrane,--.
Line 24, "$R_{42}$, and" should read --$R_{42}$, $R_{43}$ and--.
Line 25, "sustituted" should read --substituted or--.
Line 28, "residue," should read --residue;-- and "is 0, 1, or 2;" should read --g is 0, 1, or 2;--.
Line 48, "$R_{53}R_{54}$" should read --$R_{53}$, $R_{54}$--.
Line 49, "resiude" should read --residue--.

COLUMN 102

Line 20, "p and" should read --and p and--.

Signed and Sealed this

Twenty-eight Day of March, 1995

Attest:

BRUCE LEHMAN

Attesting Officer           Commissioner of Patents and Trademarks